US006622128B1

(12) United States Patent
Bedell et al.

(10) Patent No.: US 6,622,128 B1
(45) Date of Patent: Sep. 16, 2003

(54) INTERNET-BASED ATTORNEY-CLIENT BILLING SYSTEM

(76) Inventors: Jerry L. Bedell, 7805 NW. 70th St., Kansas City, MO (US) 64152; Dennis W. McKevitt, 800 E. Northwest Hwy. Suite 422, Palatine, IL (US) 60067

( * ) Notice: Subject to any disclaimer, the term of this patent is extended or adjusted under 35 U.S.C. 154(b) by 0 days.

(21) Appl. No.: 09/344,455

(22) Filed: Jun. 25, 1999

(51) Int. Cl.[7] ............................................. G60F 17/60
(52) U.S. Cl. ...................................................... 705/30
(58) Field of Search ...................................... 705/7, 30

(56) References Cited

U.S. PATENT DOCUMENTS

| | | | |
|---|---|---|---|
| 4,502,788 A | 3/1985 | Lowden | 368/10 |
| 5,182,705 A | 1/1993 | Barr et al. | 364/401 |
| 5,287,270 A | 2/1994 | Hardy et al. | 364/408 |
| 5,329,447 A | 7/1994 | Leedom, Jr. | 364/419.19 |
| 5,359,508 A | 10/1994 | Rossides | 364/401 |
| 5,473,630 A | 12/1995 | Penzias et al. | 375/114 |
| 5,557,515 A | 9/1996 | Abbruzzese et al. | 364/401 R |
| 5,583,778 A | 12/1996 | Wind | 364/464.01 |
| 5,633,919 A | 5/1997 | Hogan et al. | 379/115 |
| 5,634,012 A | 5/1997 | Stefik et al. | 395/239 |
| 5,649,013 A | 7/1997 | Stuckey et al. | 380/4 |
| 5,710,887 A | 1/1998 | Chelliah et al. | 395/226 |
| 5,774,866 A | 6/1998 | Horwitz et al. | 705/7 |
| 5,790,664 A | 8/1998 | Coley et al. | 380/4 |
| 5,805,159 A | 9/1998 | Bertram et al. | 345/339 |
| 5,819,092 A | 10/1998 | Ferguson et al. | 395/701 |
| 5,827,070 A | 10/1998 | Kershaw et al. | 434/322 |
| 5,875,431 A * | 2/1999 | Heckman et al. | 705/7 |

FOREIGN PATENT DOCUMENTS

JP            2001-222611       *   8/2001

OTHER PUBLICATIONS

"Cost control should extend to legal services." by Robert J. Burdett, Jr.; Mary Z. Taylor, Healthcare Financial Management, v45, n3, p. 68(4), Mar., 1991.*

"Clamping down on legal costs. (Internal Management)" by Edmond R. Browne, Jr., Mortgage Banking, v52, n6, p. 67(4), Mar., 1992.*

"Litigation management: what legal defense costs are reasonable and necessary?(insurance company coverage of insured's costs)" by Howard M. Tollin, Tammy Feman, Defense Counsel Journal, 63, n4, 529–536, Oct., 1996.*

* cited by examiner

*Primary Examiner*—Kenneth R. Rice
(74) *Attorney, Agent, or Firm*—Cislo & Thomas LLP

(57) ABSTRACT

A process by which litigation or legal billing may be both recorded and monitored in conjunction with budgetary constraints. Legal work products and expenses are logged by a user and recorded in a sortable database. Financial expectations (in the form of budget guidelines) held by an insurance carrier or client can be continuously kept in mind, while time and expenses accrue from an attorney's or legal team's efforts. As time or expenses are entered, corresponding budget information may be displayed. A unified interface provides easy browsing, data entry, and report generation. A navigation bar may provide ready means by which different aspects of the present invention are available.

17 Claims, 32 Drawing Sheets

FIG. 5

```
DROP DOWN MENU: CASE TYPE, SUB TYPE

MAIN TYPE                       SUB TYPE              108

ADVERTISING INJURY              ACCOUNTING
AIRCRAFT              106       ARCHITECTS
APPELLATE                       ASSAULT
BAD FAITH                       BODILY INJURY
COMMERCIAL AUTO                 BOND
COMMON CARRIER                  CLASS ACTION
CONSTRUCTION                    COMPLETED OPERATIONS
CONTRACTUAL LIABILITY           CONSTRUCTION DEFECT
COVERAGE                        DEFAMATION
DIRECTORS/OFFICERS              DENTAL
EMPLOYMENT LIABILITY            FALSE ARREST/IMPR.
FELA                            FIRST PARTY
GENERAL LIABILITY               HOSPITAL
LIQUOR LIABILITY                MEDICAL
MUNICIPAL LIABILITY             NO FAULT
PERSONAL AUTO                   NURSING HOME
PERSONAL INJURY                 OTHER
PREMISES LIABILITY              PHYSICIAN
PRODUCTS LIABILITY              PROPERTY DAMAGE
PROFESSIONAL LIABILITY          PSYCHIATRIST
PROPERTY                        PSYCHOLOGIST
SURETY                          RADIOLOGY
TOXIC TORT                      REAL ESTATE
WORKERS COMPENSATION
```

DROP DOWN MENU: MAIN WORK PRODUCTS

| MAIN WORK PRODUCTS | MAIN WORK PRODUCTS |
|---|---|
| Agreement | Motion, Other |
| Answer to Amended Complaint/Petition | Motion, to Dismiss |
| Answer to Complaint/Petition | Motion, to Quash |
| Bankruptcy intervening proceeding | Motion, to Strike |
| Bill of Particulars | Opinion, Coverage |
| Case Management, Discovery Scheduling | Order, Minute Order |
| Complaint, Third Party | Order, Protective |
| Conference, Pretrial | Pleading, Other |
| Counter Claim | Pretrial Conference on |
| Cross-Claim | Pretrial Hearing on |
| Demurrer | Release |
| Deposition | Report, General Status |
| Discovery Conference | Request for Admissions, Incoming |
| Discovery, other, liability | Request for Admissions, Outgoing |
| Discovery, other, medical | Request for Production, Incoming |
| Document Production | Request for Production, Outgoing |
| Examination Before trial | Requests, Special |
| Experts, coordination | Settlement |
| Injunction, Permanent | Settlement Conference |
| Injunction, Preliminary | Site Inspections |
| Interrogatories, Incoming | Trial |
| Interrogatories, Outgoing | WC discovery item |
| Investigation, Liability | WC Hearing |
| Investigation, Medical | WC Lump Sum |
| Joinder | WC Pleading, other |
| Joint Defense Group | WC pretrial conference |
| Mediation | WC Trial |
| Motion, Appeal | WC, compromise/commutation |
| Motion, for Declaratory Judgment | WC, Form Answer |
| Motion, for Summary Judgment | |

*FIG. 8*

DROP DOWN MENU: ACTIVITY

ACTIVITIES  360
Analyze
Arrange
Attend
Conduct
Discuss
Draft
Edit
Evaluate
File
Initiate
Meet With
Negotiate
Organize
Placed
Plan
Prepare
Prepare For
Preparing for while traveling to
Produce
Receive
Receive & Review
Reporting on while traveling from
Review
Schedule
Send
Summarize
Travel from
Travel to
Travel to and from

FIG. 9

DROP DOWN MENU: SUPPORTING COMPONENT/WORK

SUPPORTING COMPONENT  370
abstract,
affidavit,
allegations,
answer(s) to,
arguments, oral,
arguments, written,
brief,
conference,
correspondence, incoming from
correspondence, outgoing to
docket,
documents
exhibits, deposition
exhibits, other
exhibits, trial
FAX
file
hearing
intraoffice conference with
investigation report
jury instructions,
medical reports/information
memorandum
Motion for Sanctions
Summarize
Motion for Sanctions, opposition to
Motion for Sanctions, reply to
Motion to Compel Answers,
Motion to Compel Answers, opposition to
Motion to Compel Answers, reply to
Motion, other
objections to,
opposition to,
pleadings, other
reply to,
report to carrier
report to client
report to other
research
statement(s)
strategy,
subpoena
summary,
telephone Discussion, incoming
telephone Discussion, outgoing
WC form
WC wage statement

FIG. 10

Please enter access information below.

Client Name:

[Tecum]  — 54

User Name:

[Cy King] — 50

Password:

[•••••] — 52

[Login]

Click here to change the background and font color.

FIG. 13

Case Information

GENERAL TITLE — 100

90

FIRM CASE REFERENCE: [    ]

Date Assigned: [  ] — 102

Firm File #: [    ] — 104

Case Type: [▼] — 106

Sub Type: [▼] — 108

Included Case Comments Here:

[                ] — 110

Estimated Fees in Case: [    ] — 112

Estimated Expenses in Case: [    ] — 114

Estimated Time in Days for Case: [    ] — 116

If Case Estimate Is Revised, Enter Reason Here:

[                ] — 118

120    130         Client Information         132

Name: [    ] — 134    Address: [    ]

City: [    ]    State: [▼] — 136

Zip Code: [    ] — 138    Contact Name: [    ] — 140

Telephone #: [  ]-[    ]    Contact Email: [    ]

142 — Method of Invoicing Client: [▼] — 144    143

150    152         Insurer Information         154

Name: [    ] — 156    Address: [    ]

City: [    ]    State: [▼] — 158

Zip Code: [    ] — 160    Contact Name: [    ] — 162

Telephone #: [  ]-[    ]    Contact Email: [    ]

Method of Invoicing Insurer: ▾ —166

Claim #: ☐ —170

Assigned By: ▾ —172

Location Number: ☐ —174

|  | Plaintiffs 176 | Defendants 178 |
|---|---|---|
| Total # of: | ☐ | ☐ |
| Total # of Cross/Counter: | ☐ —180 | ☐ —190 |

Plaintiff Attorney: ☐ —192

Plaintiff Attorney Telephone#: ☐ - ☐ —194

Can Defense be Shared?: ☐ —196

Date of Sharing Agreement: ☐ —198

Includ Terms of Sharing Here: —200

[text area]

Closed Case Information

Date Closed: ☐

Case Closed: ☐

Verdict/Settlement Amount: ☐

Verdict

[text area]

Method Closed:

| Tried | Settled | Dismissed |
|---|---|---|
| ● | ○ | ○ |

Save Changes —210    Cancel —212

```
                New  Employee      ╭─850
     First Name: [              ]
      Last Name: [                  ]╮852
  Billing Initials: [      ]╮854
        Position: [Associate      ▽]╮856
Date Admitted to Bar: [        ]╮858
     Hourly Rate: [      ]╮860
   Email Address: [                ]
        Password: [      ]╮864         ╮862
         Security Settings
         ☑ Add Employees
         ☑ Add Products
         ☑ Add Work
         ☑ Submit Bills
         ☑ Make Changes
         ☑ Access Reports
         ☑ Access Summary
```

| Click the 'Add' button to send this information to the database | Click the 'Finished' button to return to the employee roster list. |
|---|---|
| [Add] | [Finished] |
| 242 | 244 |

FIG. 17

Added Product Information

| Offensive | Defensive | Procedural | Priority |
|-----------|-----------|------------|----------|
| ☐ | ☐ | ☐ | 1 ▼ |

292  294  296  298

| Authority Obtained? | Obtained By Whom? | Date Obtained |
|---------------------|-------------------|---------------|
| Yes ☐ | | |

300  310  312

Document Production

Date Added: 04/23/1999 — 314
Estimated Completion Date: ☐ — 316

Budget, This Product

Estimated Fees: ☐ — 318
Estimated Expenses: ☐ — 320
Estimated Total Product Cost: ☐ — 330

Description: — 332

Reason For Adding Product: — 334

[ Continue ] 336    [ Cancel ] 338

*FIG. 22*

Work Detail and Billing Entry Screen

Answer to Complaint/Petition: Answer to Complaint for general damages ▽

Time Entry ⊙

Activity: Analyze ▽

Name/Rate: Lawyer, Jason -- $75.00 ▽

Supporting Work or Component: abstract ▽

Specific Reference or Description: [ ]

Time for this Task: 0

Date of Work: [ ]

Date Work Entered: 05/05/1999

Expense Entry ○

Description of Expense: Air Fare ▽

Amount: [ ]

Reference Provider: [ ]

Date Expense Incurred: [ ]

| | Fees | Expenses | Total |
|---|---|---|---|
| Budgeted Case: | 100,000.00 | 90,000.00 | 25 |
| Budgeted This Product: | 3000 | 10000 | 27 |
| Used This Product: | 00.00 | 00.00 | |
| Used This Task: | 0 | | |
| Remaining This Product: | 3000 | 90,000.00 | |

[Finished] [Preview Budget] [Submit]

[Additional Entries] [Cancel]

Work Product Billing Summary
Tax Id 1524568

460 — INVOICE NUMBER: [ ]

Date Billed: [ ]

FIRM CASE REFERENCE: TEST CASE
Firm File #: 123
Claim #: 123999

| BILL TO: | ○ Client | ○ Carrier |
|---|---|---|

Client Name: Client Alpha
Client's Insurer Name: Carrier Beta
Attention: Bob Agent

Work Product Being Billed

| Product Name | Description | Completed Product? | Date Commenced | Last Date |
|---|---|---|---|---|
| Agreement | Agreement re Test Case | ✓ | 5/5/99 | 5/5/99 |

Work Product Billing Detail 470

| Date | Initials | Activity, Supporting Work | Hours | Fees |
|---|---|---|---|---|
| 5/5/99 | JL | Draft, documents, including new clauses per client instructions | 1.3 | $97.50 |

WORK PRODUCT -- STAFF TIME AND FEES SUMMARY

| Name/Rate | Position | Duration of Work | This Work Product Time | This Work Product Fees |
|---|---|---|---|---|
| Jason, Lawyer/ $75.00 | Associate | 5/5/99–5/5/99 | 1.3 | $97.50 |

| Budgeted | $100,000.00 |
|---|---|
| Total to Date (inclusive) | $98.00 |
| Product | $97.50 |
| Remaining | $99,902.50 |

[ Submit Bill ]

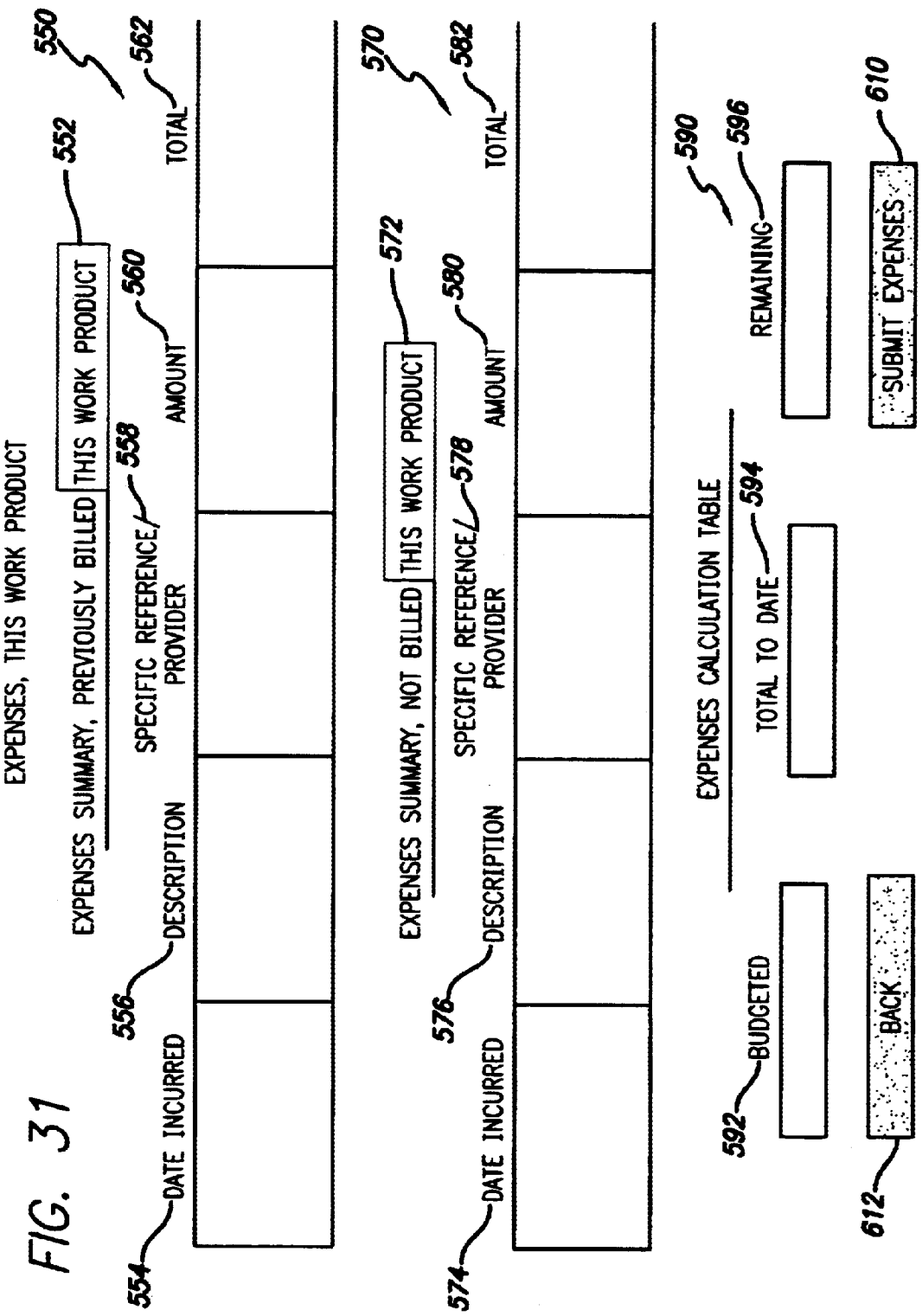

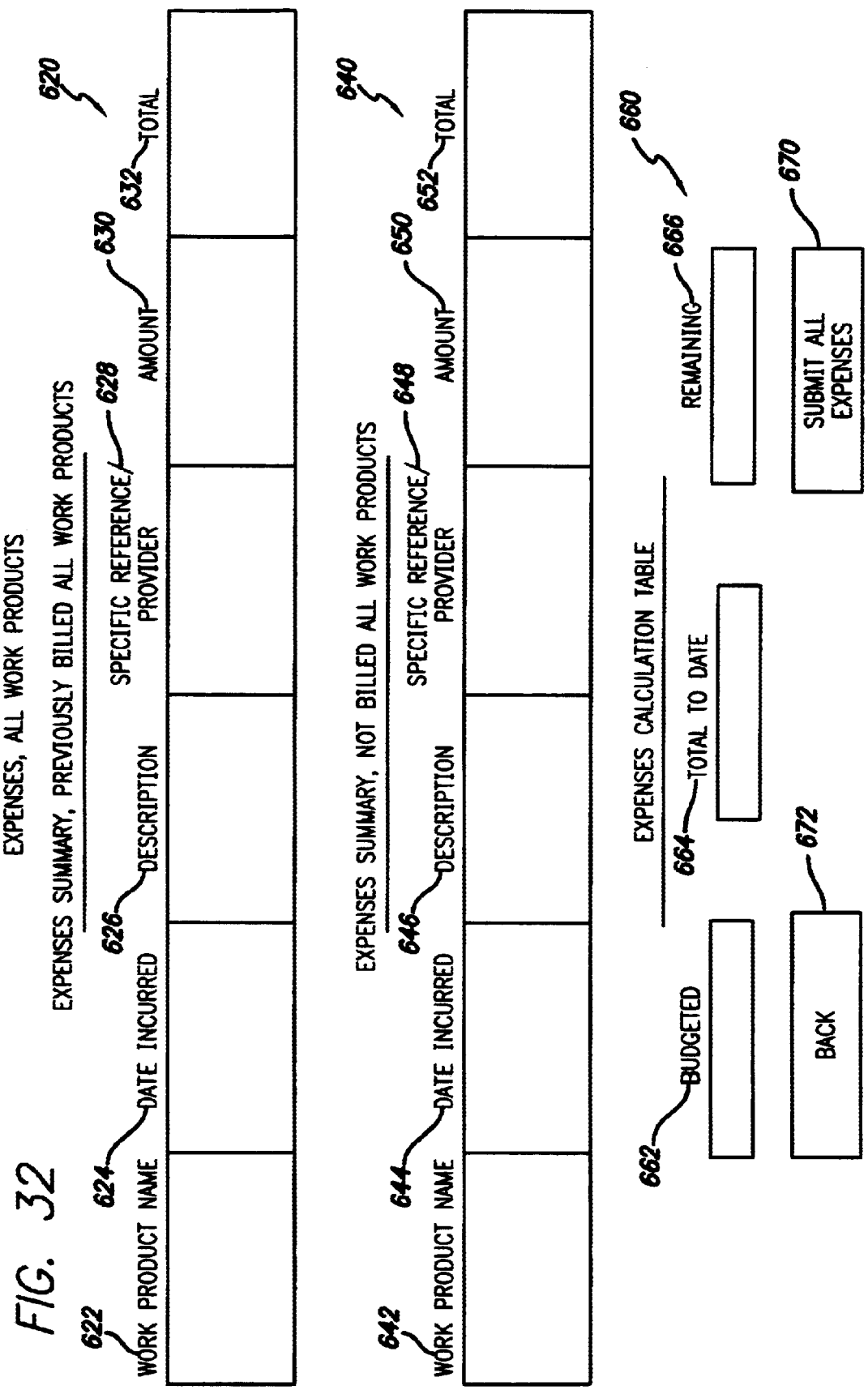

Work Product Expenses Billing
Tax ID 1524568

INVOICE NUMBER: [        ] — 702
Date Billed: [      ] — 706
FIRM CASE REFERENCE: Tecum Test Case — 700
Firm File #: 123456789 — 704
Claim #: 123456789 — 708

720

| BILL TO: | ○ Client | ○ Carrier |
|---|---|---|

— 722

Client Name: Medata Inc.
Client's Insurer Name: ABC Insurance
Attention: [Steve Armstrong]

Work Products Being Billed

| Product Name | Description | Completed Product? | Date Commenced | Last Date |
|---|---|---|---|---|
| Agreement | Agreement | ☑ | 4/23/99 | 4/23/99 |
| Document Production | Description of Document Production | ☑ | 4/22/99 | 4/22/99 |

Expenses Detail
(Disbursements / Advanced Expenses)

| Date Expense Incurred | Description of Expense | Specific Reference/ Provider | Supporting Work | Amount |
|---|---|---|---|---|
| 4/23/1999 | Express Delivery | Corporate Couriers | abstract | $25.00 |

| # of Expense Items | TOTAL |
|---|---|
| 1 | $25.00 |

| | Expenses |
|---|---|
| Budgeted | $20,000.00 |
| Total to Date (Inclusive) | $25.00 |
| Product | $25.00 |
| Remaining | $19,975.00 |

728
[Submit Bill]

[Cancel]
724

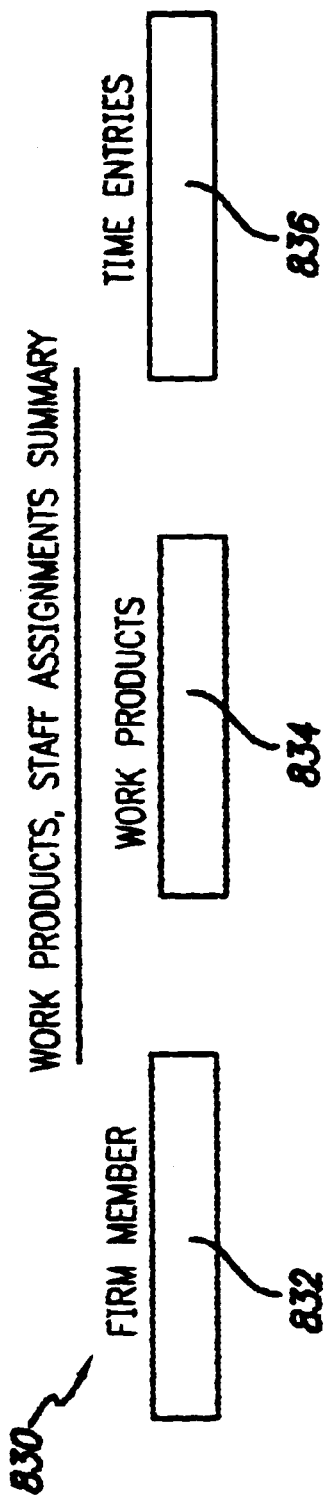

INTERNET-BASED ATTORNEY-CLIENT BILLING SYSTEM

BACKGROUND OF THE INVENTION

1. Field of the Invention

This invention relates to accounting methods and more particularly to an Internet-based billkeeping and litigation management system, allowing third parties to monitor the progress and expense of litigation and/or possibly other legal matters.

2. Description of the Related Art

The imposition of insurance company billing and litigation guidelines has been a problem for defense counsel over the past ten years. While such guidelines may be unpleasant, ethical questions automatically surface whenever an attorney is instructed by someone other than a true client what should or should not be included in the preparation of a client's defense or what can or cannot be billed. The question arises as to whether or not defense attorneys are principally acting in an unethical manner or committing malpractice if, through guidelines, they allow an insurance carrier to control litigation. Variables flowing from that question to any given case situation make the answer somewhat elusive. Any time they conform to guidelines instead of professional judgment, attorneys arguably are acting contrary to canons, committing malpractice or behaving unethically. In a more practical business sense, it is not so easy for attorneys or judges to know where lines should be drawn. There are many cases that set out to interpret the bottom line rights and obligations of the parties in a tripartite relationship. As in many heated ethical or legal issues, the true answer continues to be obscure in the face of absent absolutes.

A pure and simple axiom is unlikely to be found any time soon. It is clear that neither the lawyers nor their insurance counterparts intend to soften their positions on guideline issues. Battle lines have been drawn over the past twenty years by the insurance industry and their outside defense counsel regarding such guidelines. Over time, disputes between the two sides have become less subtle and more recently have accelerated with an intensity not likely to soon diminish. What once flourished as a healthy and tightly bonded business relationship has become an unfortunate and relentless scrimmage which allows and fosters mistrust, uncertainty and lack of confidence to influence, maybe even dominate, interactive behavior.

Now the insurance industry, as a whole, has resorted to harsher tactics. They have made billing for legal services a focal point rather than the residual it had been in the past. Insurance defense firms are routinely being audited by insurance companies and are putting up with (some would say victimized) by fee adjustments by what bas become a dreaded bill review process. As a result, a whole new ethical consideration now looms. Notwithstanding the isolated ethical question of having a third party audit a law firm's, bills, billing guidelines (which themselves are often argued to have unethical aspects in a pure sense) have recently and more regularly served as the very measurement upon which the audits and bill reviews are predicated, instead of the quality and/or shell with which the legal services are rendered. The more restrictive and complete the guidelines, the more susceptible a bill is to adjustment. Cost becomes the overriding consideration for the insurance carrier payor, rather than service to the insured.

Disagreements continue to mount. Although they are closely intertwined, guidelines and audits with all their separate but related ethical problems, really stem from the erosion of relationships—something that could be easily repaired if each side would sincerely want to make things better. While these problems hit directly on ethical matters, their solutions may be found through a less formal, indirect link. To understand the quandary collectively facing the insurance and insurance defense industries today, and maybe even reach some solutions, it is helpful to separately analyze the roots and breakdown the makeup of current problems. Main components of such an analysis include:

1. history of relationships, attitudes and guidelines;
2. the advent, impact and influence of hourly billing;
3. a more practical interpretation of the tripartite relationship;
4. the ethical aspects and presuppositions of outside counsel guidelines; and
5. The development of audits and their impact.

The current situation and its difficult nature arose over time from many sources. It would take many fingers to point blame for the mess in which outside defense firms and one of their primary sources of business—insurance companies—are finding themselves. This situation has resulted from an abstract history of development that includes exaggerated litigiousness, increasing case complexity, changing laws, liberalism, consumerism, mismanagement, and countless other factors. To lay responsibility, or blame, either on outside counsel or on the insurance companies would be unfair and would only serve to sabotage restorative measures which are sorely needed if improvement in working relationships can be achieved. Still, both have clearly made mistakes which contributed to the friction—the most serious being a general failure to truly communicate by understanding one another's composite problems.

The evolution of trouble has intensified annually as overall litigation defense costs and their ratio to indemnity dollars has increased. Even though some transfer occurs through increased premiums, the heaviest and most direct impact of these rising costs falls squarely upon the insurance industry. That legal expenses are a problem is irrefutable. While to a great extent holding outside counsel responsible for causing the problem, insurance companies have largely accepted it as their own for solving. This is at least the perception created when looking at the seemingly infinite number of is guidelines and audit processes now being forced upon defense attorneys. The emergence of guidelines, which are steadily becoming more cumbersome, shows off the most noticeable common characteristic of the insurance industry—solving problems by regulation. It is the nature of any insurance company to believe that management of processes creates all successes. This is precisely why defense guidelines most often are characteristically procedural. The propriety of these "procedures" may be challenged every time their implementation potentially clashes, or conflicts, with inherent responsibilities of either the attorney or the claims professional.

Insurance carriers have vigorously asserted themselves in trying to solve their legal expense problems by micro-supervising defense attorneys to spend less and accomplish more toward reasonable claims resolutions. Is this obsession with controlling the process deserved by defense attorneys? Maybe so. In fact, initially, to a large degree, they were the cause of current ill feelings. While law firms flourished in the nineteen-eighties, they failed to understand the composite makeup, needs and development of their primary business source through some very tough times. During the early eighties, too many insurance defense firms ignored what had been happening to their customer base in the preceding four or five years. Through the economic stresses of insurance companies, when the seeds of current attitudes were planted, law firms commonly realized record profits; ignored their responsibilities for developing future business relationships and neglected to offer their own creative thoughts for legal cost solutions.

As an aftermath of severe market cycles and having failed miserably at cash flow underwriting attempts, the insurance industry found itself in big financial trouble by 1980. The portrait by mid-decade was ugly at best with Allocated Loss Adjustment Expense (ALAE), which includes legal expense, and high pure loss ratios combining to break some insurance companies and severely cripple most of the rest. By then, there were more attorneys than ever and lawsuits continued to rise. So did company insolvencies. Seeing no affirmative relief from the legal industry in the face of burdensome expenses, the insurance industry saw legal expenses as a distinct problem and began seeking solutions through a tangible legal fee reduction process, a process which continues to be developed with snowballing profundity.

While the companies had to react to economic downturns, they made debilitating mistakes threatening their own survival, including the dismissal of some of their most experienced claims technicians through "right sizing" maneuvers. With the legal profession making no positive moves to help, expenses soared and insurance companies became increasingly dissatisfied with the fact that so much money was being spent to defend cases with only a handful of them actually being resolved by trials. If such a high ratio of cases settled, why was so much money necessary for preparing the associated defenses? While this difficult situation was no doubt caused equally by the companies and their outside counsel, it was the insurance industry that made the most drastic moves to stop it. Now, over a decade later, the situation does not seem to have changed all that much on the bottom line.

During the past fifteen years, the most popular insurance buzzwords have been "cost containment", "litigation management", "re-engineering" and more recently, "legal audits". These are all management terms which continue to be popularly tossed around the insurance industry. In fact, their usage is so widespread it is easy to discern that, to a certain degree, many casualty companies are consubstantial in their thought processes. This trendiness makes them somewhat more predictable than their outside counsel, a fact which could benefit an alert law firm seeking to increase its business. In attempting to treat the problem of uncontrolled legal expenses, the competitiveness of insurance companies has shown through very conspicuously. Now, companies seem to be in a race to see which can viably market itself as the best at containing costs, the best at "managing" litigation, the most proficient at re-engineering itself to maximum levels of efficiency and the most aggressive at reducing costs. Only in the past few years has the legal industry finally begun to show off its marketing savvy, which centers around their clients' expense problems.

Approximately thirty years ago, outside defense lawyers began charging for their services by the hour. Approximately twenty-five years ago, some parties insisted on it. Finally, approximately twenty years ago, hourly billing had essentially gained universal acceptance by the insurance industry as the proper billing method for defense firms. The motivation behind the movement from value to hourly billing methods is immaterial because when the transformation was complete, no one was overly dissatisfied. Lawyers saw hourly billing as a way to show off how much work really went into defending a lawsuit, while the insurance industry saw it as a way to make lawyers accountable and force them into reasonable billing habits.

Although neither industry completely understood the other, by the time hourly billing was firmly entrenched, the insurance industry's satisfaction with it foreshadowed future events and the present predicament. Insurance companies' penchant for regulation is a characteristic that has been consistently demonstrated for about three hundred years and was first developed through the underwriting process. Although hourly billing is relatively very young, it has predictably become a highly problematic form of regulation, because the insurance industry is so prone to managing itself by the control of processes. During the insurance companies' financial difficulties, more emphasis began to be placed on hourly billing. This caused many defense firms to trip over their own monetary success. Had the firms been able to properly anticipate how the insurance industry would react to the declining profits of the nineteen-eighties, many of the current animosities over hourly billing may have been avoided. Hourly billing, being highly process-oriented and already in place, was an ideal mechanism for the insurance industry to use as it began its aggressive attack on reducing costs through minimizing legal fees.

As the insurance industry remains in hot pursuit of minimizing its legal expenses, it has initiated a multi-faceted strategy which, among numerous other moves, includes increasing its staff counsel operations and constantly challenging the amount of time billed by outside firms. There has been some innovation toward, and much discussion about, returning to some form of value billing. However, to many claims professionals, billing by the hour is still the best alternative because it fits in so nicely to a process-oriented management structure and has a measure of tangibility which characteristically appeals strongly to the insurance business. To a large extent, insurance companies measure results in terms of dollars spent and dollars earned. Such measurements involve simple calculations. It is much more difficult to measure the essence of good claims or legal work—how much was spent when compared to how much might have been spent.

Currently, the true disagreement between insurance companies and defense counsel is not about law firms' abilities and performance or a company's routine claims philosophies. It is about value. Firms often feel their value equates to their self-perceived quality, which can be found in their ability to dispose of cases either directly or indirectly through trial experience and reputation. On the other hand, because insurance companies grant all authorities and believe that any firm can reasonably settle most cases, they do not see these qualities as creating any particular value, except one which is secondary to measured costs. There can be a glaring difference between quality and cost. For a true value to exist, there needs to be a recognizable balance between the two. The problem is in blending them to create that balance.

Characteristically, hourly billing has tremendous accounting and communication benefits. However, if a law firm structures its practice around billing formats, or perhaps includes billed time production in its performance criteria, an insurance client can become very confused when trying to figure out where or how quality and cost are tethered. Conversely, too much reliance by an insurance company on hourly billing as a post-activity monitor can prevent, rather than promote, any balance between quality and cost. In either instance, values of legal services are not detectable, because the respective focuses are all wrong.

It is the intangibility of savings that has caused insurance professionals to shy away from seriously considering billing alternatives which rely on the assessment of probable values. While claims professionals make such evaluations relating to indemnity on virtually every case they handle, there is continued reluctance to apply the same principles to legal expenses, partly because they are not required to and partly because they have not yet acquired a comfort level with what constitutes a good deal in the expense area. In the meantime, while current billing methods continue to offer the tangibility that companies like, the aggressiveness of the industry mounts constantly, mostly through increasing and refining procedures designed to control the billable hour. Most insurance companies have produced sophisticated billing guidelines which become continuously more complex and restrictive. In many respects, "litigation management" has become retrospective, a fact supported by the increased use of legal expense audits which have now become commonplace.

With the availability of cost containment programs including audits, some insurance companies insist on defining legal expense savings as the difference between how much was billed and how much was paid on a given case. As soft as these savings may be, they are still measurable, and as long as some form of savings are possible through current methods, an insurance company is not likely to abandon or alter its processes. The relationship between the insurance and legal industries has already deteriorated to an alarming degree and will continue to suffer because of the numerous (and supposed) cost saving tactics, many of them artificially intelligent, being used by insurance companies. Continued mistrust of one another, which happens to be a major by-product of the billable hour, will continue to increase steadily until and unless better understandings are reached. Obviously, this can only occur through genuine communication and a diminishment of gamesmanship.

Is hourly billing working? The way it stands now, the legal and insurance industries feel cheated by one another and cannot seem to stop posturing long enough to find solutions which serve mutual benefits. So, candidly, hourly billing is probably not working at all, at least not to an extent that promotes the necessary recognition of value. And while insurance companies continue to fool themselves into believing calculated procedures always achieve their intended results, the arrogance of their "get tough" policies seems to blind them from a critical fact: if a firm, independent from technical accomplishment, is motivated to churn out unjustified profits, or if it has a propensity to overbill, all the procedures and billing rules conceivable will not contain their costs. For such a firm, it does not take long to figure out where their activities are program detectable, making a redirection toward continued over-billing simple. Relatively, not many such firms exist, certainly not to the degree some officious insurance professionals and members of the press would have everyone believe. Unfortunately, however, a few do exist. And as long as they do, insurance companies find it easy to suspect, but difficult to know, exactly who they are, particularly because of the universal effects and perceptions created by hourly billing and associated audits.

The essence of the relationship formed by an insured, selected outside counsel and an insurance carrier is dynamic and not easily subject to definition. Unfortunately, this relationship may not produce any type of automatic alliance because, at best, it is forced to exist by an insurance contract. For years, legal ethics committees have debated the subject. Although each member of the firm/company relationship has some type of duty or responsibility to one another, this partnership, which is created by the filing of a lawsuit, is rife with potential conflicts, the most significant of which is control. From a practical sense, the question becomes "control of what"?

From the insurer's point of view, an insured pays a premium to an insurance carrier. When a lawsuit is filed that prays for monetary damages, the insurance carrier is pays lawyers to defend the suit, pays for other expenses and pays for settlements and verdicts. The defense firm collects a fee. Money could be considered to be the bottom line. To make matters worse, cynicism gives insurance companies tunnel vision of the fact that defense lawyers are the only participants in a lawsuit who are virtually guaranteed of not losing money and are instead assured of making a profit. If not for the money it had to spend for both indemnity and legal expense, the insurance carriers surely would be indifferent to the activities in which lawyers become engaged. Although attorneys are expected to conduct themselves in a professional manner, while insurance companies act in good faith and insureds cooperate, were it not for the money at risk, any misbehavior could be easily overlooked. The struggle over control really is all about money.

Defense guidelines are categorically necessary to claims professionals for communication and control, particularly in view of a high volume of suits which are diverse in size and type. Again, considering the common characteristics of insurance companies, cost containment and litigation management start with rules and procedures designed to help accomplish, or at least monitor progress toward, a goal. Having been forced to operate under guidelines, an attorney is placed in a most difficult position when the goals of the insured and insurance company are different. For example, in a given lawsuit, the goal of a manufacturer could be to preserve the integrity of a product no matter what the legal cost, while the insurance company has a goal to resolve the case for the least amount of money. This type of problem, and any number of other scenarios, is commonplace in the tripartite relationship. When the goals of the insured and insurer are the same, following guidelines is more palatable for the attorney, albeit even then there potentially exists a situation in which the attorney agrees with neither.

That guidelines are long-term, if not permanent, is probable. Providing the guidelines is the insurance industry's attempt to underwrite a result, which realistically is impossible given the innate divergency of litigation. More often than not all parties to the tripartite relationship legitimately want to live up to their prescribed duties, but defense guidelines may serve as a stumbling block, a fact which does not and should not diminish their necessity or effectiveness. There is no question that outside counsel guidelines have ethical and malpractice aspects. By no means does this render them worthless.

As written, outside counsel guidelines were never intended to have ethical or malpractice aspects or to hamstring attorneys. Most guidelines do or should include some type of disclaimer that defines them as such. Absent a complete understanding of the realities associated with forcing compliance on the one hand or undertaking to comply on the other, the results hoped for will never be realized and polarization on the issue will intensify. To work through the many inherent problems caused by outside counsel guidelines, defense attorneys must recognize and insurance companies must admit the presuppositions which are made at the time they are established.

The gist of outside counsel guidelines is clear and reasonable. It is their application that tends to muddle things.

When constructing guidelines, insurance companies remain true to their character by venturing to create a result through a detailed process, but this type of micromanagement cannot be totally successful unless circumstances are exactly consistent with perceptions. It is not the legitimacy of outside counsel guidelines that is being tested here, rather this is a commentary on what does or can happen if conditions are less than ideal. When presuppositions are inaccurate, an attorney who rotely follows insurance company guidelines has an enormously increased chance of committing malpractice, violating a code of ethics or breaching a professional responsibility.

When creating outside counsel guidelines, insurance companies presuppose that:

1. the authors of the guidelines are qualified to produce them;
2. the guidelines do not stifle creative thinking;
3. all attorneys have a propensity to perform unnecessary work;
4. the company will fulfill its own responsibilities described or inferred by the guidelines;
5. the guidelines will produce a savings by lowering legal expenses or producing quicker resolutions;
6. the work habits, personalities, capabilities and structure of all attorneys and firms are the same; and
7. attorneys do not recognize a fiduciary duty to the company.

Insurance companies may presuppose that the authors of the guidelines are qualified to produce them. Insurance companies are big on committees and thinking procedural things through with painful and cautious slowness. Only those qualified to write guidelines, at least in the opinion of the company, will be called upon to establish them. Therefore, along with what is legally acceptable on the surface, it is presupposed that guidelines are predicated on apropos experiences, both good and bad, of their authors. If unqualified input is allowed to infiltrate, which easily happens in a committee process, problems are spontaneous because the guidelines have rudimentary flaws.

Insurance companies may presuppose that the guidelines do not stifle creative thinking. Insurance companies expect their pure technicians, commonly the type which would handle litigation, to rely upon experience and know how while tending to a lawsuit and dealing with defense attorneys. However, the companies also typically are highly structured with individual performance monitors deeply emplaced. Too often, substance becomes secondary to form. If a company is inclined to base merit increases and performance appraisals largely on how well an employee complied with procedures, the natural tendency of even the most accomplished technicians will be to follow procedure first; do the right thing second. This is how general guidelines become rigid and axiomatic.

Insurance companies may presuppose that all attorneys have a propensity to perform unnecessary work. Guidelines typically anticipate that lawyers automatically overkill issues and overuse the legal process, which is not necessarily true. The difference in the background of lawyers and claims professionals may stand out the most in this area, however. Lawyers are trained to find and consider every possible detail, whereas claims professionals are trained to be thorough, but pragmatic. What is viewed as necessary, unnecessary or reasonable is different depending on who is making the judgment and in what context.

Insurance companies may presuppose that the company will fulfill its own responsibilities described or inferred by the guidelines. For an attorney, this surely must be the most frustrating of all presuppositions. It also is the largest contributor to mixed messages and confusion. True, guidelines are somewhat different, but to varying degrees all of them contain a certain amount of restrictive language such as, " . . . without first obtaining authority to do so," "We won't pay for . . . ," and " . . . are not permitted to . . . " If a company requires an attorney to obtain permission before proceeding with something he or she plans to do, it must ensure that a staff is available to discuss and provide authority. Frequently, over long periods of time, attorneys are forced to contend with unanswered letters and phone calls requesting authority in accordance with guidelines. The assumption that the claims staff is living up to its explicit or implied promise to provide or deny authority within a reasonable time is simply, in some cases, inaccurate. In today's environment, this is where the insurance industry is tripping the most over its own re-engineered "efficiencies." A company failing to meet its own requirements in the overall control process places an attorney who wants to properly serve the insured and insurance company in jeopardy.

Insurance companies may presuppose that the guidelines will produce a savings by lowering legal expenses or producing quicker resolutions. The design of guidelines is apparent. Reporting requirements seek to keep claims technicians informed, thereby affording them an opportunity to evaluate cases and reserves on an ongoing basis. Restrictions on activity attempt to control costs by lowering expenses and/or giving the insurance company an opportunity to dispose of a case as soon as possible. Speed of resolution serves the two-fold purpose of stopping expense and producing lower settlements. Remembering that'the nature of insurance companies is to blindly follow their own procedures, many guidelines actually accomplish a reverse result in a broad sense. In effect, on a given case, a lawyer may be procedurally required to undertake cost-incurring activities which would have been avoided but for the guidelines themselves. One of numerous examples serves to illustrate this problem: many companies take the position that they simply will not pay for intraoffice conferences, when in fact a conference may have been the very thing which would have produced a lower amount of time or quicker, better result.

Insurance companies may presuppose that the work habits, personalities, capabilities and structure of all attorneys and firms are the same. The only chance for a guideline to serve a meaningful purpose is for it to uniformly apply. In analyzing any set of guidelines, the presupposition'that all attorneys in all firms will be affected similarly becomes clear. This likely is an inaccurate assumption, because the structure and organization of law firms are very diverse and no two lawyers function exactly the same. The point is, a requirement will not necessarily be carried out with equivalence by different attorneys or firms. For example, instructing attorneys to provide a thirty-day status report will bring a one-line, "nothing to report" letter from one attorney and a twelve-page dissertation from another on virtually the same case.

Insurance companies may presuppose that attorneys do not recognize a fiduciary duty to the company. There is a perception that attorneys do not recognize any obligation to help the insurance company control costs or save money. As with the other presuppositions, this is not absolutely true, especially now that attorneys are more fixed on cost sensitivities and need to market themselves as such. As a whole, defense attorneys may be blamed for this assumption in both past and present habits and developments. Historically, there was a rather widespread attitude which not only approached high-handedness, but also abruptly dismissed potential learning discussions about expense management. Attorneys simply won out in disagreements by reiterating that the insured, not the insurance company, was their client. In today's market, sophisticated underwriting alternatives, such as retro-rated, large deductible and retention policies have reinforced direct client-attorney allegiances by shifting bottom line financial results more to the insured. In the meantime, claims technicians have not been relieved of their own responsibilities to control costs. While most outside defense attorneys work hard at fulfilling their fiduciary duties to both their client and the companies, it is easy to see how the issue has worn thin on the insurance industry over time.

Outside counsel guidelines have ethical and malpractice aspects, but they should not be eliminated. There is a legitimacy to them which cannot be overlooked. The years of insurance companies paying high and annually escalating legal expenses, while experiencing flat or worsening indemnity results, have taken their toll with tremendous impact. If the insurance and legal industries can simply admit they contributed equally to the problem, ethical and malpractice aspects of outside counsel guidelines can be overcome.

The creation, implementation and enforcement of litigation and billing guidelines were chronological predecessors to the more technologically advanced era in which companies and attorneys alike now exist. This advancement has been rapid and, with continuing improvements in computer capabilities, becomes more complex daily.

Virtually all insurance company audit processes had their beginnings in some form of litigation guidelines. When the mass movement toward published guidelines first began, the companies were still trying to manage cases individually— the way it had been before and should be today. But principles learned and billing abuses uncovered during that phase of transition suggested that certain cost categorizations pertaining to a universe of lawsuits could be harnessed and controlled. Insofar as the companies were concerned, these categorizations primarily split measurements of litigation success into two definable areas—quality of "defense" and billing—both from cost perspectives on the bottom line. While continuing to be directly related, even derivative of one another, these two areas began to be scrutinized separately by insurance companies. To address both issues with equal levels of control, the companies started producing guidelines in two segments, one part for the handling of a lawsuit, the other to directly address billing parameters and tolerances.

The first company specializing in legal bill audits came on the scene in 1987 with its first competitor being formed shortly thereafter. Their insights and services were timely for the insurance industry, which essentially thought it had discovered a new science but did not know how to develop it or even what to do with it. Insisting upon reducing high legal fees that guidelines were supposed to control, but did not, the insurance companies found the audit companies' methods to be irresistibly appealing. They thought their plateau of infallibility on legal billing arguments had finally been reached. Since the first two emerged eleven years ago many, possibly hundreds, of similar companies have cropped up around the country, and the legal bill auditing industry is doing well.

While the link between guidelines and audits is irrefutable and irrevocable, through a combination of diminished technical talent, using "cost management" as a competitive tool, being endeared to processes and having audit services readily available, the insurance industry's most rigorous efforts in litigation are now primarily aimed at legal costs. Essentially all insurance companies have adopted some type of legal audit procedures. Some attempt to be more comprehensive and fall more in line with traditional file supervision and case evaluation practices than others. It is also safe to say that all companies have reached and routinely rely upon higher levels of computerization and that most have incorporated computers into their audit processes in some fashion, either in-house or through one of the auditing companies.

One of the pitfalls of placing so much emphasis on costs as a "stand alone" issue is that some litigation supervisors at an insurance company level may develop tunnel vision, which in turn would have a direct impact on technical decisions. That is, priorities for granting authorities to firms for activities necessary to an insured's defense could get turned upside down by considering the cost first and strategic benefits second. Conversely and maybe worse, an overworked, lazy or ineffective litigation handler may find too much comfort in knowing that an audit company will review the legal fees and as a result not sufficiently consider legal costs when making decisions. Under the first scenario, firms are forced to fight with an insurer to perform well for their clients and be assured payment for their services. Under the latter, firms proceed with recommended activities or to carry out instructions only to find out, after the fact, that the company wants to pay a fraction of resulting fees. It is easy to see how confused a firm can be, even when they have advanced notice of billing restrictions and boundaries.

Now a question of ethics arises about audits. Insurance companies take the unwavering position that audits are not unethical in any way. But lawyers have been strengthened over a couple of recent cases that suggest there may be an ethics issue tied to audits. Although the case facts are too different from current issues for a precedent to be declared, on the strength of these cases, some attorneys are contending that providing billing details to outside auditors is in fact a disclosure that may constitute a waiver and become discoverable. There do not seem to be clear and fast cases on point—with insurance companies auditing legal bills or having them audited by a third party. With sensitivities heightened, the issue has ripened to heated argument at stages. The conflict continues, and even more polarization than that which occurred on guideline issues may be expected.

While the topics of privilege and confidentiality will no doubt lead the charge for attorneys as they try to convince courts that audits are unethical, they should take care to not miss the point again. Unethical practices simply do not occur solely as a result of a structure or interpretation. Lawyers know it and so does everyone else. Realistically, audits are no more inherently unethical than a defense attorney talking to a plaintiffs attorney. And as the debate expands, insurance companies now see defense attorneys as generally hiding behind ethical issues to engage in the unethical practice of overbilling. Frankly, the energies being put into the prevention of audits by some firms alone make them suspect.

It is estimated that the insurance industry is spending over $25 billion annually on legal services. In fairness, insurance companies surely have a right to scrutinize the work and billing of their defense counsel. Some would say they have gone too far with their tactics. The most popular and expedient form of audits being utilized today is the computerized bill review process. Unfortunately, the relatively rapid development and success of these processes has resulted in a level of computer "sophistication," which is often over-applied, artificially intelligent and sometimes downright insulting to attorneys.

Frankness is the key to the type of communication that is now necessary before the problem gets any worse. Attorneys need to accept that billing abuses in their profession are real and commonplace even though they, themselves, are free of guilt and in no way the culprit here. The legal profession tends to be a stubborn one and has continued to make statements such as, "expensive but good." Insurance companies, on the other hand, need to be cognizant of the facts that they may not be delivering on guideline promises, a widespread procedure may not properly treat a given situation, and they may be making the standard for fair billing too difficult for the firms to achieve.

Since guidelines and audits are here to stay, something positive may as well come from them beyond companies riding herd over their chosen counsel. Working together should be the primary challenge to attorneys and insurance companies who genuinely want to smooth out relationships. But as alluring and pleasant as this seems, true accord will not be reached until harsher alternative challenges are considered, with insurance companies abandoning untrustworthy counsel and counsel abandoning an oppressive or mischievous insurance carrier client. Hopefully, the most commonly accepted solution is to work together. But if this simply is not a viable possibility, counsel and companies alike should have the wherewithal to pursue alternatives. In any case, professional codes cannot allow squabbles or ill feelings to supplant absolute responsibilities. Above all, cooperative lawyers and claims professionals can ensure that neither outside counsel guidelines nor audits are the cause of ill feelings (unless a dispute created by them results in a law firm taking measures to disguise billings).

It may well be that insurance companies will need to soften their bill reduction tactics before anything can be worked out. Law firms may wind up developing a litigation strategy to limit the control currently imposed by guidelines and audits. One solution, set forth herein, is to provide concurrent monitoring of the legal services/litigation process. Computer networks, such as the Internet, can provide the medium by which such a shared system could be established, developed and maintained.

SUMMARY OF THE INVENTION

The present invention provides an Internet method and system for managing litigation from start to finish while resulting in comprehensive bills to clients and insurance companies who are responsible for paying law firms for their legal services. The present invention equally supports defense firms, their clients and insurance carriers. The method incorporates lawsuit planning, front end cost estimating, individual work budgeting, case staffing, case progress, time and fee accountability, guideline compliance, prioritization of work, maximized spontaneous communication on specific work items, isolation of fees, isolation of expenses and billing in a total package for all managers of litigation. The method and system account for time and fees according to work products and eliminate disconnected chronologies of activity and time itemizations in bills.

A work product in a lawsuit being defended by a law firm is any individual legal instrument, legal maneuver or legal procedure performed, produced or completed by the firm for which a fee can be charged. Such work products form a core element of the present invention. Legal fees result from a series or combination of activities and work components that support or make up the work product. The present method specifically avoids task number coding and is based on the segmentation, identification and time management of the individual work products which combine to make up a whole legal case. The method provides pre-defined utilization lists of probable work products, their descriptions and activity descriptions, but is also flexible so that written descriptions can be used in lieu of listed items. The system prohibits forced distribution of work products or activity descriptions so that data and communicative characteristics are accurate and maximized.

The method allows and encourages narrative explanation for each work product established on a case by containing data base text fields for specific work descriptions and specific references. The system is utilized by the firms and the individuals to whom they are reporting for spontaneous and immediate electronic communication through the Internet. Work products are established, budgeted for and managed during case development. The method eliminates the need for after-the-fact auditing of legal bills. The method allows for carrier guidelines to be directly incorporated into the system, via programmed alerts, to maximize guideline compliance. The system enables interim payments to be made by producing detailed legal bills for completed work products that have been pre-communicated to clients/carriers. The system allows all users to view and measure incurred fees and expenses while they are accumulating and before actual bills are submitted for payment.

The method contemporaneously informs law firm managers and the bill payers about case legal fee exposures and accruals allowing for progressive adjustments and communication on specific items, by providing automatic and continuous summaries that calculate and report time, fees and expenses for each case, each product, and each timekeeper. Bills are electronically submitted (as by e-mail) or may be submitted by alternate means such as regular mail or via FAX. The system provides budget alerts to enhance communication and management of each work product.

The system also produces comprehensive cost and efficiency management reports for both the law firms and the insurance carriers that pay their bills. The reports cover a wide variety of critical factors and cost and efficiency elements including, but not limited to, categorized work products, individual timekeepers, individual firms, groups of cases, groups of firms, averages for fees, expenses and total costs. The management and billing method is supported and operated by a software program for individual case and daily entry, summary and communication over the Internet, and by a software program for management information reports.

The method and system software can be utilized by any subscriber to any Internet service provider (ISP). Users primarily will be law firms that specialize in defending lawsuits and their client representatives or insurance carriers who are responsible for payment of legal fees. Communication, case reporting and fee bill development is performed online. With customization, the invention may also be used by any other service person or organization who charges for services on an hourly basis. Security, such as encryption or secure sockets layer (SSL) can provide the reasonable expectation of privacy demanded by private financial transactions.

OBJECTS OF THE INVENTION

It is an object of the present invention to provide a sharable billing and review system.

It is an object of the present invention to provide such a sharable system that is available as widely as possible.

It is another object of the present invention to provide an Internet-based billing and review system for litigation and/or related services.

It is yet another object of the present invention to provide contemporaneous monitoring of the litigation progress via the Internet.

It is yet another object of the present invention to provide clients and/or insurance carriers means by which legal billing of budgets may be established and monitored in light of on-going billing.

These and other objects of and advantages of the present invention will be apparent from a review of the following'specification and accompanying drawings.

BRIEF DESCRIPTION OF THE DRAWINGS

FIG. 5 is a list of entries that may be used to designate main case types (first column) and case subtypes (second column).

FIG. 8 is a list of possible entries for a main work product drop-down menu, so as to keep track of legal activities.

FIG. 9 is a list of possible entries for an Activities drop-down menu aiding the tracking of legal activities.

FIG. 10 is a list of possible entries for a supporting component drop-down. menu aiding the description of work product or other related legal activities

FIGS. 13 and 14 show completely the case information fields present below the navigation bar shown in FIG. 12.

FIG. 17 is a complete text listing of the new employee entry information shown in FIG. 16.

FIG. 22 is a text and field listing of the added product information frame of FIG. 21.

FIG. 25 is a text listing of the work detail and billing screen shown in FIGS. 23 and 24.

FIG. 28 is a browser screen display of the work product billing summary.

FIG. 29 is a text listing of the work product billing summary frame partially shown in FIG. 28.

FIG. 31 is a browser frame schematic for a summary of expenses associated with a single work product.

FIG. 32 is a browser screen schematic for a summary of expenses for all work products associated with the case.

FIG. 33 is a text listing of a browser screen for work product expenses billing.

FIG. 35 is a browser screen schematic for a summary of work products by staff assignment.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The use of Web browsers for information presentation and gathering has swept through the electronic information community and, indeed, the world at large. Web page browsing has become such a standard that even large commercial entities such as Microsoft (circa Spring 1999) have adopted the Web browser standard as a core element of information presentation to and system manipulation for the user.

The use of HTML (hypertext mark-up language) is well established, and anticipated developments in the mark-up language arena (such as XML, extensible mark-up language) would be easily adaptable to the invention disclosed herein. Consequently, the data gathering and presentation techniques are believed to be known in the art. However, due to the strong demand for coordinated legal billing and budget monitoring activities over disparate geographic regions, the Internet provides the medium by which a database may be stored on a server that is readily available worldwide. Copies of such a database may also be easily made with the primacy of a single database indicated by file tags or imbedded codes. Databases of several cases can be bundled together to provide a more comprehensive database. However, it is at the case level that the present invention operates and establishes databases with respect to individual cases.

Sample HTML listings are included at the end of this Description.

Figure 1:
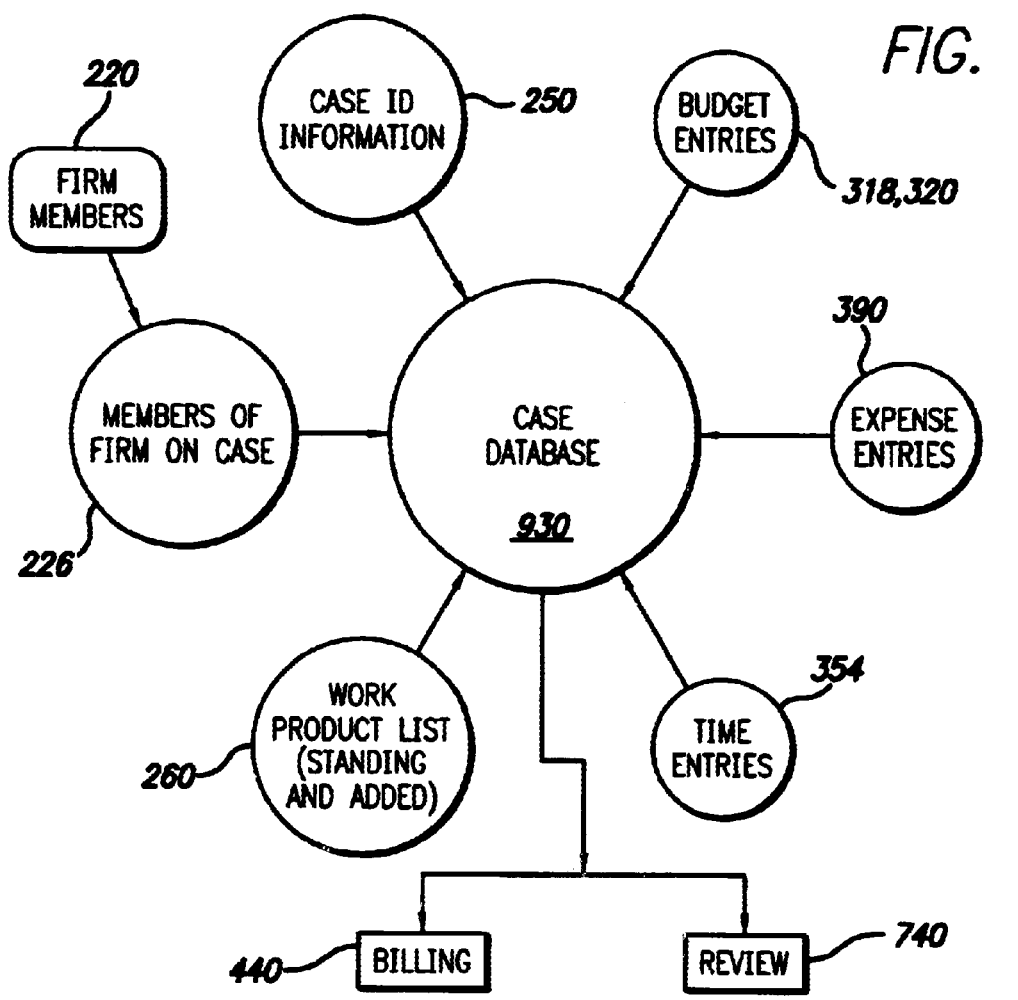
FIG. 1 is a general state or information flow diagram from a variety of sources into the case database. The information of the case database is then available for billing and/or review.

Referring now to FIG. 1, the case database 930 forms the central core into which flows information from a variety of sources. As set forth in more detail below, members of the firm on a specific case bill time and expenses and help to gauge budget parameters during the life of the case and through billing contemporaneous with activity. A list of all the members of the firm 220 may be used to provide the raw data from which the members of the firm working on a particular case 226 may be associated with entries for fields and individual records of the case database 930. For example, a firm having several hundred members may only have a team of 6–10 working on a specific case. Under such circumstances, the number of the list of firm members 220 would greatly exceed those of the list of members of the firm on the specific case 226. Case I.D information 250 is also associated with the records of entries, as are budget entries 318, 320; expense entries 390; time entries 354; and work product list items 260. Once the case database is sufficiently established, billing activities 440 and/or bill review activities 740 may take place according to the present invention.

Figure 2:
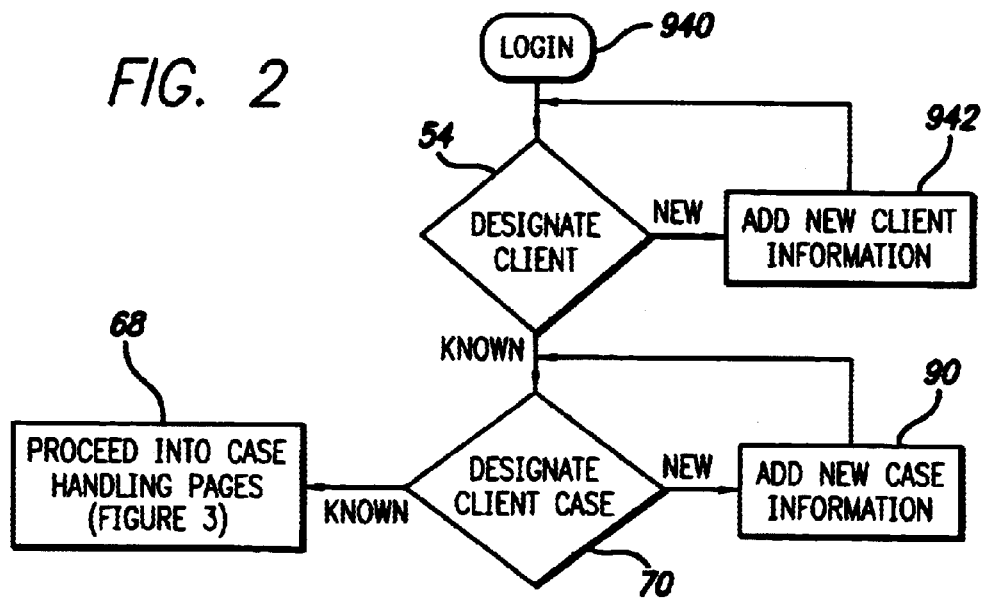
FIG. 2 is a flow diagram showing the initial designation and establishment of client and case information.
Figure 12:
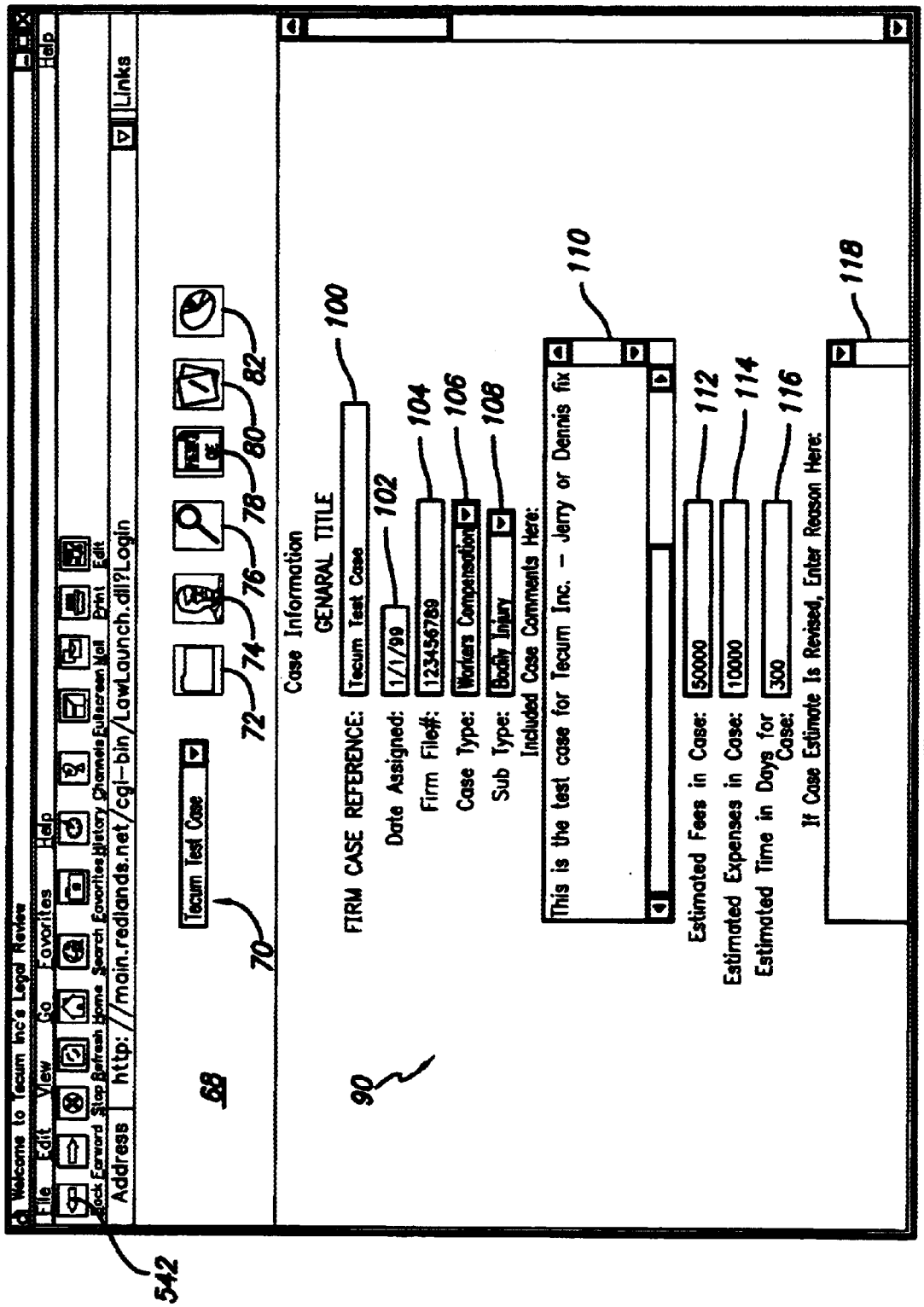
FIG. 12 is a browser screen display for the entry and editing of case information.

Referring now to FIG. 2, once an individual user, such as an attorney, logs into the system manifesting the present invention, the client may be designated 54. If the client is a new client, a new client information gathering step 942 may be initiated much in the same way as case information is gathered (set forth in more detail below), FIGS. 12–14. Once the client is known, the client's case may be designated 70, with new case information added 90 as shown in FIGS. 12–14. Once both the client and case are known, control is passed into the case handling pages 68 (FIG. 3).

Figure 3:
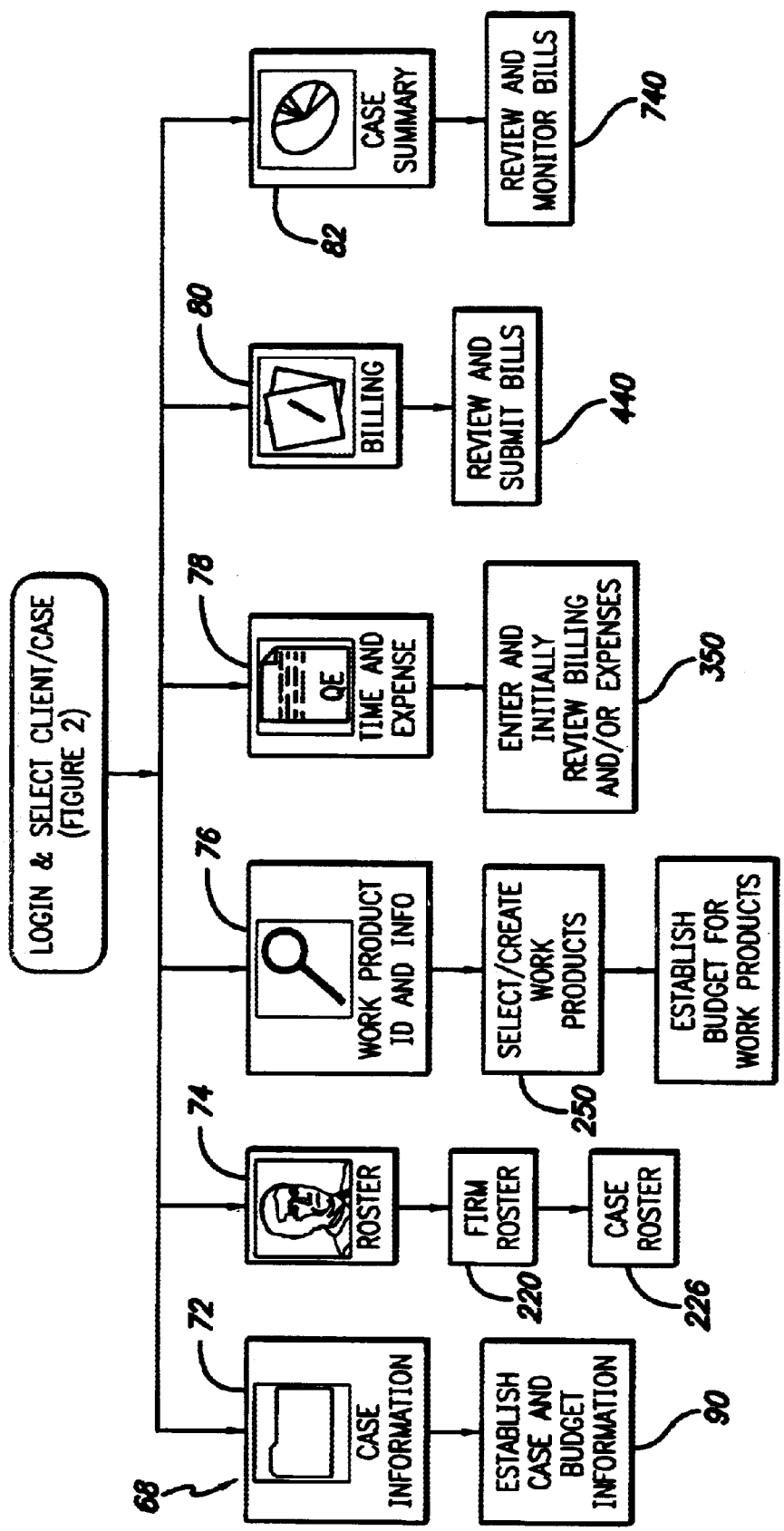
FIG. 3 is an organization chart showing in plan view the generally available options to the navigation bar for the present invention with the related and associated activities and/or information gathering or manipulating procedures.
Figure 4:
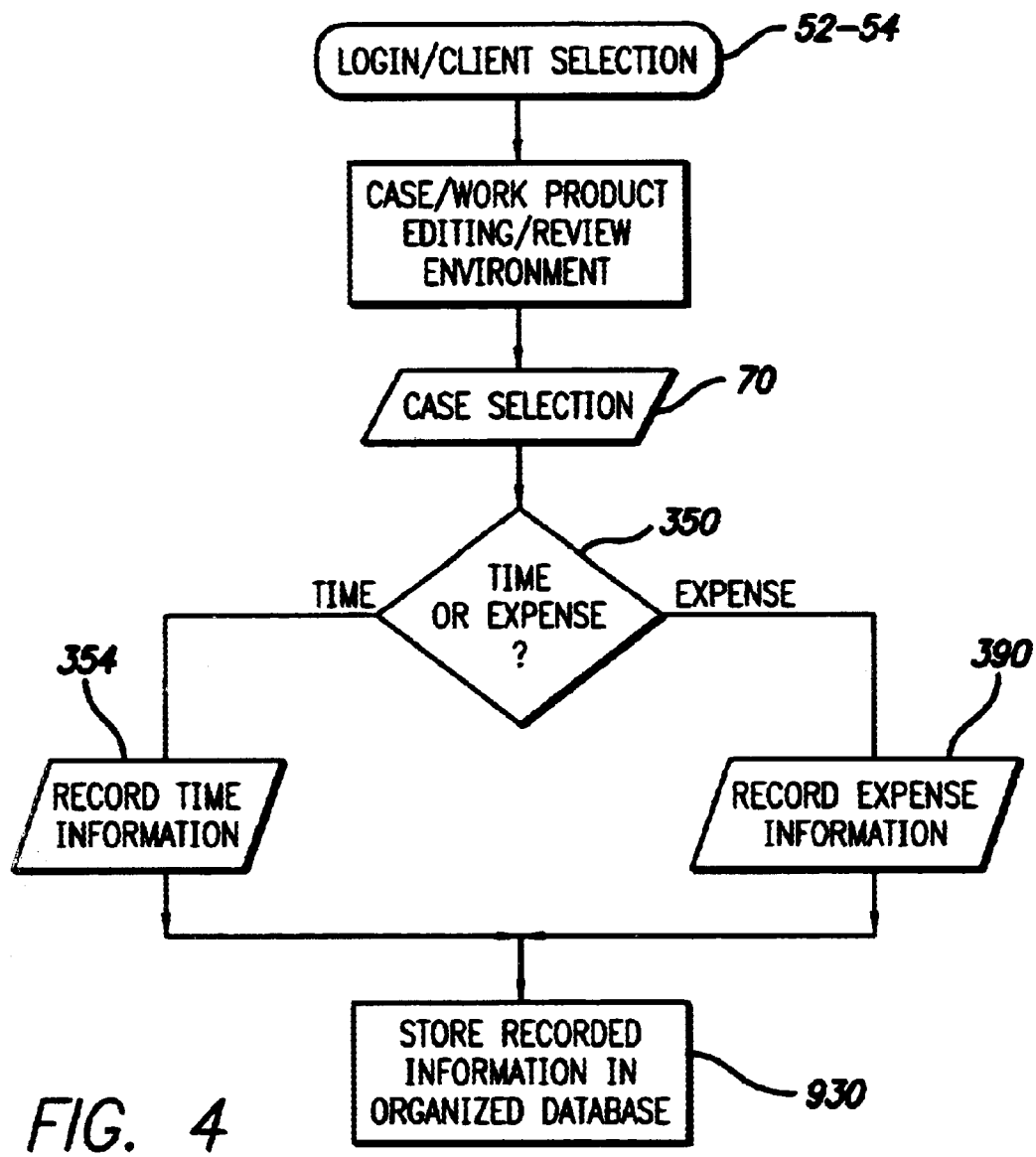
FIG. 4 is a flow chart generally indicating the steps taken in order to record time and expense information in the stored database.

FIG. 3 provides a summary indication of the navigation bar 68 and the alternative activities that are available therethrough. As the indications made in FIG. 3 are set forth in more detail below, FIG. 3 provides an excellent summary by which the description herein may be organized and understood.

Once the case information and additional bedrock or foundation information has been laid for a specific client and case, individual billing users may select a time and expense option 78 from the navigation bar 68, indicate whether or not time or expenses are to be recorded 350, and subsequently record either time 54 or expense 390 information, so that information provided through data entry fields are organized in records comprising of the case database 930.

The insurance industry and defense law firms are at great odds over the cost of litigation and the accountabilities that have become associated with it. The poor relationships that generally exist have been bred by years of mistrust and high, annually escalating legal costs. It is ironic that two industries that are categorically interdependent have so much difficulty in communicating and have created a two-way watchdog environment that tends to stifle one another. Ongoing disputes originated from and continue to be entangled in the conflict between billing and case management practices of law firms and the highly regimented regulatory culture of the insurance industry. Firms have been forced to charge for their services by the hour which, in spite of the current chaos and suspicion stemming from it, can still be the most cost efficient and fairest form of billing. In the hourly billing environment, firms continue to be expected to itemize their time with correlation to individual task descriptions, and bills are accordingly produced to parties responsible for payment.

Different sources estimate that insurance companies are spending between $25 and $32 billion annually, so the insurance industry has become an advocate for reducing legal costs. Their response to high costs has been generally to assume that all attorneys are seeking windfall, even fraudulent profits. To combat rising costs, many companies have enlisted the services of legal bill review companies. These companies contract with an insurance carrier to "detect" billing abuses and excessiveness in legal bills and to make downward adjustments of the bills when "overruling" or "unexplained" billing is found. The bill review companies utilize software that offer artificial intelligence, but cannot comprehensively understand the development of the case behind the legal fees being billed. Reductions then have a tendency to be predetermined, presupposed and perpetual, if for no other reason, because of the sheer complexity and diversity of litigation. Legal bill review companies are now processing literally thousands of bills each month for insurance carriers, and the business has reached multi-million dollar levels.

A collection of various billing review software that are conceptually similar generally forces law firms into a task-based coding process that consumes time without recompense. Firms have become bitter over having bills reduced repeatedly, even after expending much energy and time in their attempts to comply with insurance company billing guidelines and the parameters set out by the legal bill review companies. In fact, often the guidelines have become the billing criteria used by the review companies in custom programming their software. Conversely and perhaps worse, billing criteria has invaded or certainly influenced some case handling guidelines. The firms are in a particularly difficult position, partly because they are attempting to operate under a different set of "rules" for each of its business sources, in terms of billing, when their primary focus and obligation rightfully is or should be to defend a client to the best of their ability, not to follow a maze and hodgepodge of restrictive, punitive and prescribed guidelines and rules.

The firms have fought back by raising ethical arguments against guidelines and legal bill reviews or audits. Several states have formed ethics task force committees on the issues, and it appears that the insurance defense industry is posturing to launch a barrage of litigation of its own to force the issues once and for all. The insurance industry remains unbending and maybe even stiffening.

As it relates to tort and other civil litigation, the relationship between insurance carriers and law firms has been forced to exist through insurance contracts which may ultimately serve as the single reason there will never be a meeting of the minds on billing and guideline issues unless some alternate billing, communication and case management methods are sought and utilized. Historically, the standard tripartite relationship which consists of the defense firm, the client and the insurance carrier has been the subject matter of many ethical disputes. But the relationship has continued to survive, and even thrived at times, at least until current billing problems entered as what seems to be an irreversible stumbling block. Although severely damaged, the relationship as a whole has continued to exist because there is a lot of money to be made by the insurance defense industry through its insurance company sources, and there will be as long as insurance policies are sold. While loyalties toward the legal profession have become seemingly nonexistent, the insurance industry will continue to seek out any firm that is willing to abide by their guidelines and put up with retro-adjustments to their bills, and with the population of attorneys constantly increasing, the insurance industry likely will never be left in a total lurch. It is also a wealthy industry which stands as ready to fight as its defense attorney counterparts. But this type of polarization is exactly what is impeding progress toward improvement, both of the relationship and cross practices.

The effects being felt and mistakes being made by the legal defense industry currently include: having in its ranks firms and attorneys who overbill because of out-of-control profit motivation or inefficiencies; intentionally overbilling; mismanaging lawsuits in terms of pursuing expedient resolutions; hyper-competing to keep demanding or problem carriers as a business source solely because of volume; showing a willingness to become deeply involved in ethical arguments and/or active movements to resist moves by the insurance industry that are in reality nothing more than overzealous management; being satisfied with billing by the hour because the more inefficient a firm is, the greater their potential profit may become; and figuring out where cuts are being made and force fitting spent hours into substitute areas for billing purposes.

Mistakes being made by the insurance industry include: over-estimating the effectiveness of their litigation management endeavors; trying to force law firms into unprofitable situations with muscle-flexing and threats; putting firms in situations that cause them to choose between their own professional judgment and unreasonable billing guidelines and restrictions; not recognizing the good firms and lumping them in with the bad; as respects legal expenses, misdefining the term "savings" as the difference between an amount billed and the amount paid on a legal bill; utilizing too many inexperienced handlers of litigation who follow rules, but are not much at original thinking; trying to oversimplify litigation and its effects on billing; not recognizing a good deal when they are getting one by placing form over substance; trying to create on big conglomerate result by being more involved in tail end management than in creating results through individual case management; and employing daily practices through individuals that conflict with their own philosophies and guidelines.

Clients are generally caught in the middle, but they make their own mistakes. There are two different types of clients that firms typically deal with in tort litigation: a) the large, self-insured client that is actively involved or in control of litigation, at least to certain levels of monetary exposure; and b) the more routine and often less sophisticated client who is produced by traditional insurance coverages, namely an individual or entity that could care less who their defense attorneys, assigned by the insurance carrier, are or what they do so long as "protection" under their insurance policy remains intact. Some self insureds or other clients who control litigation and are left with the responsibility to pay legal fees often make mistakes by: never questioning the practices or performance of their selected firms; typically paying hourly rates that are higher than necessary in a highly competitive market; and placing too much stock in their own business by not realizing the monetary benefits of quick resolutions to lawsuits. The less sophisticated clients err, because they do not feel comfortable or qualified to go against what an insurance company says. They will not often become involved in their own case to an extent they demand a particular legal service be provided when the firm says it is needed and the carrier says it is not, and usually abide by the insurance company's recommendation for fear of not having the legal services paid for if they do not.

Together, all parties to the tripartite relationship have failed to keep up with the evolution that now confronts them, which in large part has been driven by disassociated technological movements. They have not found a technology that solves their problems, but they have found plenty that creates problems or heightens those that already exist. They do not understand one another and really are completely engrossed in too many superficial cross problems that never reach the heart of the problems. What is needed to return the relationship to workability and a lost level of healthiness is a technology that brings them back together, because it promotes rather than forces guideline compliance and reinforces the fact that cost containment is a product of good management and communication and not a thing in and of itself.

The present invention has been developed to directly address the current problems and misunderstandings between law firms, the insurance companies and direct clients, while resulting in fairer, more comprehensive billing practices. The invention directly eliminates post-billing disputes and unfairness, increases case-to-case communication to levels never before realized, forces front end management and communication by all interested parties, eliminates the need for arbitrary or unilateral after-the-fact bill reductions, and increases understanding of a given lawsuit, its anatomy and possible uniqueness. The invention allows insurance carriers to be involved in the litigation process more than ever, thereby controlling the costs more effectively while creating cost avoidance by agreement as a truer "savings" than retro adjustments, and it allows law firms to manage themselves in ways never before possible while keeping their business sources satisfied.

Bills as currently submitted are periodic lists of activities in a chronological order, which are intended to serve accountability and reconciliation purposes. The formats are exactly what the carriers have requested, because they are the best methods of what has been known up to this point. What a bill reviewer is provided, however, is long and short descriptions of activities that are strictly chronological and lack meaning. The only questions then that are typically being asked relate to single billing entries with single time attachments. Bills are nothing more than post activity lists which, as currently structured, explain very little about what a case was about or why billing entries were made. Task-based billing programs attempt to close the gaps by force, distributing activities into set categories, but the distribution methods are flawed, time consuming and problematic which causes inaccurate information to be developed. A greater problem is that coded billing methods are aimed straight at billing with limited, mostly innocuous management information resulting.

Because of the nearly universal reliance upon technology, there is a marked need for technology that combines lawsuit planning, budgeting, managing, communicating, and billing into a single productive, relationship-building package. The present invention accomplishes that by including all the elements and giving all involved parties what they need through segmenting activities and accountabilities into the specific and separate work products which are established in any lawsuit. It provides uniform disciplines, support and assistance for each member of the tripartite relationship. A bill on any case can only be produced through communication and planning and will never come as a surprise to anyone. The spontaneous review features, enhanced by Internet delivery, of the method will serve to remove current barriers and pave the way for synchronizing defense firms with each of its clients and insurance company lawsuit co-managers without reinforcing any of the ethical problems that come from the disjointed case handling, guideline and billing practices as currently known.

Figure 11:
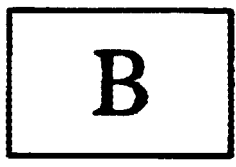
FIG. 11 is a Web page display of an initial login screen.

After the user has entered the proper user identification 50, password 52 and client 54 (FIG. 11), the initial screen is displayed. At the top of the frame of each system screen is the navigation bar 68 (FIG. 12), which never disappears while using is the system for any of its functions. All pages where data entry takes place load up below the top frame. Consequently, a uniform presentation is made, allowing both the novice and experienced user to avail themselves of the features provided by the present invention.

The Navigation Bar 68 appears throughout the process and is available for use at all times. It has six buttons which, by simply clicking the mouse on the appropriate symbol, enable the user to go directly to a page to perform a particular action. Balloon descriptions of each symbol may be shown when the cursor hovers over the icon and help the user determine which button should be selected for a desired action. The buttons may be as follows. The first button 72 accesses the Case Information section and may be labeled by a manila folder. The second button 74 accesses the law firm member-employee Roster Section and may be labeled by the bust of a man. The third button 76 accesses the Work Product Identification and Information section and may be labeled by a legal pad and pen or by a magnifying glass. The fourth button 78 accesses the Work Detail and Time Entries and Itemizations Charged and may be labeled by a calculator or by a dog-eared page with the letters "QE" prominently displayed. The fifth button 80 accesses the Work Product. Billing section and may be labeled by a magnifying glass. The sixth and last button 82 accesses the Whole Case Summary section and may be labeled by a pie chart.

The data field elements and frames containing such fields used to achieve the present invention are set forth in individual detail below. The description generally follows the icon order (left to right) of the icons in the navigation bar. Initial capitalization of certain terms is used to indicate particular relevance to the method of the present invention. The database used to store the entered information may be generically structured and allow access by a variety of relational database programs such as FOXPRO, ACCESS, EXCEL, etc. An ASCII or comma-delimited data structure may provide a sufficient foundation.

Once the initial login occurs, both the user (and the firm) as well as the client are determined. A case of that client must now be selected. A list of existing cases is visible on all screens where choosing an "Existing Case" takes place. If an entry is needed for a new case that is not yet available on the drop-down menu of cases 70 at the top of the page, the new case may be inserted by simply selecting the provided "new" option and adding the case to the drop-down list.

The Case Information page 90 (FIGS. 12–14) gathers relevant information concerning a lawsuit, or case, being handled by the user law firm and being put into the litigation management system of the present invention. While the fields are editable, most of the information on this page remains unchanged throughout the duration of the case. A few of the fields, however, may be changed as information about the case develops and/or as the lawsuit progresses. The user scrolls from the top of the page to bottom in a manner known in the art with respect to graphic user interfaces (GUI's). Data field elements are listed below and serve to help compose the case information element, or case element.

The Firm Case Reference 100 provides text entry for the general name for the case as used by the firm. For example, many lawsuits have multiple defendants and/or multiple plaintiffs resulting in lengthy case titles. In these instances, a firm will generally abbreviate the whole case title to the names of principal or select parties such as, "Smith v. Jones" or "Party A v. Party B, et al." There may be no character limitations to this field, but the firm should insert its own simple case reference for creating efficiency and ease of locating cases during use of the system.

The Date Assigned element 102 provides text entry for the date the firm received the assignment of the defense of the lawsuit.

The Firm File Number 104 provides the file reference number assigned to the lawsuit by the law firm. Since the numbering systems of law firms differ so greatly, this is a text field designed to flexibly accommodate such differing numbering systems.

The Case Type 106 offers a drop-down selection menu of typical general types of cases. These types are not limited to, but largely line up with, insurance lines of business such as "Commercial Auto, Personal Auto, Workers Compensation, General Liability, Products Liability, Intellectual Property, Personal or Advertising Injury, Malpractice, etc." In listing the case type, the firm may either select an available type or write in one that has not been supplied. The first column of FIG. 5 sets forth a list of possible case types 106.

The Case sub-type 108 is a drop-down selection menu that allows the user to further define general case types, if appropriate and if necessary. Selections include more specific categorizations, such as "Bodily Injury, Property Damage, Coverage, Slip and Fall BI, Construction Defect, Contractual, Medical, Legal, Architectural, etc." In listing the case sub-type, the firm may either select an available type or write in one that has not been supplied. The second column of FIG. 5 sets forth a list of possible case subtypes 108.

The Comments text field 110 allows the attorney to put in comments about the case. The field is highly flexible and has an unlimited amount of space for the comments. The firm may use this field for any planning and strategy commentary it wishes to communicate to the carrier and/or system-enabled clients, general notes, general explanations, evaluations as required by guidelines, etc.

The Estimated Fees element 112 is part of the budgeting process which is highly supported in other specific work areas of the system. Most carriers and/or clients prefer to have an overall estimate of the legal fees the firm estimates will be incurred on the entire case while it is, being defended. That estimate may be inserted in this field. This is an editable field so that estimates may be revised.

The Estimated Expenses field element 114 provides additional budgetary information. In addition to fees, most carriers and/or clients prefer to have an overall estimate for the expenses the firm estimates will be incurred on the entire case while it is being defended. That estimate may be inserted in this field. This is an editable field. These estimates may be revised.

The Estimated Time field 116 asks for the estimated time that will be billed on the case. There should be a parallel between the staff planned to be utilized, their projected time and the fees estimated in light of the Estimated Fees. This is not intended to be a formal analysis, but should rely on some actual thought by the firm, based on experience, rather than a purely "off the cuff" estimate.

The Cost Estimate Revision field 118 allows documentation of cost revisions. At the time a lawsuit is received and set up by the firm, cost estimates may be difficult because of numerous unknown factors or incomplete information which often results in the need for changes (increases or decreases). If a fee or estimate field is updated by revising the original amounts shown, the attorney is requested to supply an explanation in the Cost Estimate Revision field 118. The number of revisions is counted by the system and reported to the carrier and/or client.

The Client Information fields 120 record critical client information. The client is the defendant whom the firm is representing. Information about the client is supplied by the user in the indicated fields:

Name (person or company) 130;

Street Address 132;

City 134;

State, drop-down selection menu 136;

Zip Code 138;

Contact Name 140, the person with whom the attorney will be corresponding/communicating. This person may be the same as shown in the client "Name" field or it may be a different person;

Telephone Number 142;

Contact e-mail 143; and

Invoice Method, drop-down selection (e-mail, regular mail or other) 144.

The method of invoicing should only be used when the firm is billing the client directly.

The Insurer Information fields 150 are for recording critical insurer information. The "insurer" is the insurance carrier to which the firm is reporting and to which the firm's bills are being submitted for payment. Information about the insurer is supplied by the user in the indicated fields:

Name (name of company) 152;

Street Address 154;

City 156;

State, drop-down selection menu 158;

Zip Code 160;

Contact Name 162, the person with whom the attorney will be corresponding/communicating. This person may be the same as shown in the client "Name" field or it may be a different person;

A Telephone Number 164 may also be included, as may the e-mail address 165 of the named contact 162; and Invoice Method 166, drop-down selection (e-mail, regular mail or other).

The method of invoicing should be used when the firm is billing the insurance company.

The Claim Number field 170 provides entry for the insurance carrier's claim number.

The Assigned By field 172 indicates by whom the case was assigned to the firm. Among the choices a user may choose are the client, the insurer or other attorney.

The Location field 174 indicates the firm's handling office location. Some firms have multiple offices, all invoiced from and payments made to a central location. Most often the invoicing office and the handling office are the same. When they are not, this field should be completed.

The Total Number of Plaintiffs field 176 indicates the number of plaintiffs in the original or amended complaint. Because a complaint can be amended, this is an editable field and should be changed when appropriate.

The Total Number of Defendants field 178 indicates the number of defendants in the original or amended complaint. Because a complaint can be amended, this is an editable field and should be changed when appropriate.

The Total Number of Cross/Counter Plaintiffs field 180 allows a running count of cross or counter plaintiffs in this section. As these plaintiffs are added, the number should be changed accordingly. Third party plaintiffs in derivative actions against new parties should also be included here.

The Total Number of Cross/Counter Defendants field 190 allows a running count of cross or counter defendants should be kept in this section. As third party defendants are named, the number should be changed accordingly. Third party defendants in derivative actions should also be included here.

The Plaintiff's Attorney field 192 provides entry for the plaintiff's attorney's name. There is only room for one name so the main plaintiff should be closely considered. Records of other attorneys may be stored in the Comments field 110, if desired. A separate, hard copy information list of attorneys is the logical alternative to any system restrictions.

The Plaintiff's Attorney Phone Number field 194 provides entry for the plaintiff's attorney phone number.

The "Can Defense Be Shared?" field 196 is a "check box" field. If the defense of the client can or should be shared by another party and/or insurer, the check box is should be filled in with an indication of "yes."

The Date of Sharing Agreement field 198 indicates the date an agreement with another party to share the defense was made.

The Terms of Sharing Agreement field 200 describes the terms of the agreement in as much detail as possible.

The Save Changes button 210 may be clicked to save any changes to existing case or to finalize the creation of a new case.

The Don't Save Changes or Cancel button 212 may be clicked to reset all fields on this page.

This page only needs attention when setting up a new case, or making changes to existing information. The Case Information page 90 provides an initial foundation for the billing information of ultimate importance to the attorney/firm, client, and/or insurance carrier.

Figure 15:
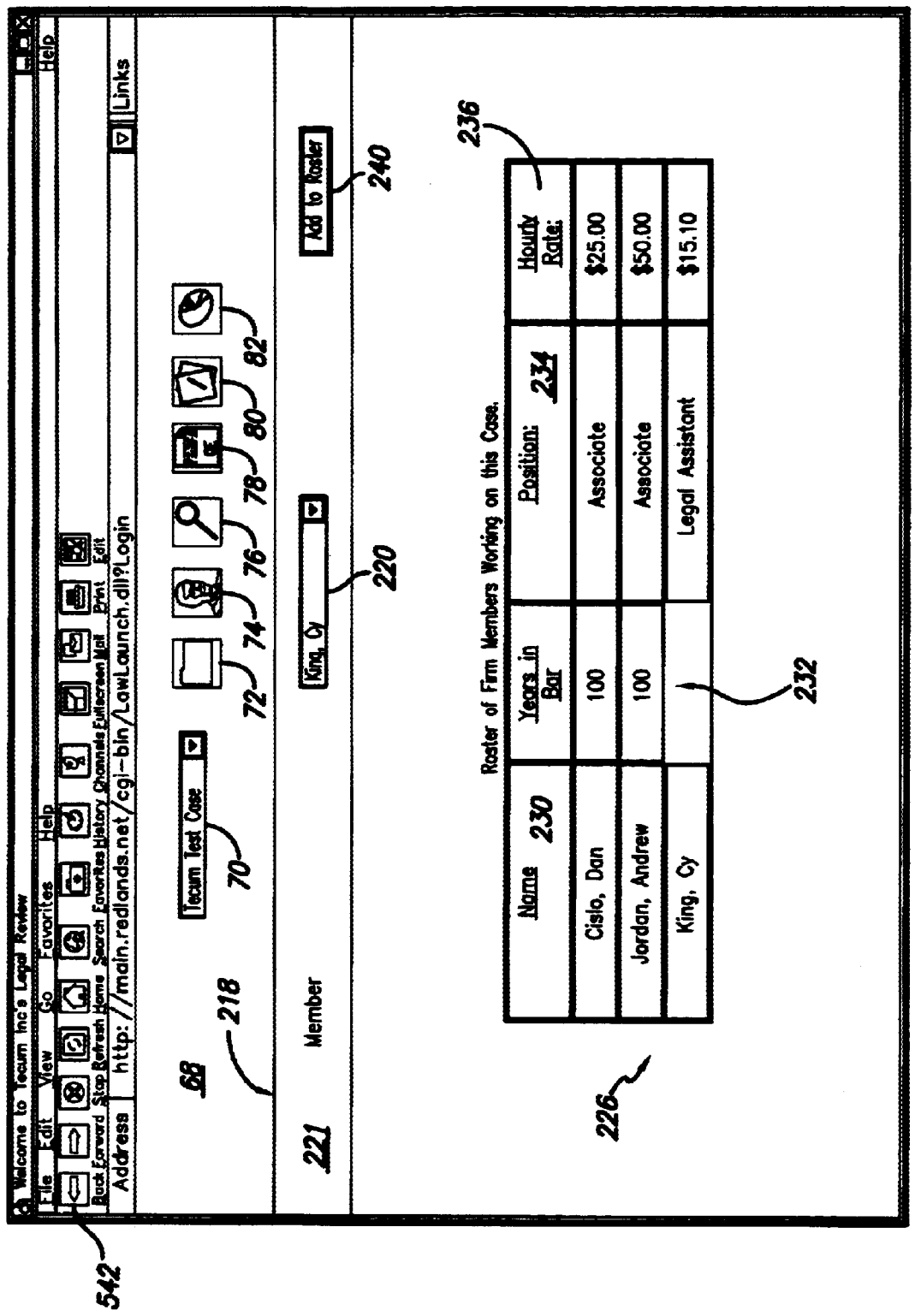
FIG. 15 is a browser screen display of the firm member list and case member roster.

The Firm Employee Roster page 218 (FIG. 15) stores information on attorneys and other employees in the firm who have performed work and billed time on all cases for a particular client or (in an alternative embodiment) who are members of the firm. Stored information includes important data such as hourly rates, year admitted to practice (attorneys), position (attorney, paralegal, administrative, law clerk, etc.). A roster of those who perform work specifically on the selected case is also created and stored.

The Firm Employee Roster page 218 has two frames: the Member List frame 221 and the Roster of Firm Members (on Case) frame 226.

The Member List 220 is a drop-down menu selection that lists names of firm members/employees. This information is loaded by the firm by utilizing the "New Employee" option in the drop-down menu. At the firm's discretion, the member list can be built over time through simple system usage or pre loaded with information when the first case is set up for a client/carrier. The Member List field 220 appears in the Member List frame 221 at the top of the page and becomes visible when the second button (labeled as a bust of a man) 74 is selected in the navigation bar 68. All timekeepers in the system (all timekeepers for all cases) can be reviewed in the drop-down menu 220. In addition to the list of all timekeepers in the system, by clicking on the "Member List," the user is given two field options:

The Add To Roster button 240 adds members of the firm working on the selected case to the Case Member List 226.

The New Employee option 224 in the drop-down. Member List menu 220 allows the addition of new employees or members to the list. If a timekeeper is not already listed on the Roster 226 and does not appear in the Member List 220, the user is able to add a timekeeper to the drop-down Member List 220 by selecting the "New" option, which causes the "New Employee" section, or frame, 228 (FIGS. 16–17) to appear. The user then supplies the information requested in the "New Employee" section 228 and clicks the "add" (to member list) button.

The Roster of Firm Members Working on This Case pane 226 appears when Roster (the second button) 74 is selected from the navigation bar 68 at the top of the page. All firm members who have worked on and/or billed time on this case, or will work on the case, if known, are listed here with correlating vital information:

Name 230;

Number of years admitted to practice (if attorney) 232;

Position in firm 234; and

Hourly rate 236.

It is possible to add members to the Case Roster 226 in a convenient manner. If the timekeeper being added to the roster is already listed in the Member List 220, the name of that person is selected. By clicking on the "Add to Roster" button 240, the name and correlating information is automatically transferred to the "Roster of Attorneys Working on This Case" section 226.

If the timekeeper being added to the roster 226 does not appear on the Member List 220, the timekeeper is added as a "New Employee" 224 as set forth above. When the requested information has been supplied by clicking the "Add" button 242, then clicking the "finished" button 244 returns the user to the "Roster" page 226 where the updated Member List is located. The added (new) timekeeper may now be added to the Roster 226 by selecting that timekeeper from the Member List 220 and clicking the "Add to Roster" 240 button.

The previous fields and lists are generally not available for editing. That is, while names of timekeepers can be added to the Case Roster, the names are not editable. As set forth above, new firm members or timekeepers may be added.

The Roster of Members Working on This case 226 is a non-editable list, because critical data is transferred from its fields to other areas of the database. Numerous calculations are dependent on this information. Management of staff information must occur through the "Member List" frame feature 221.

In the New Employee section 228 (FIGS. 16–17), new firm members being added to this case are entered here. Information is requested from the user. This page contains text entry fields for:

First Name (first name of new employee being added) 850;

Last Name (last name of new employee being added) 852;

Billing Initials (billing initials of new employee being added) 854;

Position (firm position of new employee being added), drop-down selections 856;

Date Admitted to practice (if an attorney, then the date is entered here) 858; and Hourly Rate (hourly rate of new employee being added) 860.

Figure 6:
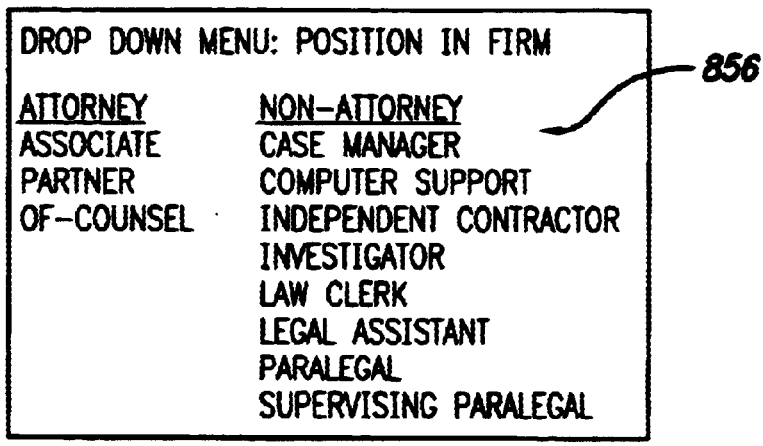
FIG. 6 is a list of possible entries for drop-down menus associated with positions in a legal firm implementing the present invention.
Figure 16:
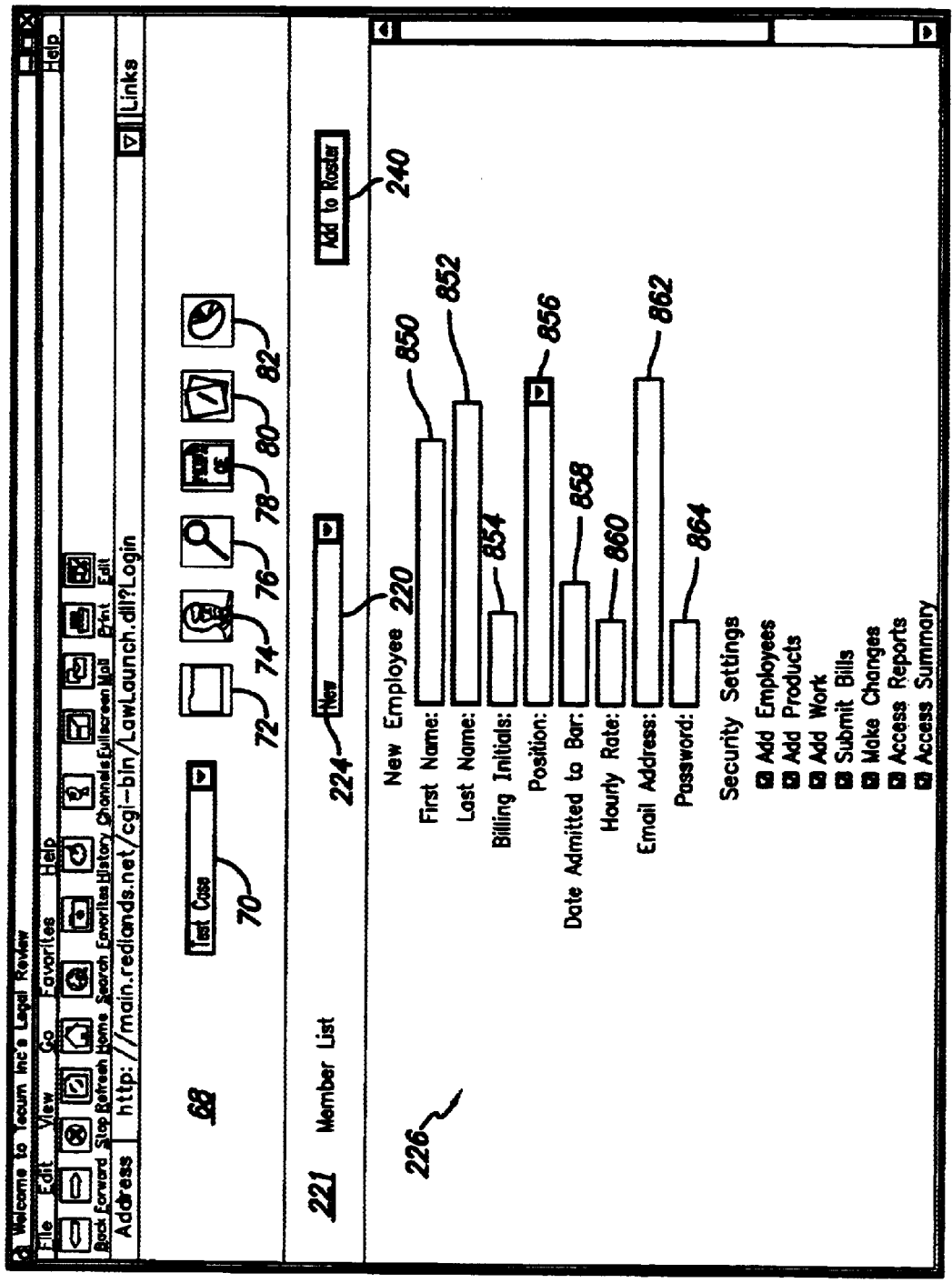
FIG. 16 is a browser print out of the new employee entry frames.

FIG. 6 shows a number of possible entries available for the Position drop-down menu 856 in FIG. 16.

Additional fields may be added, such as the employee's e-mail address 862 and password 864.

After the fields have been completed, the user clicks the "Add" Button 242 to save New Employee data to the Member List 220.

The process of adding a new employee or several new employees is completed by clicking the "finished" button 244 which will return the user to the updated Member List 221.

Note should be taken that one timekeeper may have different hourly rates. This may occur through increases, decreases or agreements with the client/carrier for particular cases. A lawyer or other firm employee who has different rates must be shown on the member list once for each rate. For example, John Smith is an attorney who has been assigned, at various times, hourly rates of $100, $115, and $130. He would appear on-the Member List as: John Smith $100; John Smith $115; and John Smith $130.

The attorney would be added to a "Roster of Firm Members Working on This Case" 226 according to the particular rate being charged for that case. Any time an employee's rate changes, he/she must be added as a "New Employee" at the new rate. The same applies if the employee's position changes and not the rate (although this is normally unlikely).

The Work Product Identification and Information page 250 (FIG. 18) has two frames and provides entry for and access to information regarding the various work product tasks and events for a lawsuit. In any lawsuit, it is anticipated from the outset that the defending firm will become deeply involved in several matters, including: reviewing material; discussing issues, facts and strategies with a limitless number of people; preparing correspondence; preparing for and attending formal and informal proceedings; reviewing and preparing pleadings; reviewing and preparing different types of discovery and requests for discovery; preparing and responding to motions; research; preparing briefs and memoranda; and many, many other activities. Some of the work is completed quickly; other work takes longer to complete. Many of these "projects" and associated activities are developed and worked on simultaneously by the defense firm and/or over prolonged periods of time.

The TECUM™ litigation management and billing system of the present invention assists in the management of case development as well as the time and costs associated with these activities. Case planning, budgeting and time accountabilities are greatly improved and communication with clients/carriers greatly enhanced with proper system usage. Properly managing the defense of a lawsuit begins with proper identification and segmentation of the numerous work products which become a part of the overall case.

The Work Product Identification and Information page 250 compiles and stores important information concerning the creation, development, progress and billing for all Work Products which have become a part of the selected case. Fields include Product Name, Priority, Date Created, and Date Completed. When the "Product Identification and Information" section 250 is accessed, a middle. "selection" frame is loaded. A drop-down menu 252 in this middle frame allows the user to select a work product to add to the case, or to add a "Miscellaneous" work product to the case. The bottom-most frame is where all data entry occurs in this section.

The Select a Product to Add field 252 is required only when a product is being added to the case. This drop-down selection menu lists all work products that can be added to this case. The Select a Product to Add Field 252 appears in a frame 262 at the top of the page and becomes visible when the third button (labeled as a legal pad and pen) 76 is selected in the navigation bar 68. From the selection menu 252 (FIG. 19) that appears, the user can select a work product and add it directly to the "Main Work Products" section 260. FIG. 8 shows a number of possible entries available for the Select a Product to Add drop-own menu 252. In addition to providing the selection list of work products available in the system, by clicking on the provided "Select a Product to Add" choice 252, the user may be given two field options allowing the user to access a known product or a new product.

The Product Selection frame 262 allows the user to add a listed product to the Main Work Products for This Case frame 260. This allows the user to choose a listed work product and add to the list of products established for the selected case. When the associated fields are completed, the product and correlating information are added to the list of products for the present case.

Alternatively, the user may add a product not listed to the Main Work Products list 260. If the user wishes to name and add a work product which has not been included in the selection list, he/she selects "Add Miscellaneous Product" or "Name Unlisted Product" 258 and hits the Add button 256 to access the Miscellaneous Product field entry frame. The user is directed to the "Added Product Information" frame 270 (FIG. 20) for completion of product information fields. A Description field 264 and a Reason for Creating [the new Description] field 266 are provided in the New Product Information frame 270. When these fields, are completed, the miscellaneous product name and correlating information are added to the list of products for this case 260 (FIG. 18) when the Continue button 268 is clicked.

Figure 20:
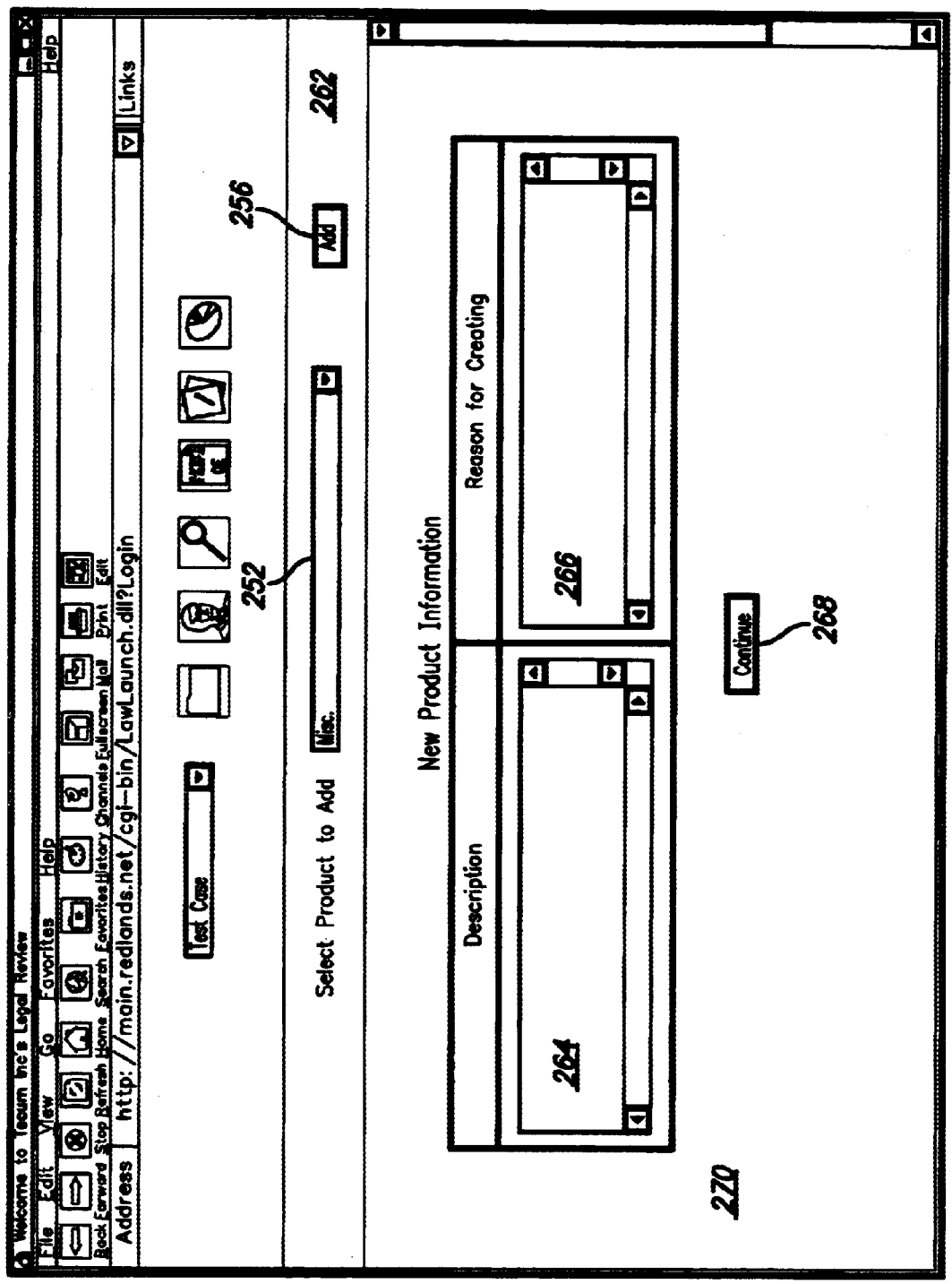
FIG. 20 is a browser screen display of the first embodiment of new work product information frames.

In an alternative, embodiment, the. Select a Product, to Add Field 252 may include a New Product or "Miscellaneous" option 258 that invokes the Added Product Information frame 270 (FIG. 20).

The Main Work Products section pane or area 260 indicates all work products listed by the firm for the selected case with important information that will assist the firm and client/carrier in managing case progress. This section is semi-editable. Work products can only be added to the Main Work Products page via the. "Select Product to Add" feature 252 (described above), which then loads the. "Added Product Information" page 270. When the proper steps have been followed for adding a product, the "Main Work Products" section 260 is updated by the system.

Figure 18:
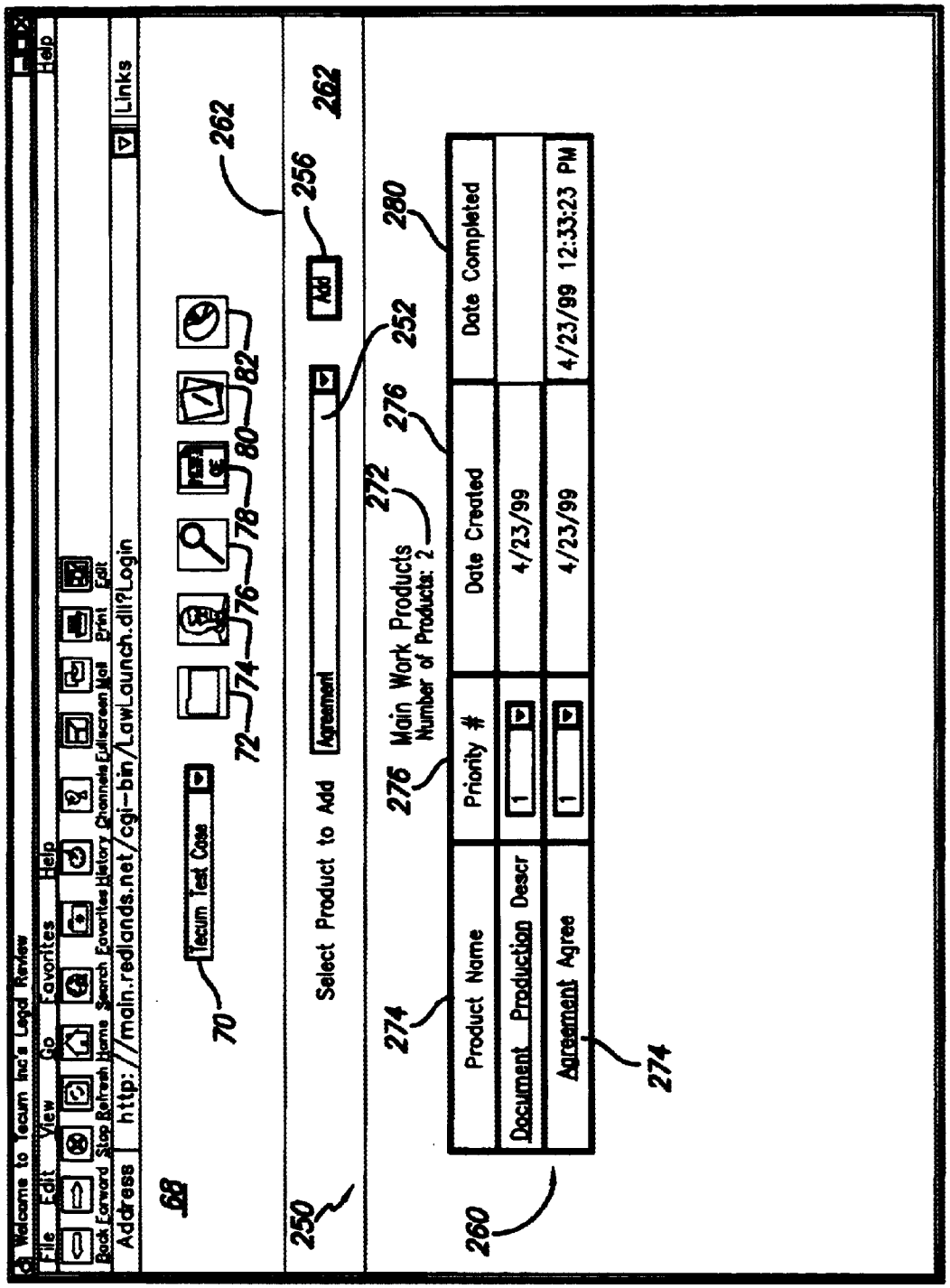
FIG. 18 is a browser screen display of the main work product identification and information frames.

As shown in FIG. 18, the Work Product Count field 272 is the number or count of work products which have been added to the selected case. It appears immediately below the section title and immediately above the list of work products. This is a running count that is automatically increased by one each time a new product is added to the list of products for the selected case. It is not editable, as it is supplied by the system/program.

The Product Name field 274 is supplied by the system after the added product steps are completed. The field is not editable.

The Priority Number field 276 is a drop-down selection menu. Selections are 1 through 5. The user must assign a priority number to the work product at the time it is added to the list based on the importance, necessity and urgency of the product. #1 is the highest priority ranking; #5, the lowest. The priority in this section has been automatically supplied by the correlating field the user has completed in the "Added Product Information" field section 270, below, so if a product is on the list, it will automatically have a priority assigned. But, since a priority ranking may increase or decrease as a result of case development, this field is editable and the user may change the priority on the listed product.

The Date Created field 278 is the date the product was added to the list of products for this case. The date in this section is automatically supplied by the correlating field the user completes in the "Added Product Information" field section 270, below, so if a product is on the list, it will automatically have a date created in this field. The Date Created field 278 is not editable.

The Date Completed field 280 is supplied by the system when a bill is submitted by the firm for a completed work product. It is not editable.

An important feature of the method of the present invention is the ability to access time and expense entry screens from the Work Product Identification and Information page 250. By clicking on a Product Name 274, the user may access the "Work Detail and Billing Entry" section 350 (FIG. 23) for the selected work product. This cross-referencing ability of the present invention provides a bill reviewer, such as a client or insurance carrier, to review the management/cost accrual of a case on a work product basis. All of the work products associated with a case are listed in the Work Product Identification and Information page 250. All of the billing associated with each individual work product is available by hyperlink or the like. By clicking on a specific work product, the details regarding that work product are displayed for the user.

As an alternative embodiment of the Main Work Product pane 260, a total billing for each work product may be displayed.

The Added Product Information pane section 270 provides additional information regarding a new work product being added to a selected case. This page, or pane, opens when a new work product to add has been selected from the drop-down selection menu and the "add" button activated or when the "add miscellaneous product" product button is activated. These options are discussed under the Select A Product To Add 252 feature.

Figure 21:
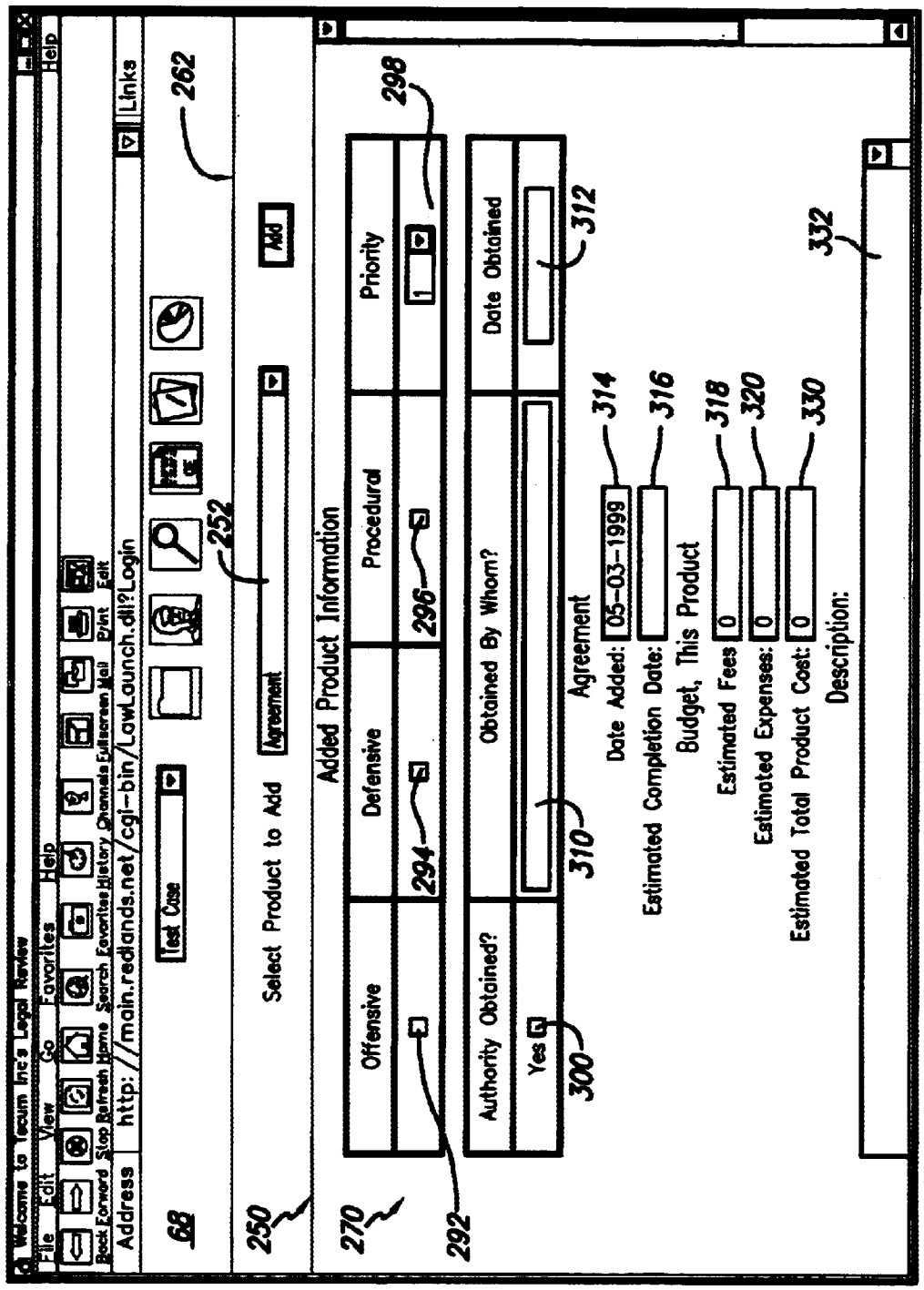
FIG. 21 is a browser screen display of added product information.

As shown in FIGS. 21–22, the primary name of the work product being added may be automatically inserted into an associated Work Product field (not shown) when the user accesses the "Added Product Information" section 270 through available options of the "Select a Product to Add" 252 section. The field may be protected and not editable. Alternatively, the Work Product field may allow some input.

As shown in the embodiment of FIGS. 20–21, the "Added Product Information" pane 270 section contains several text-entry fields.

An Offensive/Defensive/or Procedural check (boxes 292, 294, 296, respectively) allows the user to indicate what necessitated the addition of a work product. Clicking on a box prompts an "x" to appear in the box. These basically are questions that ask the user about the broad strategic characteristics of the added work product. Specifically, has it been added for offensive strategy purposes? A check in the "offensive" box indicates, "yes." Is it being added because a particular development, pleading or other action by the plaintiff, cross-plaintiff or counter-plaintiff has necessitated the creation of the product? A check in the "defensive" box indicates, "yes." Is the product being created because it is procedurally required? A check in the "procedural" box indicates, "yes".

The user clicks on all check boxes that apply to the work product being added. For example, suppose the defendant is propounding interrogatories to the plaintiff and the attorney is creating a work product entitled, "Interrogatories to Plaintiff, first set." Further suppose that the court requires the interrogatories to be filed before a deadline is imposed or as another matter of procedure. The user should click the "offensive" check box 292, since they are initiating the procedure, and the "procedural" check box since the interrogatories are required.

For descriptive purposes, other examples may serve to illustrate this point. Suppose the defense attorney intends to depose witness A (See "Description", below). He/she creates a work product entitled, "Deposition, Witness A" and clicks on the check box "offensive" 292 and no other check box, since there is no procedural requirement to depose Witness A. Now suppose the plaintiff's attorney has sent notice that he/she intends to depose Witness A and the user creates a work product entitled the same, "Deposition, Witness A," but now indicates that the work product is "defensive" 294 since the action was initiated by an opponent. In this instance, the work product may or may not also be "procedural," 296.

The added Product Information pane/page 270 may also provide priority assignment via a priority drop-down box 298. The user assigns a priority number here. Priority rankings are discussed above under "Main Work Products," priority number 276.

An "Authority Obtained?" check box 300 provides entry and indication of authority sometimes required for certain work products. Insurance carriers generally require selected defense counsel to adhere to litigation handling guidelines and/or instructions. Many of these may include the requirement of obtaining authority before undertaking activities associated with certain work products. If the attorney intends to create a work product for which the carrier has required prior authority, the user should click on the check box which indicates, "yes". The feature is customizable by the carrier. When a firm is supplied guidelines, they may program the list of Work Products (drop-down for all cases) so an alert is given to the user if authority is required by the guidelines and the box was not checked.

A box 310 is also provided to indicate from whom the authority has been obtained. If the box is checked in the "Authority Obtained" section 310, the user must supply the name of the individual who granted the authority to create and proceed with the work product. If a box is checked and a name not supplied, the system will alert the user that a name is required and count the number of instances the firm proceeded without supplying a name.

The date authority was granted to proceed with the work product being added is indicated in the Date Obtained box 312.

The date the work product was added is indicated in the Date Added box 314.

The Estimated Completion Date box 316 is the estimated date that all work for this work product will be completed.

The Estimated Fees box 318 allows the user to supply an estimate of the amount of fees that will result from completing this entire work product. Consideration should be closely given to all component parts, or work that will be performed to support the product (e.g. correspondence, preparation time, telephone calls, attending proceedings, travel time, conferences, etc.) Note that this field is editable. It can be increased or decreased during case development. Effort should be devoted here to be as accurate as possible because the system is counting the budget changes and will report number in the summary section.

The Estimated Expenses box 320 allows the user to supply an estimate of the amount of expenses that will result from completing this entire work product. Consideration should be closely given to all expense related to all component parts or work that will be performed to support the product (e.g. copies, court reporters, filing fees, travel expense, express delivery, etc.). The system counts the number of estimate changes.

The Estimated Total Product Cost box 330 is a system calculation derived from the Estimated Fees 318 and the Estimated Expenses 320.

The Description box 332 is a critical text area and is used to refine the name of work products being added. The exact description or version of the work product should be entered in this field. For example, if a deposition is created as a work product, select "Deposition" from the drop-down menu and insert the deponent's name in the "Description" field. If "Jones" were the name put in this field, the work product would appear as "Deposition, Jones." If a set of interrogatories to plaintiff has been selected as a work product, the specific set (first, second, third, etc.) should be shown in the "Description" area. If a general or procedural motion is being filed, the exact motion or issue should be shown. The idea is to combine a general work product with its specific description. The fewer words that are used in the description area, the better the probability is that duplicate products will not be added. This field is for identification purposes.

The Reason for Adding Product box 334 provides a text area for explaining why the work product needs to be added to the case.

The Continue Button 336 is clicked to add this work product to the Main Work Products list.

The Cancel Button 338 resets all fields on the page.

Figure 19:
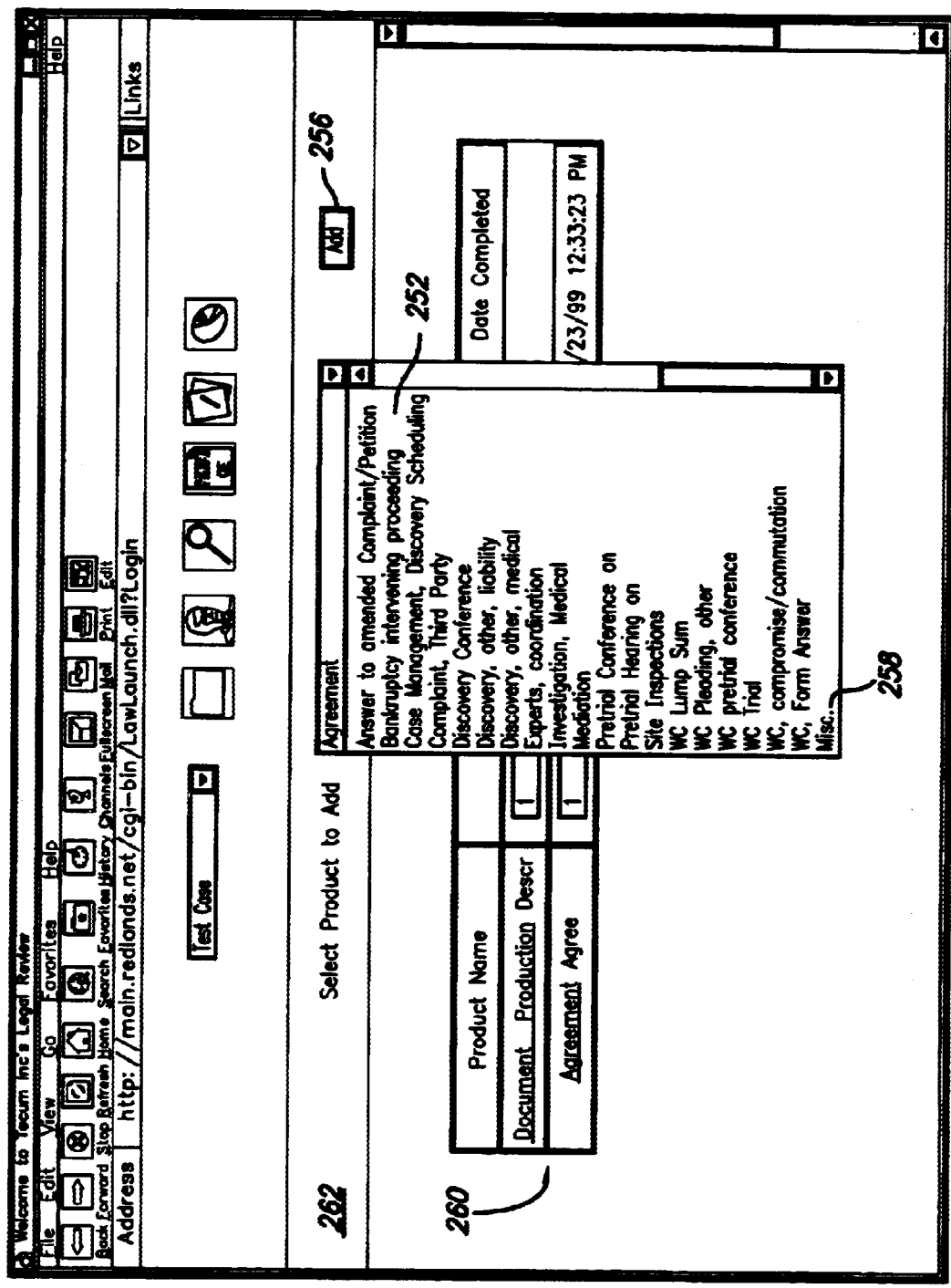
FIG. 19 is the work product identification and information browser frames of FIG. 18 showing the drop-down menu, showing a partial list of available work products to add including the miscellaneous or new product to add.

The Description box 332, reason for Adding/Creating Product box 334, and Continue button 336 of FIGS. 21–22 find their analogies in the Description field 264, Reason for Creating 266, and Continue button 268 of FIG. 19.

After a work product has been added, any authorized firm member may bill time for completing work on the product. This is accomplished by filling certain required fields on the "Work Detail and Billing Entry Screen" 350 (FIGS. 23–24), which includes detailed descriptions of the work completed. Information concerning the cumulative billing for all work products is supplied through this screen, which is basically a work and time sheet. The highest quality and comprehensiveness of a bill results from close attention to this screen by the user. The entries on this page will be transferred to the Work Product Billing, "Preview & Submission" screen, below, for future review and bill submissions to the client/carrier. As with all the other pages of the present system, a common, dynamic database stores and supplies the pertinent information. The user should keep in mind that the client/carrier can review this, or any other screen, at any time. The ability to spontaneously check the on-going litigation activity allows the carrier/client to monitor such activity. It also prevents surprises from occurring when a monthly bill is'submitted. Pre-authorization of work product activity also reduces the element of surprise. In an alternative embodiment, the carrier/client may be notified by e-mail or the like when certain fields are altered, as when a budget is revised or a new work product added Software flags may be present and set to notify (as by e-mail) a person monitoring the billing when certain thresholds have been reached or other criteria met.

For clarity, the "Work Detail and Billing Entry" screen/page/pane 350 is for making individual bill entries. The Work Product Billing, "Preview & Submission" screen 440, below, is for reviewing the entire bill for a work product to date and to submit bills to the client or carrier when the work product is complete.

Access is gained to the Work Detail and Billing Entry screen 350 by selecting a product directly from the "Main Work Products, This Case" list 260 after adding a new product or by clicking on the fourth button (labeled as a calculator or as a dog-eared page with the letters QE standing for "Quick Entry") 78 in the navigation bar 68. Both will take the user to the "Main Work Products, This Case" list 260. By either method, a product must be selected to access the Work Detail and Billing Entry pane 350. Billable or other time and billable or other expenses are restricted and may only be added to an existing, designated Work Product.

There are three main functions of the "Work Detail and Entry" page: Time Entry, Expense Entry (only one at a time can be selected, as by radio button), and Work Product Budget Management calculation tables.

For Time Entry, after a work product has been selected, either "time entry" 352 or "expense entry" 353 must be selected. Clicking on the time entry radio button 352 enables the user to complete the required information for making a time entry in the time entry area/pane 354.

The Name/Rate entry box 356 is a drop-down selection menu provided by clicking on the associated field. The Name and Rate may be combined or linked, or separate and distinct. The menu includes all timekeepers who have been listed on the "Roster of Firm Members Working on This Case" 226 portion of the "Firm Employee. Roster" page 220. This is a required field, and the system will not allow the user to proceed without making a selection. By clicking on a name, the related, pertinent information concerning the selection is automatically supplied by the system.

If the person for whom time is being entered appears on the list, the user simply clicks on the name and proceeds with the rest of the time entry steps.

However, if the person for whom time is being entered does not appear on the list, the user returns to the "Firm Employee Roster" page 220 and follows the steps for adding an employee to the "Roster of Firm Members Working on this Case" 226. After the necessary information is supplied, this section can be accessed and completed. Once a timekeeper has been added to the roster for this case, they may remain permanently on the list whether actively working on the case or not.

The Activity box 360 is a drop-down selection menu comprised of verbs used by timekeepers to describe the work being completed for the selected work product. For example, the verbs prepare, review, attend, prepare for, analyze, evaluate, negotiate, receive and review, organize, schedule, file, etc. may be used in the Activity box 360. The user clicks on the applicable verb for the activity being-performed. This may be a required field. FIG. 9 shows a series of possible entries in the drop-down Activity menu 360. FIG. 21a shows the drop-down Activity menu 360 with its scroll bar.

The Supporting Work or Component box 370 describes the specific work or component that is being completed and supports, or is a part of, the work product that has been selected. For example, such work components may include: abstract, brief, memorandum, incoming correspondence, outgoing correspondence, exhibits, intraoffice conference, meeting, hearing, supporting motion, oppositions, reply to, incoming telephone discussion, outgoing telephone discussion, etc. The user simply clicks on the supporting work that applies to the entry being made. This may not be a required field. FIG. 10 shows a series of possible entries in the drop-down Supporting. Work or Component menu 370.

The Specific Reference or Description box 372 is used to expand or clarify a description. The user completes the text field entitled "Specific Reference or Description" 372. This may not be a required field. Occasionally, the, two-word description created by the Activity 360 and supporting work component 370 fields is sufficient for billing purposes. More often than not, however, the user will want to supply more detail about the billing entry than is possible through simply selecting from the two drop-down menus for .Activity 360 and Supporting Work Component 370.

For example, suppose the user has selected: "Summary Judgment" as the main work product 260 from the menu; "prepare" from the Activity menu 360; "report to carrier" from the supporting work menu 370; and does not complete any text for the specific reference or description field 372. The billing description would appear as "Prepare report to carrier" (for the "Summary Judgment" Product). In this case, additional reference may not be necessary, and the specific reference or description field 372 may be left blank. However, in the same example, suppose the user decides that some further clarification is necessary, or useful, and inserts the text, "regarding deadlines, follow up with authority to proceed and current status per carrier's request." The billing description would now appear as, "Prepare report to carrier regarding deadlines, follow up with authority to proceed and current status per carrier's request." The billing descriptions will be for the selected main work product 260, which appears at the top of the billing page. All description entries shown will be for the listed work product only.

The Time Charged for This Task box 374 indicates the amount of time for the task being entered for each billing description. Times may be entered in decimal increments of 0.10 or one-tenth of an hour.

The Date of Work box 376 allows the date that the work (for which a fee is being charged) was completed to be entered in this field.

The Date Work Entered box 378 indicates the date the billing entry is made to provide the system of the present invention in this field. If the two dates (Date of Work 376 and Date Work Entered 378) are different, the user will receive an alert as a reminder that post-activity billing is taking place. This can serve as a useful tool for law firm managers who are having difficulty with timely billing by firm staff members. The feature discourages reconstructive billing, which normally has associated problems and inaccuracy.

The user may alternatively select the Expense Entry pane, or fields, 390 after entering the Work Detail and Billing. Entry page 350. After a work product has been selected, either "time entry" 354 or "expense entry" 390 radio buttons must be selected. Clicking on the expense entry radio button 390 enables the user to complete the required information for making an expense entry.

Figure 23:
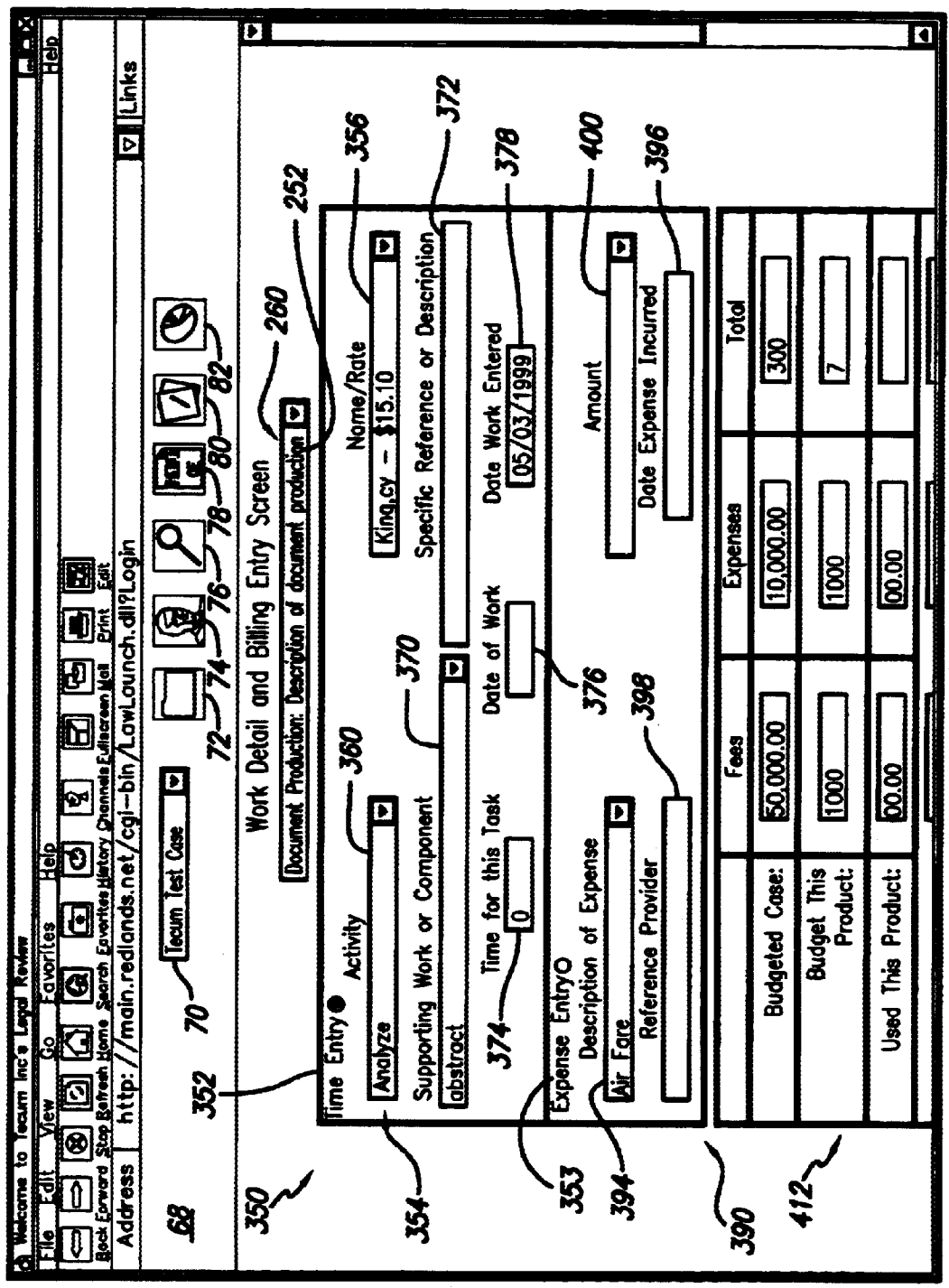
FIG. 23 is a browser screen display of the work detail and billing entry screen.

FIG. 23 shows the Work Product Expenses Billing page 390. The Work Product Expenses Billing page 390 allows the user to enter important data regarding the types and size of an expense associated with a work product.

Generally, fields are required to maintain the integrity of the final bill. Without required information, accountability for work products and/or expenses may be put at risk or lost.

Figure 7:
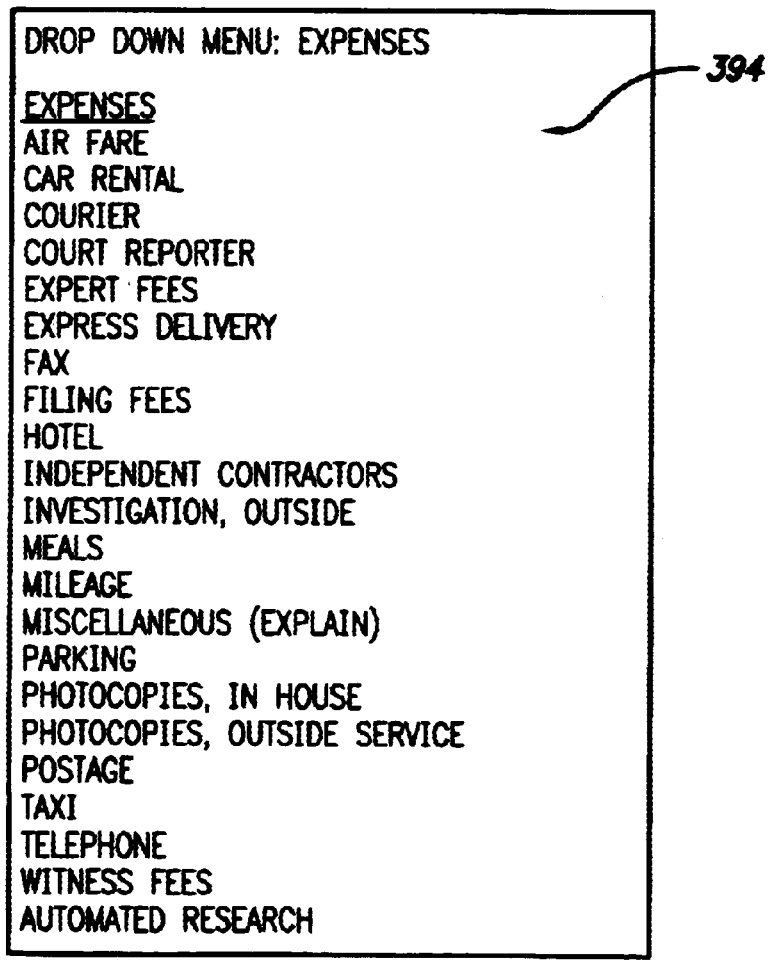
FIG. 7 is a list of possible entries for a drop-down menu for expenses billed in accordance with the present invention.

The Description of Expense field 394 prompts a drop-down menu to appear which lists all available expense options (e.g. air fare, car rental, court reporter, expert fees, filing fees, parking mileage, in-house photocopies, out sourced photocopies, witness fees, hotel, independent contractors etc.). The user should click on the applicable selection. This may be a required field. FIG. 7 shows a list of possible entries for the Description of Expense drop-down menu 394.

The Date of Expense field 396 provides an entry for the date the expense was incurred. This may be a required field.

The Provider field 398 provides entry for the name of person or company providing the service for which the expense was incurred.

The Amount field 400 provides entry for the amount of the expense.

Figure 24:
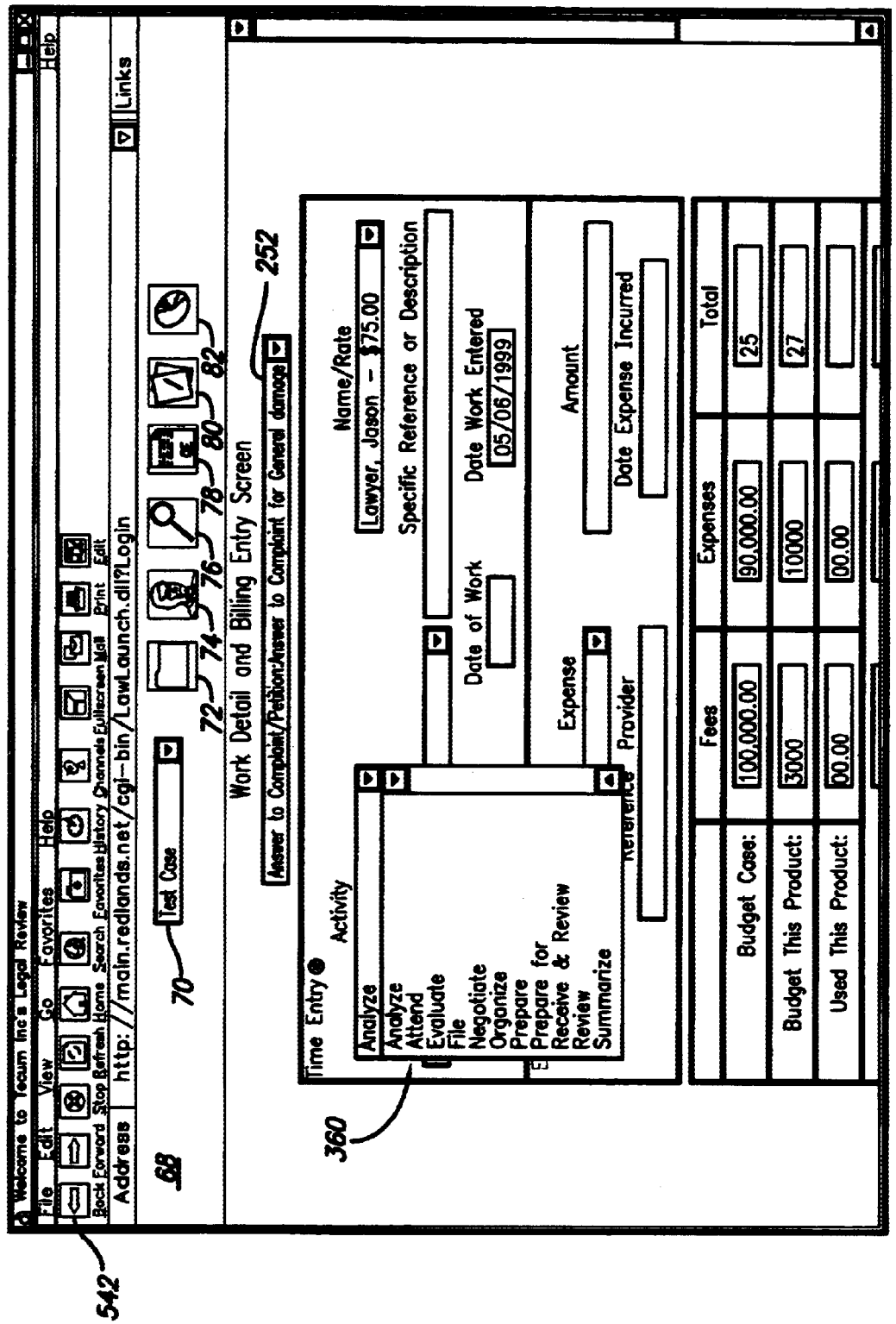
FIG. 24 is a browser screen display of the work detail and billing entry screen showing the Activity drop-down list.
Figure 26:
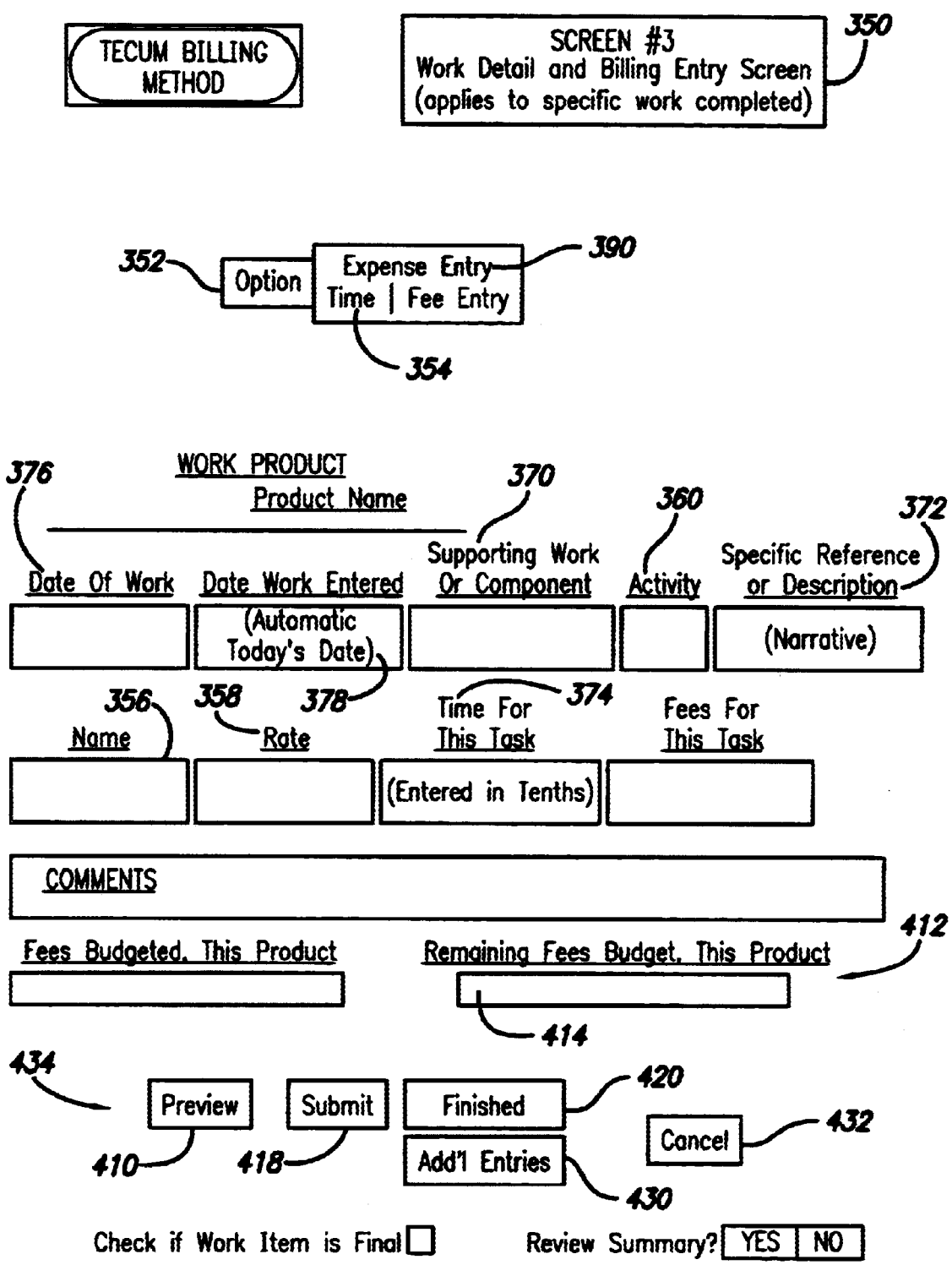
FIG. 26 is an alternative embodiment of the browser screen display of FIGS. 23-25.

The Preview field may be activated by a Preview button 410 (FIG. 26). This feature may be activated through either the time entry fields or expense entry fields. After time is entered for the time fields or the amount is entered for the expense fields, clicking on the "preview" button 410, the Preview pane 412 may show the user what the remaining work product and/or expenses budget will be if the entry is submitted. It is a protected calculation field. Alternatively, and as shown in FIGS. 23–25, the preview pane may be incorporated into the Work Detail and Billing Entry'screen pane 350 at its bottom.

The Fees Remaining After this Entry field 414 may be activated by selecting the "preview" button 410 (FIG. 26). This calculation field shows the user how much will remain from the fee estimate, made earlier in the billing process in the "estimated fees" field 318 for this work product, if the entry is submitted.

The Expenses Remaining After this Entry field 416 may also be activated by selecting the "preview" button 410. This calculation field shows the user how much will remain from the expense estimate, made earlier in the billing process in the "estimated expenses" field 320 for this work product, if the entry is submitted.

The Submit button 418 is clicked to add the entry to the bill. When the billing description and time or expense entry is complete, and the user is satisfied that the entry should be added to the billing, the "submit" button 418 should be clicked. Clicking the "submit" button stores the information supplied for this entry in the database.

The Finished button 420 is clicked to exit the time/expense recordation screens/panes 350. After submitting the time or expense entry, the user clicks the finished button 420 if there are no additional entries to make. Clicking the "finished" button sends all billing information to the other billing screens (explained in the next section) and closes the "Work Detail and Billing Entry Screen".

Referring now to FIG. 25, the user may make Additional Entries before exiting the Work Detail screens 350. If a billing entry is complete (either time or expense) and the submit button 418 clicked, the user is given the option to finish or to make additional entries. If the user wishes to make additional entries, clicking on the "additional entries" button 430 will return him/her to the work product selection menu 260 so the billing entry process may continue. There are no limits to the number of entries a user may make in the "Work Detail and Billing Entry Screen." When all entries are complete, select "finished."

The Cancel button 432 cancels information just supplied and resets the screen.

The Remaining Budget pane 434 (FIG. 26) is similar to the Preview pane 412, and the two may be the same, separate or consolidated. This table appears when the screen is accessed. It displays the amount remaining from the cost estimates made for both fees and expenses when the work product was added. It establishes a remaining amount by simply subtracting all prior entries for fees and expenses from the amount estimated. This field is different from the "Preview" feature which shows the amounts that will remain if the current billing entry is made. Instead, the "Remaining Fees and Expenses" feature indicates remaining amounts before the billing entry process even takes place. It is always visible when the "Work Detail and Billing Entry Screen" is accessed. It is not optional (as is the "Preview"). These are protected calculation fields and cannot be changed on this screen.

The following billing entry and detail examples may be helpful in understanding the present invention. Remember that in order to access the Work Detail and Billing Entry screens 350, a specific work product will have been selected by the user. Work products on the selection menu 260 will have been added by combining general product names with specific descriptions as is explained previously.

Any and all examples set forth herein are hypothetical in nature and may not have actually been performed. The use of verbs in the past tense in expressing such hypothetical results is inadvertent and should not be taken as the expression of fact. A few examples of typical billing entries follow.

If the user takes a telephone call from a client who wants to discuss some allegations of a cross complaint, when making the billing entry, the following steps or actions may be taken:

Access or continue the Work Detail and Billing Entry Screen 350;

Select "Cross Claim" from the work products list 260;

Select "Incoming telephone discussion," from the activity list 360;

Select "Allegations" from the supporting work/components list 370;

In the "Specific Reference Field" 372, enter any further description, such as "with client regarding details of fourth paragraph";

Enter the amount of time being billed for the- call in the Time field 374;

Enter the date the work was completed 376;

Click on the "Submit" Button 418; and

Click on the "finished" button 420 (or additional entries button 430 if there are more to make).

The resulting billing description will appear under the work product Cross Claim as "Incoming telephone discussion, allegations, with client regarding details of fourth paragraph."

For example, the user may have completed some research for possible use in a brief in support of a Summary Judgment Motion on the issue of Collateral Estoppel. A work product may be added by selecting "Summary Judgment" from the drop-down menu 260 and entering "Collateral Estoppel" in the product description. When making the billing entry, the following steps may be taken:

Access or continue the Work Detail and Billing Entry Screen 350;

Select "Summary Judgment, Collateral Estoppel" from the work products list 260, Select "Conduct" from the activity list 360;

Select "research" from the supporting work/components list 370;.

In the "Specific Reference Field" 372, enter any further description, such as "applicability of case law re: collateral estoppel";

Enter the amount of time being billed for performing the research in the Time field 374;

Enter the date the work was performed in the Date of work field 376;

Click on the "Submit" button 418; and

Click on the "finished" button 420 (or the additional entries button 430 if there are more to make).

The resulting billing description would appear under the work product, Summary Judgment, Collateral Estoppel as "Conduct research, applicability of case law re: collateral estoppel"(or other related topics as described).

If the user should apply the research to a brief he/she is preparing in support of the Summary Judgment Motion, when making the billing entry, the example may be continued as reflected in the following steps which may be taken:

Access or continue the Work Detail and Billing Entry Screen 350;

Select "Summary Judgment, Collateral Estoppel" from the work products list 260;

Select "Prepare" from the activity list 360;

Select "brief" from the supporting work/components list 370;

In the "Specific Reference Field" 372, enter any further description, such as "in support SJ";

Enter the amount of time being billed at that time for preparing the brief in the Time field 374: (Work may be performed on one component on multiple dates, each with a separate billing entry);

Enter the date the work was performed in the Date field 376;

Click on the "Submit" Button 418; and

Click on the "finished" button 420 (or additional entries button 430 if there are more to make).

The resulting billing description would then appear under the work product, Summary Judgment, Collateral Estoppel as "Prepare brief, in support of Summary Judgment."

As a further example, the user may have spent some time preparing answers to plaintiff's second set of interrogatories to defendant. A work product had been added and, with proper use of the data fields, has been added to the products list as "Incoming Interrogatories, Second Set." When making the billing entry, the following steps may be taken:

Access or continue the Work Detail and Billing Entry Screen 350;

Select "Incoming Interrogatories, Second Set" from the work products list 260;

Select "Prepare" from the activity list 360;

Select "answers to" from the supporting work/components list 370;

Leave the "Specific Reference Field" 372 blank;

Enter the amount of time being billed at that time for preparing the answers in the Time field 374 (Work may be performed on one component on multiple dates, each with a separate billing entry);

Enter the date the work was performed in the date field 376;

Click on the "Submit" Button 418; and

Click on the "finished" button 420 (or additional entries button 430 if there are more to make).

The resulting billing description will appear under the work product, "Incoming Interrogatories, Second Set" as "Prepare answers to."

Suppose, as a further example, that the user has taken the deposition of an expert, John Smith, in a second session. He/she spent 3 hours preparing for the deposition, 2 hours traveling (round trip) to attend the deposition, 6 hours to take the deposition, and on the next day, 1 hour summarizing the entire deposition, both sessions. It would be most communicative to the client/carrier to make 4 separate entries as follows for the deposition work product:

Access or continue the Work Detail and Billing Entry Screen 350;

Select "Deposition, John Smith" from the work products list 260;

Select "Prepare For" from the activity list 360;

Leave the supporting work/components field 370 blank;

In the "Specific Reference Field" 372 enter any further description, such as "second session scheduled for month/day/year to determine the strength of evidence against client";

Enter the amount of time being billed at that time for preparation time in the Time field 374 (Work may be performed on one component on multiple dates, each with a separate billing entry);

Enter the date the work was performed in the Date of Work field 376;

Click on the "Submit" Button 418; and

Click on the "finished" button 420 (or the additional entries button 430 if there are more to make).

The resulting billing description would appear under the work product, "Deposition, John Smith" as "Prepare for, scheduled for month/day/year to determine the strength of evidence against client" (3 hours indicated).

For the second entry:

Access or continue the Work Detail and Billing Entry Screen 350;

Select "Deposition, John Smith" from the work products list 260;

Select "Travel To" from the activity list 360;

Leave the supporting work/components field 370 blank;

In the "Specific Reference Field" 372, enter any further description, such as "second session";

Enter the amount of time being billed at that time for traveling round trip in the Time field. 374 (Work may be performed on one component on multiple dates, each with a separate billing entry);

Enter the date the work was performed in the Date of Work field 376;

Click on the "Submit" Button 418; and

Click on the "finished" button 420 (or the additional entries button 430 if there are more to make).

The resulting billing description would then appear under the work product, "Deposition, John Smith" as "Travel to, second session" (2 hours indicated).

For the third entry:

Access or continue the Work Detail and Billing Entry Screen 350;

Select "Deposition, John Smith" from the work products list 260;

Select "Attend" from the activity list 360;

Leave the supporting work/components field 370 blank;

In the "Specific Reference Field" 372, enter any further description, such as "second session";

Enter the amount of time being billed at that time for traveling round trip in the Time field 374 (Work may be performed on one component on multiple dates, each with a separate billing entry);

Enter the date the work was performed in the Date of Work field 376;

Click on the "Submit" Button 418; and

Click on the "finished" button 420 (or the additional entries button 430 if there are more to make).

The resulting billing description would appear under the work product, "Deposition, John Smith" as "Attend, second session" (6 hours indicated).

The fourth billing entry might be achieved as follows:

Access or continue the Work Detail and Billing Entry Screen 350;

Select "Deposition, John Smith" from the work products list 260;

Select "Summarize" from the activity list 360;

Leave the supporting work/components field 370 blank;

In the "Specific Reference Field" 372, enter any further description, such as "entire deposition, all sessions";

Enter the amount of time being billed at that time for traveling round trip in the Time field 374 (Work may be performed on one component on multiple dates, each with a separate billing entry);

Enter the date the work was performed in the Date of Work field 376;

Click on the "Submit". Button 418; and

Click on the "finished"button 420 (or the additional entries button 430 if there are more to make).

The resulting billing description would appear under the work product, "Deposition, John Smith" as "summarize, entire deposition, all sessions" (1 hour indicated).

As an example, the user may have prepared correspondence to the carrier regarding the preparation of exhibits for trial purposes. When making the billing entry, the following steps or actions might be taken:

Access or continue the Work Detail and Billing Entry Screen 350;

Select "Trial Exhibits" from the work products list 260 (Having been established during product identification by selecting "Trial" from the work products selection menu 260 on the added products screen 270 and writing "Exhibits" in the correlating "Description" field 332);

Select "Prepare" from the activity list 360;

Select "outgoing correspondence" from the supporting work/components list 370;

In the "specific reference field" 372, enter any further description, such as "to carrier regarding decisions on inclusion of trial evidence";

Enter the amount of time being billed at that time for preparation time in the Time field 374 (Work may be performed on one component on multiple dates, each with a separate billing entry);

Enter the date the work was performed in the Date of Work field 376;

Click on the "Submit" Button 418; and

Click on the "finished" button 420 (or the additional entries button 430 if there are more to make).

The resulting billing description would appear under the work product, "Trial Exhibits" as "Prepare outgoing correspondence, to carrier regarding decisions on inclusion of trial evidence."

Figure 27:
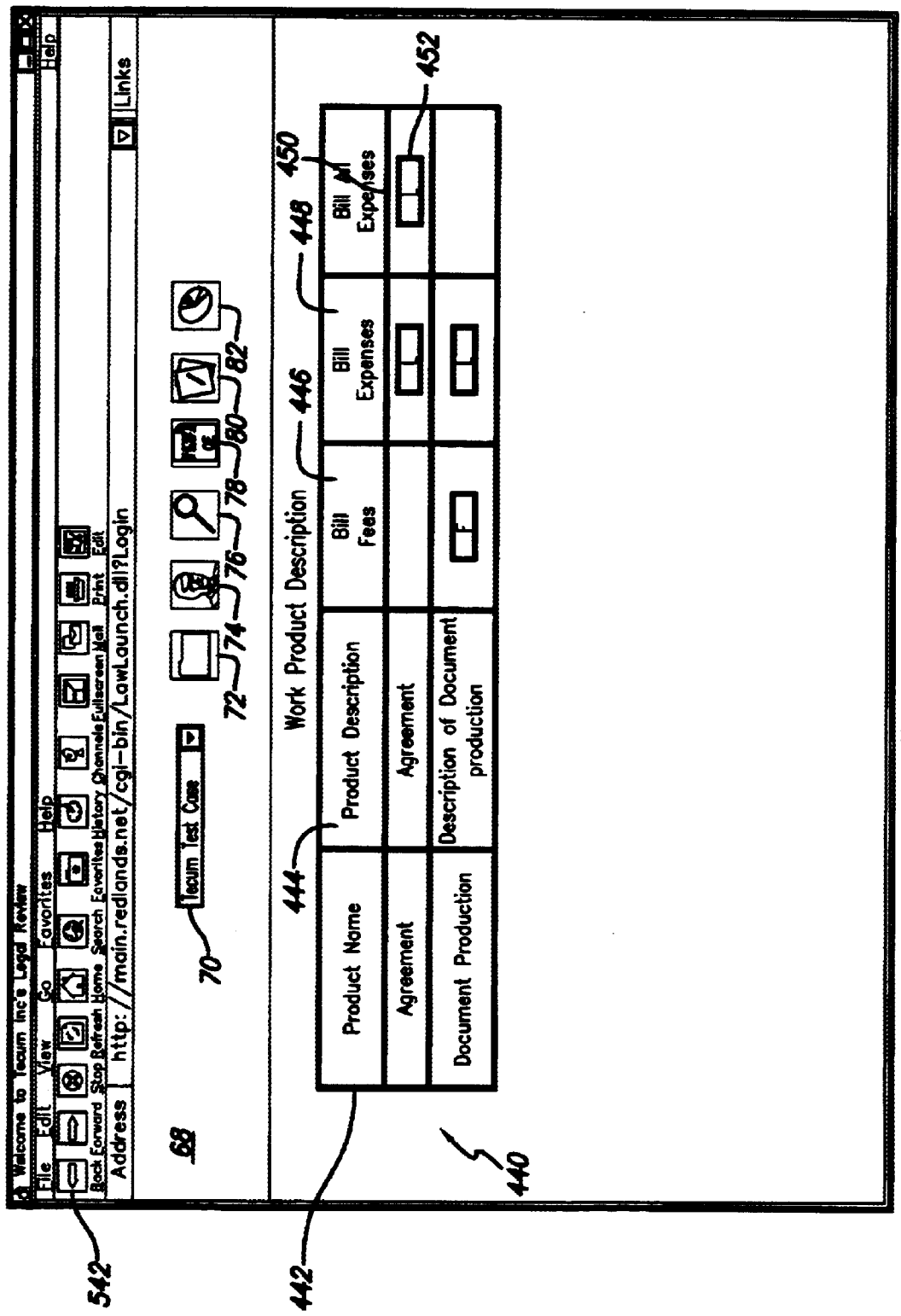
FIG. 27 is a browser screen display of the work product billing frame.

FIG. 27 shows a Work Product "Billing Preview and Bill Submission" pane 440. The Work Product Billing Preview and Bill submission screen 440 displays all Work Products that have been created for the selected case 70. According to the preferred rules structure implemented by the present invention, a bill cannot be submitted for any work product until all work for the product has been completed by the firm. However, the Work Product Billing Preview and Bill Submission screen 440 is a valuable management tool, because billing for work in progress (fees and expenses that have been charged, but not yet billed) may be previewed at any time by any and all parties (the legal services provider, insurance carrier and/or client). The list provides billing options for all work products for which any time and/or expense has been entered by any user or timekeeper on the "Work Detail & Billing" screen 350.

The billing options remain available until the work product is billed and marked as completed. Main fields in this section include "Product Name" 442, "Product Description" 444, and the options of "Bill Fees" 446, "Bill Expenses" 448, or "Bill All Expenses" 450. The Bill Fees, Bill Expenses and Bill All Expenses columns are each labeled, respectively, by a graphic button with the letters F, E, 'E' (with a dark border 452 around the button). These buttons are present only when time or expenses have been entered for the correlating work product. In addition to the preview capabilities, this section is utilized to submit bills to the party indicated on the case information screen.

The Work Products List 442 lists the work products established on the selected case. They may or may not have billing option buttons appearing next to them. If any entries have been made for a product on the "Work Product Detail and Billing" screen 350, a correlating billing option button will appear to the right of that product. ("F" if fees entered 446 and "E" if expenses entered 448, both "F" and "E" if both have been entered). If no billing entries have been made for an established product, the product will appear on the list, but no billing options will appear for that product (buttons will not be present).

The Work Product Description list 444 provides the specific description of the product as supplied on the "Added Product Information. Screen" 270. The work product and its correlating description appear on each billing screen that is loaded by using one of the following options.

The Bill Fees Button option 446 appears as an "F" button in the space to the right of "Work Product Description" 444. When the user clicks on this button 446, he/she is taken to the "Work Detail and Summary" Tables 460, which are explained below, for the correlating work product.

The Bill Expenses Button option 448 appears as an "E" button in the space to the right of "Work Product Description" 444 and to the right of an "F" option 446 if present. When the user clicks on this button, he/she is taken to the "Expense Summary, This Work. Product Table" 462, which is explained below, for the correlating work product.

The Bill All Expenses Button option 450 may be an "E" with a dark border 452 around it. The button 450 appears in the space to the right of "Work Product Description" 444, to the right of an "F" option 446 if present, and to the right of the unbordered "E" button 448 if present. When the user clicks on this button, he/she is taken immediately to the Expense Summary, All Work Products Table 464, which is explained further below.

In the Work Product Billing Summary 460 (FIGS. 28–29), the Date Commenced field 466 indicates the date the work product was established.

The Date Of Last Work field 468 indicates the date of the last work entry.

The "Completed Product?" field 470 is a check box field. Clicking on the box indicates that all work for the product has been completed, thereby placing it in line for payment. If the user is using the buttons for previewing the bill only, the "Completed Product?" box 470 should not be checked.

The Work Detail and Itemization table 460 appears when the "F" option 446 has been selected. It is preceded by the date commenced, date of last work and completed product check box fields. The format of the table is in the exact billing format that will be submitted to the designated party for payment. It contains all of the fields that were completed and stored on the "Work Detail and Billing Entry" screen 350 for the selected work product. The space for the information has a multi-page, unlimited entry capacity. It includes the following fields for each entry that has been made for the work product selected:

Date (date of work product) 480;

Initials (firm member initials) 482;

Rate (of firm member) 484;

Activity (action verb) 486;

Supporting Work (what was done) 488;

Specific Reference 490;

Hours (hours spent on this activity) 492; and

Fees (rate×hours spent) 494.

These field elements of the Work Product Billing Detail 460 are listed on the screen as in the following illustration/example:

WORK PRODUCT: Deposition, Smith, defendant's expert witness

| Date | Initials | Activity | Hours | Fees |
|---|---|---|---|---|
| 00/00/00 | AAA | Outgoing Telephone discussion, with J. Jones concerning need to depose expert | .30 | 30.00 |
| 00/00/00 | AAA | Prepare outgoing correspondence to expert witness, regarding scheduled appearance at deposition | .20 | 20.00 |
| 00/00/00 | AAA | Prepare for | 4.20 | 320.00 |
| 00/00/00 | AAA | Travel to | 1.00 | 100.00 |
| 00/00/00 | AAA | Attend | 7.50 | 750.00 |
| 00/00/00 | AAA | Travel From | 1.00 | 100.00 |
| 00/00/00 | AAA | Report to carrier, regarding witness testimony and important points made | .80 | 80.00 |
| 00/00/00 | AAA | Incoming Telephone discussion, regarding waiver of signature | .20 | 20.00 |
| 00/00/00 | BBB | Summarize, page and line summary of witness deposition | 2.20 | 110.00 |

Figure 30:
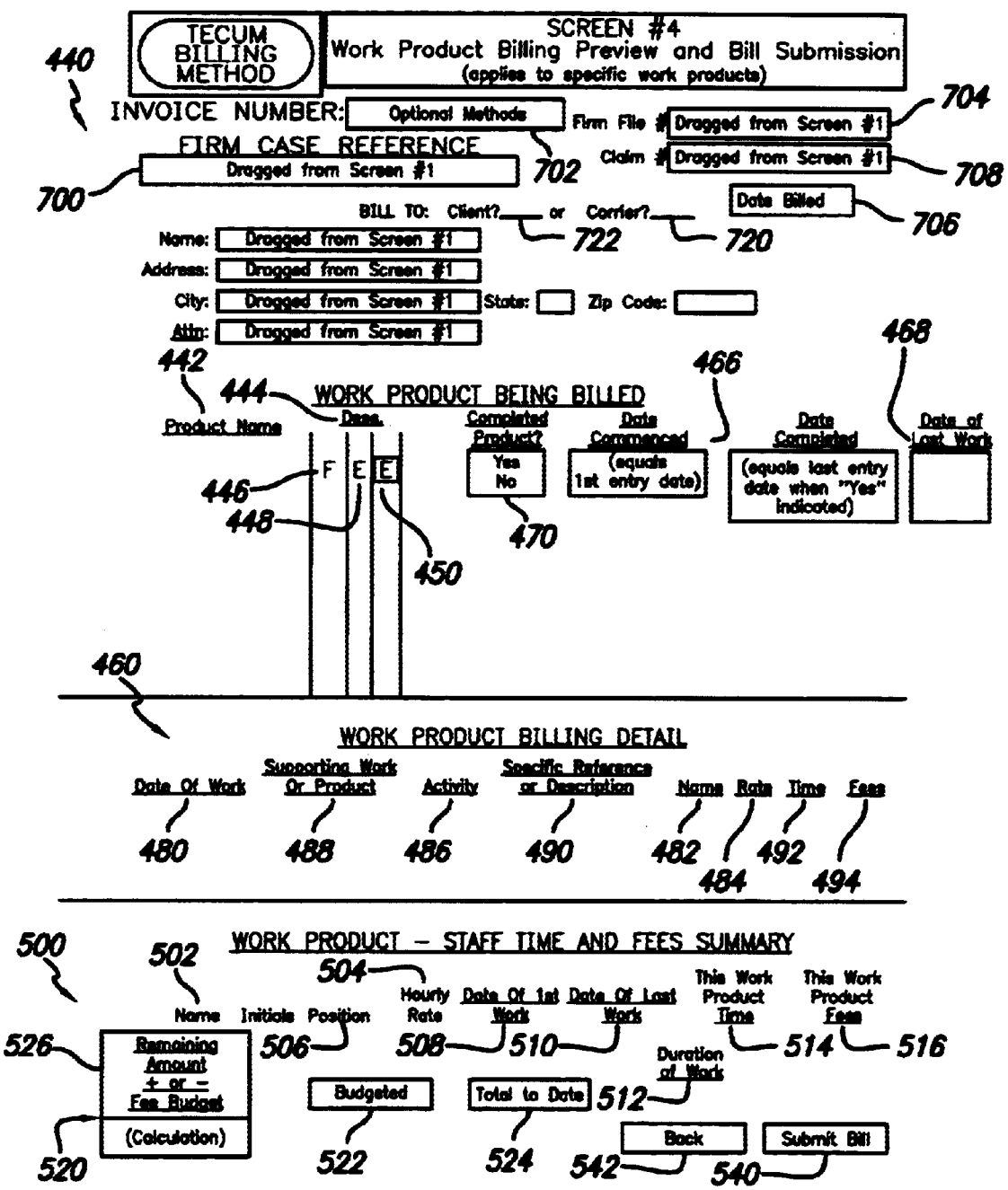
FIG. 30 is an alternative embodiment of the work product billing preview and bill submission screen.

The Staff, Time and Fees, Summary Table 500 indicates the amount that is being billed by the firm for the completed work product. This table also automatically appears when the "F" option 446 has been selected. It is positioned under the Work Detail and Itemization table 460. This table breaks down and lists the time and fees for the services of each timekeeper on the selected work product and provides totals. FIG. 30 shows alternative embodiments of the above panes and tables.

The summary includes:

Name 502 and Rate 504 (name of firm member followed by their hourly rate);

Position (job position of firm member) 506;

Date of First Work 508;

Duration of Work 512 (number of days between timekeepers first and last activity);

Date of Last Work 510;

This Work Product Time (time in hours this activity required) 514; and

This Work Product Fees (fees this activity incurred) 516.

The Fees Calculation Table 520 also automatically appears when the. "F" option 446 has been selected. The summary indicates the amount that was budgeted for the selected work product and the remaining amount after fees are deducted through the current date as follows:

Budgeted (the amount budgeted for fees, this work product) 522;

Total to Date inclusive (amount of fees incurred to date) 524; and

Remaining (remaining budget amount adjusted by Total to Date, if the costs have exceeded the budget this number appears in red) 526.

In order to use the Submit Fees Button 540, the user clicks on this button when he/she desires to submit a bill to the carrier or client designated on the "Case Information Screen" 90. Clicking on the button 540 will load the actual invoice screen that will be submitted. If the Work Detail and Itemization table 460 and Staff, Time and Fees Summary 500 screen was used only to preview the bill and the user does not wish to submit a bill, or to take some alternate action (such as a time adjustment on the work detail and billing entry screen), he/she should exit by using the system "back" button 542.

The Expenses Summary, Previously Billed This Work Product table 550 (FIG. 31) appears as the first of two tables when the unbordered "E" option 448 has been selected. It may be preceded by the date commenced 466, date of last work 468 and completed product 470 check box fields, as for the Work Product Preview and Bill submission screen 440 (FIG. 30). The summary table 550 itemizes all expenses previously billed for the selected work product. If no expense has been billed at the time the summary is previewed, the list will be blank. It contains all of the fields that were completed and stored on the "Work Detail and Billing Entry" screen 350 and which have already been billed on a previous date for the selected work product. The space for the information has a multi-page, unlimited entry capacity. For the work product selected, the "Expenses Summary, Previously Billed This Work Product" table 550 contains the following fields:

Expense work product name (above table) 552;

Date Expense Incurred (date when expense work product happened) 554;

Description of Expense (brief description of the expense) 556;

Specific Reference/Provider 558;

Amount (amount of this expense) 560; and

Total (total expenses previously billed) 562.

The Expenses Summary, Not Billed This Work Product table 570 appears as the second of two tables when the unbordered "E" option 448 has been selected. It is preceded by the "Expenses Summary, Previously Billed This Work Product" table 550. The summary table 570 itemizes all expenses that have not yet been billed for the selected work product. It contains all of the fields that were completed and stored on the "Work Detail and Billing Entry" screen 350. If all expenses through the current date have been previously billed for the selected work product, the table will be blank. The space for the information has a multi-page, unlimited entry capacity. For the work product selected, this table contains the following fields:

Expense work product name (above table) 572;

Date Expense Incurred (date when expense work product happened) 574;

Description of Expense (brief description of the expense) 576; Specific Reference/Provider 578;

Amount (amount of this expense) 580; and

Total (total expenses to be billed) 582.

When selecting the unbordered "E" option 448, the fields of the two tables 550, 570 will appear on the screen as shown in the Figures.

When the submit button 610 is activated, the expenses being billed will become listed on the "Summary, Expenses Previously Billed" table 550. The "Summary Expenses, Not Billed This Work Product" table 570 will become blank and remain blank until a new expense item is entered-on the "Work Detail and Billing Entry" screen 350. This is a date activated control. The only items appearing on the "Summary Expense, Not Billed" screen 570 are those which have been added since the date of any previous expense billing on the selected work product.

The Expenses Calculation Table 590 also automatically appears when the unbordered "E" option 448 has been selected. The summary indicates the amount of expenses that was budgeted for the selected work product and the remaining amount after expenses are deducted through the current date as follows:

Budgeted (the amount budgeted for expenses, this work product) 592;

Total to Date inclusive (amount of expenses incurred to date) 594; and

Remaining (remaining budget amount adjusted by Total to Date.

If the costs have exceeded the budget, this number appears in red). 596.

The user clicks on the Submit Expenses Button 610 when he/she desires to submit a bill to the carrier or client designated on the Case Information Screen 90. Clicking on the button 610 will load the actual invoice screen that will be submitted. If the Expenses Summaries screen was used only to preview the bill and the user does not wish to submit a bill, or to take some alternate action (such as an expense adjustment on the work detail and billing entry screen), he/she should exit by using the system "back" button 612.

The Expenses Summary, Previously Billed All Work Products table 620 appears as the first of 2 tables when the bordered "E" option 450 is selected. The summary table itemizes all expenses previously billed for all work products. If no expense has been billed at the time the summary is previewed, the list will be blank. It contains all of the fields that were completed and stored on the "Work Detailed and Billing Entry" screen 350 and which have already been billed on a previous date for all work products on the selected case. The space for the information has a multi-page, unlimited entry capacity. Note should be taken that not all work products will have an expense item associated with them. The bordered "E" option 450 will only be present for those work products which have been indicated by making an expense entry on the "Work Detail and Billing Entry" screen 350.

For each work product which has expenses that were previously submitted, the "Expenses. Summary, Previously Billed All Work Products" table 620 contains the following fields:

Work Product names (list of all established for selected case) 622;

Date Expense Incurred (date when the expense took place) 624;

Description of Expense (brief description of the expense) 626;

Specific Reference/Provider 628;

Amount (amount of each expense for each work product) 630; and

Total (total expenses previously billed) 632.

The Expenses Summary, Not Billed All Work Products table 640 appears as the second of two tables when the bordered "E" option 450 has been selected. It is preceded by the "Expenses Summary, Previously Billed All Work Products" table 620. The summary table itemizes all expenses that have not yet been billed for all work products. It contains all of the fields that were completed and stored on the "Work Detail and Billing Entry" screen 350. If all expenses for all work products have been previously billed, the screen will be blank indicating that there are no expenses for the entire case which needed to be billed, but have not been previously. The space for the information has a multi-page, unlimited entry capacity. For the work product selected, this table contains the following fields:

Work Product names (list of all established for selected case) 642;

Date Expense Incurred (date when the expense took place) 644;

Description of Expense (brief description of the expense) 646;

Specific Reference/Provider 648;

Amount (amount of each expense for each work product) 650; and

Total (total expenses to be billed) 652.

The Expenses Calculation Table also automatically appears when the bordered "E" option 450 has been selected. The summary indicates the amount of expenses that was budgeted for all work products and the remaining amount after expenses are deducted through the current date as follows:

Budgeted (the amount budgeted for expenses; all work products) 662;

Total to Date inclusive (amount of expenses incurred to date) 664; and

Remaining (remaining budget amount adjusted by Total to Date.

If the costs have exceeded the budget this number appears in red.) 666.

The user clicks on the Submit All Expenses Button 670 when he/she desires to submit a bill to the carrier or client designated on the Case Information Screen 90. Clicking on the button 670 will load the actual invoice screen that will be submitted and all outstanding expenses for all work products will be billed to the party responsible for payment. If the Expenses Summaries screens were used only to preview the bill and the user does not wish to submit a bill, or wishes to take some alternate action (such as an expense adjustment on the work detail and billing entry screen), he/she should exit by using the system "back" button 672.

When the submit button 670 is activated, the expenses being billed will become listed on the "Summary, Expenses Previously Billed All Work Products" table 620. The "Summary Expenses, Not Billed All Work Products" table 640 will become blank and remain blank until a new expense item is entered on the "Work Detail and Billing Entry" screen 350 for any work product. This is a date activated control. The only items appearing on the "Summary Expense, Not Billed" screen 640 are those which have been added since the date of any previous expense billing on the selected work product.

Clicking on the opted "submit button" 418 (FIG. 25) will send the user directly to the invoice screen with the selected submission appearing in the exact billing format, i.e.:

Clicking on the "Submit Bill" button 540 (FIG. 29) will produce the invoice screen with two completed tables—the "Work Detail and Itemization" list 350 for the selected work product and the "Staff Time and Fee Summary" list 500 for the selected work product.

Clicking on the "submit expenses" button 610 (FIG. 31) will produce the invoice screen with a single completed table—the Expense "Summary, Not Billed, This Work Product" list 640 for the selected work product.

Clicking on the "submit all expenses" button 670 (FIG. 32) will produce the invoice screen with a single completed table—the Expense "Summary, Not Billed, All Work Products" list 640 for all work products on the selected case.

When billing a client or carrier, the name of the law firm handling the case and submitting the bill can be permanently inserted and preserved during system set up so it remains constant for each case set up by the firm. FIG. 33 shows one embodiment of a Work Product Expenses bill preview display or sheet 464.

The address of the law firm handling the case and submitting the bill can be permanently inserted and preserved during system set up so it remains constant for each case set up by the firm.

The firm's Tax Identification number or "EIN" field can be permanently inserted and preserved during system set up so it remains constant for each case set up by the firm.

The firm Case Reference field 700 is supplied by the system using information from the "Case Information" screen 90.

The Invoice Number field 702 is a text field and completely flexible. The firm supplies each invoice number.

The Firm File Number field 704 is supplied by the system using information from the "Case Information" screen 90.

The Date Billed field 706 is supplied by the system indicating the date that the bill is being submitted to the client.

The Claim Number field 708 is supplied by the system using information from the "Case Information" screen 90.

There are two options for routing a bill to the party responsible for payment of the bill. The firm should select the appropriate party by clicking on the corresponding button. The options are "Bill Carrier" and "Bill Client."

When the "Bill Carrier" radio button option 720 is selected, the correlating insurance carrier information 150 is automatically supplied using information from the "Case Information" screen 90, including: the carrier name, the carrier address, and the attention: (carrier contact person).

When the "Bill Client" radio button option 722 is selected, the correlating client information 120 is automatically supplied using information from the "Case Information" screen 90, including: the client name, the client address, and the attention: (client contact person).

If the user does not wish to submit a bill for some reason after the billing information has been displayed on this screen, he/she should click on the cancel button 724, which will close out the screen. The system or browser's "back" button 542 or any navigation bar option may also be used as an exit from this screen.

Clicking the "send" or "submit bill" button 728 will submit the bill to the bill payer via the method designated on the "Case Information" screen 90.

On the "Case Information" screen 90, the user had designated the invoice method 144. This election has been stored by the system. When the user clicks the "send" button, a bill is automatically generated as described above. Routing of the bill will occur by one of the following methods:

Bill sent to printer for regular mail submission;

Bill sent to the e-mail address supplied on the "Case Information" screen 90; or Bill sent via other designated method, such as FAX.

The billing options for fees and expenses are subtly different. The key difference lies in the fact that fees cannot (or should not) be billed until all work for a given product is completed, whereas advanced expenses can be billed at any time in accordance with agreements between the firm and bill payer. This case management and billing system is not designed to cause difficulties and/or payment delays between a carrier (or client) and the defense firm. For that reason, prohibitions to certain activities or billing practices are limited. The billing mechanisms described in this billing section have closely considered the needs of the client, carrier and the law firm. It is recognized that a firm may have a substantial money investment in a particular case in the form of advanced expenses. Therefore, the billing system enables the firm to recoup those cash outlays more spontaneously and prior to the closing of a product. The dual expense payment functions allow the firm to bill for advanced expenses either on a per product basis or for the whole case depending on its own needs, cash flow and what is fair to all parties. The firm should consider whether or not a bill for expenses needs to be submitted at any given time and minimize the frequency of expense billing as much as possible. It is suggested that it is more acceptable for larger expenses, such as expert fees and travel expenses, to be billed more spontaneously than smaller expense items such as photocopies and filing fees.

The present invention provides a whole case summary feature, which serves as a vital tool for whole case management. The whole case summary is accessible at any time to all users both in the firm and in the secured client/carrier network. The screen is designed to enable supervising or managing attorneys and carrier's/client's litigation handlers to receive spontaneous information and to provide ongoing support and input. It is accessed by clicking on the graph icon in the navigation bar and makes available all summary information as it relates to the selected case, in its entirety. This overall, case-at-a-glance feature directly stems from the previous screens which treat individual case products, planning and billing.

Figure 34:
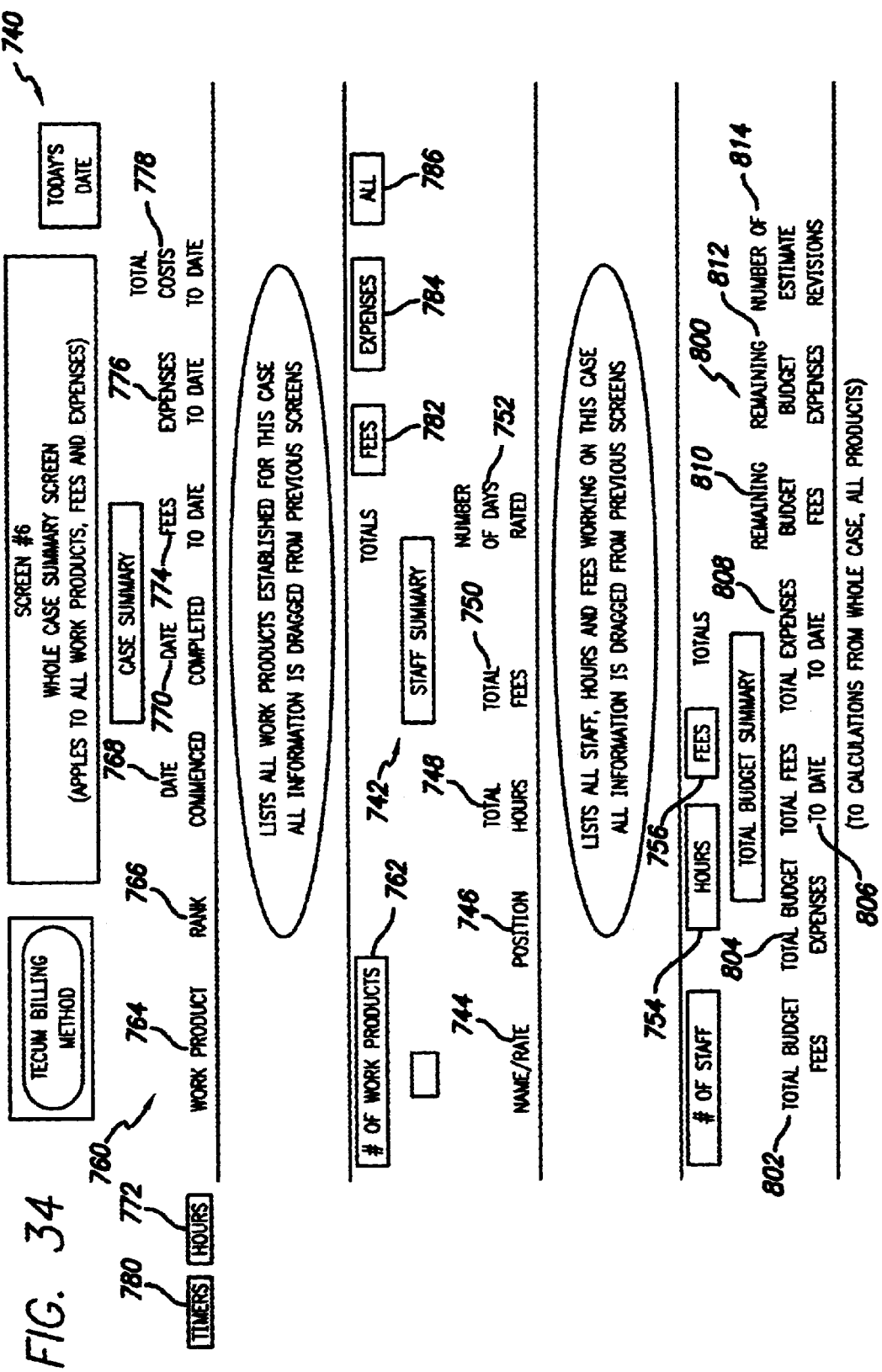
FIG. 34 is a browser screen schematic for a whole case summary screen summarizing activities, billing, and expenses for an entire case.

Referring now to FIG. 34, the "Whole Case Summaries" section 740 displays summaries of all stored items associated with the selected legal case. The page has four main sub-divisions: Staff Summary, Case Work Products Summary, Total Budget Summary, and Staff Assignments Summary, each being arranged into relevant tables. No field in this section is editable and there are no entry fields. If by reviewing one of the provided summaries, the user wishes to obtain more detail or to make any adjustments, simply use the navigation bar and go directly to the screen needing attention for any selected work product.

The Case Staff Summary 742 shows all staff members who have made billing entries on the selected case and a summary for each. Fields in the Case Staff Summary 742 include:

the name/rate of each person (list) billing time on the selected case 744;

the person's corresponding position in the firm 746;

the total hours entered by each person (includes billed+ unbilled) 748;

the total fees entered by each person (this is a rate×time calculation and includes billed+unbilled fees) 750, the number of days each person worked on the case (on all work products, measured by first and last dates of billing entries) 752;

the total hours entered for the whole case by all firm members (billed+unbilled hours) 754; and the total fees entered for the whole case (this is a rate× time calculation and includes billed+unbilled fees) 756. The Whole Case Summary, All Work Products table 760 lists and summarizes all work products that are associated with the selected legal case. Data fields used in the Whole Case Summary, All Work products 760 include:

the Number of Work Products (a count of work products for this case) 762;

the Work Products for this case (list of all work products established) 764;

the priority ranking assigned to the work product when set up 766;

the Date commenced for each (date product was added) 768;

the Date closed (if blank, the product is still open) 770;

the Total hours entered by all timekeepers to date 772;

the Total fees to date for the listed work product 774;

the Total expenses to date for the listed work product 776;

the Total Cost to date for the listed work product fees+expenses) 778;

the Number of timekeepers for the listed work product (how many individuals have billed/are billing time for working on the product) 780;

the Total of all fees, all Products 782;

the Total of all expenses, all products 784; and the Total of all costs (fees+expenses) all products 786.

The above example of a "Whole Case Summary, All Work Products" table 760 correlates directly with the example of the "Case Staff Summary" 742. Note should be taken that the totals for hours and fees incurred (not to be confused with amounts billed) that are indicated on each of the two summaries agree. The "Whole Case Summary, All Work Products" table 760 shows the detail which underlies the staff totals and breaks down costs for each work product individually. The foregoing samples should be considered as illustrations and not models or prototypes.

A look at the information contained in the "Whole Case Summary, All Work Products" table 760 could raise several issues that a managing attorney or a case manager with the client or carrier might Wish to clarify. The following hypothetical examples provided below show how the screen 760 may be best utilized for detection and follow up investigation of potential problems.

If a first pretrial conference, added on Apr. 4, 1998, has a correlating expense amount of $86.90. The concerned manager may know that this was necessary because of mileage or other reasons, but if there is any question or if further explanation is necessary, he/she can: click on the "Billing Preview and Bill Submission" button, labeled as a magnifying glass in the navigation bar; select the appropriate work product 442; select the expense summary for the product 448; and review the detailed description of the expense(s) 550, 570 for the product in question. If the expense appears to be appropriate, the screen may simply be exited. If not, the user may initiate some communication with the appropriate party for further clarification.

Client/carrier users have no data field entry capabilities so they may make inquiries only, but the firm can edit entries. Consequently, law firms remain in control of their billing procedure. The managing attorney may go to the billing screen 350 and make adjustments to the expense if he/she wishes and if the expense is showing up in the "Summary, Not Billed (Expenses), This Work Product" table 570.

A work product entitled "pretrial conference" may have been defined and assigned a "1" priority, but no activity had been entered at the time of the review. This work product may have been set up on May 12, 1998. The firm or client/carrier managers could click on the "Work Product Identification and Information" button 76, possibly labeled by a legal pad and pen in the navigation bar 68 and could read the details about the product including the reason the product was added. At this point, it may be determined whether or not the product was necessary, inadvertently added or in need of attention. Instructions can now be given as to future treatment, or the product can be closed on the billing screen to discontinue monitoring. In that event, it would simply show up on the revised "Whole Case Summary, All Work Products" screen 760 as closed with no time billed.

A third pretrial conference could have been added on Jun. 6, 1998 and assigned a priority ranking of "1", yet it might remain open and showing that 14.20 hours have been entered. This should alert the managers that the conference needs some type of attention. Most likely the attorney completing the product failed to close and bill for the product. Explanations can be found by clicking on the appropriate navigation bar option and reviewing the correlating summaries, followed by corrective action or inquiry if necessary. The "Billing Preview and Bill. Submission" table 440 (FIG. 27) for the specific work product 442 will provide the necessary description and time itemizations of the work performed to date. The product can be closed and billed to the responsible party by following the steps described in the billing section.

A deposition for "Alias" could have been set up on Jun. 6, 1998 and 7.90 hours billed, but remains open. There would obviously have been some delay and an inquiry may be necessary for clarification. The product was assigned a "4" ranking, so it would not appear that there was much urgency when the deposition was planned, but some work could have been completed with no closing. Inquiries would depend on what work represented the time entered, and on when the "Whole Case Summary, All Work Products" screen 760 might be reviewed in conjunction with the product's commencement date 768. Using the appropriate navigation bar options 68 will lead the user to the answers, if in fact there are any questions about the product.

A deposition for "Jones" could have been added on Feb. 14, 1998 and closed on Mar. 30, 1998. 23.9 hours could have been entered and apparently billed to the client/carrier. A manager at the client/carrier might have questioned why 4 timekeepers had worked on a single deposition. Normally, this would have been detected and addressed by a partner prior to the bill being submitted.

A motion for summary judgment could have been set up relatively early in the handling of the case with a priority ranking of "2." Over time 87.20 hours could have been billed and total incurred costs, while not yet billed to the client/carrier could have reached $11,471.50, indicating that either someone forgot to close and bill for the summary judgment or there have been delays. In either instance, the product needs immediate attention, clarification or explanation. By using the navigation bar 68, users will be taken to appropriate screens.

A "motion, other" work product could have been added on Feb. 26, 1998 with time entered, yet it remains open. A later motion could have been completed and closed. If this causes any concern, appropriate steps could be taken.

A protective order could show 26.90 hours in billing time entries. Managers may have some questions on the amount of time and retrieve details from the appropriate screens previously, discussed.

As has been explained in other sections, the fee and expense estimates for individual work products are shown and monitored in various other screens in the system. The "Total Budget Summary" table 800 (FIG. 34) lists and summarizes the cost estimates and budget progress for the entire case. Data fields used in the Total Budget Summary 800 may include:

- the total fees Budgeted for whole case (sum of all work product fee estimates) 802;
- the total expenses Budgeted for whole case (sum of all work product expense estimates) 804;
- the total fees entered for whole case (sum of all fees entered, billed+unbilled) 806;
- the total expenses entered for whole case (sum of all fees entered, billed+unbilled) 808;
- the remaining budget, fees, whole case (the difference between all fees entered and the sum of all fee estimates) 810;
- the remaining budget, expenses, whole case (the difference between all fees entered and the sum of all expense estimates) 812; and
- the number of estimate revisions (a count of revisions made to estimates for fees and expenses, all work products) 814.

If any amounts are in the negative, the numbers for remaining fees or expenses will appear in red. A managing attorney should review this table periodically to ensure that the firm is properly considering cost estimates. If the overall remaining budget is in red, open work products should be reviewed and, estimates revised if necessary. The number of revisions is a good training indicator.

A case manager both at the firm and the carrier/client level are frequently interested in knowing exactly what the timekeepers on a case have been assigned and where they have spent'their time. The "Work Products, Staff Assignments Summary" tables 830 (FIG. 35) afford the capability of quickly determining work assignments and distributions; Data fields used in the Work Products, Staff Assignments Summary include:

- Is the firm member field 832. The firm member field 832 is a drop-down selection menu providing the "Roster of Firm Members Working on This Case "table 226. The user selects a timekeeper from this list;
- the List of work products for which the timekeeper has entered time 834; and
- the correlating time entry totals for each work product assigned, to the selected timekeeper 836.

Figure 28:
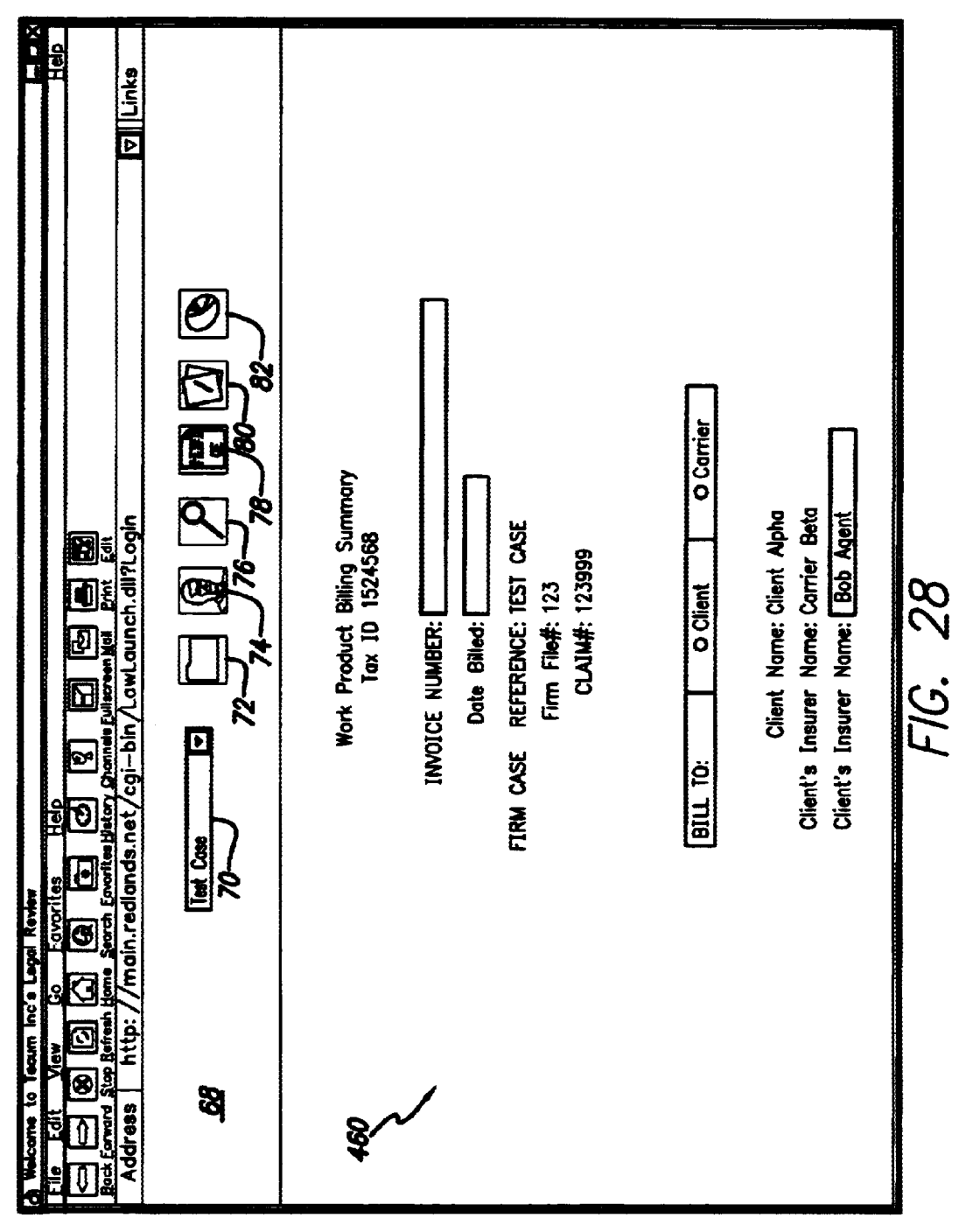

For closer examination of the work performed/time entered by the selected timekeeper on any of the work products listed, the user can use the navigation bar to go to the appropriate screen such as the Work Detail and Itemization table 460 (FIGS. 28–30).

Each firm member is recognized by the system as one name at one hourly rate and that each person will be entered once for each rate at which they charge.

Time and fees shown are for both what has been billed on the whole case as well as what has not yet been billed. This billing system is as much a management tool as a billing mechanism. Understanding work in progress as well as a bill in progress can greatly enhance the management of economic results of a lawsuit form both indemnity and legal fee perspectives. The feature allows case managers to see and tend to issues in advance in a way more meaningful than after the fact attention to bills that have already been rendered to a client or carrier. Since these summaries are available to the firms, carriers and clients simultaneously, any user can ask questions or seek explanations before problems go undetected for so long that they cause post activity concerns or disagreements over issues that are difficult, if not impossible, to reconstruct or understand.

Referring now to FIG. 34, the "Total Hours" field 748 on the "Staff Summary" 742 is intended to provide an overall indication to the user. If a question occurs because of reviewing the field, such as why an associate seems to have worked on a case over a prolonged period but has billed limited hours, the user should direct further inquiries to other summaries and/or specific screens, such as the Staff Assignments Summary" 830 (FIG. 35) described above. It is contemplated that most often explanations will be simple and viable and will normally involve a timekeeper who has been given multiple brief assignments to one multiple project or limited assignments to multiple projects to a slowly developing work product. Or, in contrast, there may be a performance problem with the identified timekeeper. In either case, potential time problems as well as explanations will be easy to find in the system. Examples of the indications from this field are many, but another common occurrence might be the opposite, i.e. a timekeeper who was assigned to the case for very brief periods, but has registered billing entries for inordinately high amounts of time.

The "Date Closed" field 770 on the "Whole Case Summary, All Work Products" table 760 (FIG. 34) is dependent on proper management of the billing screens. When time/fees are submitted to system storage while they await billing, the question, "Completed Product" is asked. When the user answers "yes," the product is closed. The feature allows managers and any other user to monitor work at a glance and to identify potential time lag problems as well as ensuring that bills are sent for work products that are completed.

The billing system is supported by a database which may loaded on the users' computers, both at the law firms and insurance carriers. All information accumulated in the TECUM litigation management and billing system may be downloaded and stored by the users. This is a highly recommended practice and should be done on a daily basis to ensure that information is not lost.

From the downloaded information, a wide assortment of preset reports are available. The database also has the capability of accommodating any number of custom queries that users at either level may want to generate. Management Information Reports preset in the software include reports specifically directed to both law firms and insurance carriers.

For law firms, the following reports may be automatically generated:

1) All cases for all clients in the system with information regarding dates open, dates closed and totals billed for hours, expenses and fees and averages billed per case;
2) All cases for any individual account (insurance carrier/client) in the system with information regarding dates open, dates closed and totals billed for hours, expenses and fees and averages billed per case;
3) Total time billed by each timekeeper for all cases in the system and the average per timekeeper;

47

4) Total time billed by each timekeeper for any specific group of a carrier's/client's cases in the system and the average per timekeeper;
5) Total hours, fees and expenses in lists broken down by main work product and correlating summary and averages information;
6) Total hours, fees and expenses in lists broken down by supporting work or component and correlating summary and averages information;
7) Total hours, fees and expenses in lists broken down by activity and correlating summary and averages information;
8) Total hours, fees and expenses in lists broken down by client/carrier, case type and work product and summary and averages information;
9) Total hours, fees and expenses in lists broken down by client/carrier, case type and component and summary and averages information;
10) Total hours, fees and expenses in lists broken down by client/carrier, case type and activity and summary and averages information; and
11) Total hours, fees and expenses in lists broken down by position and summary and averages information.

For insurance carriers, the following reports may be automatically generated:

1) A list and count of all firms registered in the system;
2) A list and count of all timekeepers registered in the system broken down by position;
3) A list of attorneys in each firm, their correlating rate and years of experience registered in the system;
4) Average rates and average experience for all attorneys registered in the system;
5) Average rates and average experience for each firm registered in the system;
6) All open cases, arranged by type with total hours, total fees and total expenses entered year to date (from January 1 through date of the report), total budgets, total remaining budgets, sub totals and averages for each type and a grand total and averages for all open cases comparing current year to prior year in each category;
7) All closed cases, arranged by type with total hours, total fees and total expenses entered year to date (from January 1 through date of the report), total budgets, total remaining budgets, sub totals and averages for each type and a grand total and averages for all open cases comparing current year to prior year in each category;
8) All open cases, arranged by firm with total hours, total fees and total expenses entered year to date (from January 1 through date of the report), total budgets, total remaining budgets, sub totals and averages for each firm and a grand total and averages for all open cases comparing current year to prior year in each category;
9) All closed cases, arranged by firm with total hours, total fees and total expenses entered year to date (from January 1 through date of the report), total budgets, total remaining budgets, sub totals and averages for each firm and a grand total and averages for all open cases comparing current year to prior year in each category;
10) All cases opened this year arranged by type with total hours, total fees and total expenses entered year to date (from January 1 through date of the report), total budgets, total remaining budgets, sub totals and averages for each type and a grand total and averages for cases opened this year comparing current year to prior year in each category;
11) All cases opened this year arranged by firm with total hours, total fees and total expenses entered year to date (from January 1 through date of the report), total budgets, total remaining budgets, sub totals and averages for each firm and a grand total and averages for cases opened this year comparing current year to prior year in each category;
12) Total time entered and total fees for each timekeeper for all cases in the system arranged by firm, the firm's totals and the average per timekeeper;
13) Total hours, fees and expenses in lists for all cases broken down by main work product and type with correlating summary and averages information for each;
14) Total hours, fees and expenses in lists for specific firms broken down by main work product and type with correlating summary and averages information for each;
15) Total hours, fees and expenses in lists for all cases broken down by components and type with correlating summary and averages information for each;
16) Total hours, fees and expenses in lists for specific firms broken down by components and type with correlating summary and averages information for each;
17) Total hours, fees and expenses in lists for all cases broken down by activity and type with correlating summary and averages information for each;
18) Total hours, fees and expenses in lists for specific firms broken down by activity and type with correlating summary and averages information for each;
19) Average time per task, all firms;
20) Average time per task, specific firms;
21) Work distributions (hours entered) by % of total, broken down by position for all firms;
22) Work distributions (hours entered) by % of total, broken down by position for specific firms;
23) Work distributions (hours entered) by % of total, broken down by position for all firms arranged by case type; and
24) Work distributions (hours entered) by % of total, broken down by position for specific firms arranged by case type.

Users should regularly examine the information provided by the system in report form. Numerous training and efficiency issues may be recognized by simply looking at the variety of comparisons offered. The system will allow custom queries to retrieve other information. A variety of database formats may be used to good effect in the present invention, including comma-delimited or ASCII format, Microsoft Access™ database format, formats used by SQL servers or in conjunction with known or established Internet protocols.

The following HTML code is given as a guide to those familiar in the art and having an understanding of HTML coding. By reviewing the following HTML code, the foregoing description of the operation and action of the coded implementation of the present invention should be readily available. The following HTML URL:

http://main.redlands.net/cgi-bin/LawLaunch.dll?
[GETFORMTH REE][CLIENTNUM]%3D1

[FIRMFILENUM]%3D123 [SESSIONNUM]%3D7747526[PRODUCTNUM]%3D2 [ASSIGNEDPRODUCTNUM]%3D36 provides the indication sufficient to prompt the present invention to display the work detail and billing entry frame as shown in FIG. 24 below the navigation bar 68. The following extensive HTML code provides the text and field display and information-handling structure for the case information frame 90 as shown in FIGS. 12–14.

```
<!-- this page is sc1.htm | obviously -->
<HTML>
<HEAD>
    <META NAME="GENERATOR" CONTENT="Legal stuff Mac">
    <TITLE>ABC Legal Billing Review</TITLE>
    <SCRIPT language="JavaScript">
    function getCookie(name) {
        var cookie = " " + document.cookie;
        var search = " " + name + "=";
        var setStr = null;
        var offset = 0;
        var end = 0;
        if (cookie.length > 0) {
            offset = cookie.indexOf(search);
            if (offset != -1) {
                offset += search.length;
                end = cookie.indexOf(";", offset)
                if (end == -1) {
                    end = cookie.length;
                }
                setStr = unescape(cookie.substring(offset, end));
            }
        }
        return(setStr);
    }
    var myFontColor;
    var myScreenColor;
    myScreenColor=getCookie('bgColor');
    myFontColor=getCookie("fgColor");
    if (myScreenColor!=null)
    {
        document.bgColor=myScreenColor;
    }
    if (myFontColor!=null)
    {
        document.fgColor=myFontColor;
    }
    function Loaded()
    {
    //for some reason which i don't now, Netscape requires this here, or it resets the bgColor
        if (myScreenColor!=null)
        {
            document.bgColor=myScreenColor
        }
        else
        {
            document.bgColor="#ffffff"
        }
        //lets assign the session id
        document.SC1.hidLawFirmNum.value=parent.CLIENTNUM
    }
    function NextForm()
    {
    //used to be used to move on to form two, button bar removed the necessity
        theFirmIndex=parent.FILENUMFRAME.document.FILENUMFORM.cmbFirmFileNum.selectedIndex;
        theFirmValue=parent.FILENUMFRAME.document.FILENUMFORM.cmbFirmFileNum.options[theFirmIndex].value;
        //for now, we will just get the next form, in the future, will do the full submit
        window.open("/cgi-bin/lawlaunch.exe?[GETFORMTWO][CLIENTNUM]%3D"+parent.CLIENTNUM+"[FIRMFILENUM]%3D"+theFirmValue+"[SESSIONNUM]%3D"+parent.SESSIONNUM,"_top");
    }
    function CheckNumber(varVal,varName) {
        if (isNaN(varVal)) {
            alert("Error a numeric value is needed in" + varName)
        }
    }
    </SCRIPT>
</HEAD>
<BODY onload="Loaded()">
<FORM ACTION="/cgi-bin/lawlaunch.dll?[SAVESC1][SESSIONNUM]%3D[theSESSIONNUM]" NAME="SC1" METHOD=POST TARGET="FILENUMFRAME">
    <P><CENTER><B><FONT SIZE=+1>Case Information</FONT></B><BR>
    <TABLE WIDTH="575" BORDER="0" CELLSPACING="2" CELLPADDING="0" HEIGHT="439">
        <TR>
            <TD WIDTH="50%" HEIGHT="60"><P ALIGN=RIGHT><B><BR>
            FIRM CASE REFERENCE:</B></TD>
            <TD WIDTH="50%"><TABLE BORDER="0" CELLSPACING="2" CELLPADDING="0" WIDTH="204" HEIGHT="31">
                <CAPTION ALIGN="TOP"><B>GENERAL TITLE</B></CAPTION>
                <TR>
                <TD WIDTH="199%" HEIGHT="26"><P><CENTER><INPUT NAME="txtFirmCaseReference" TYPE="text" SIZE="30" MAXLENGTH="50"></CENTER></TD></TR>
            </TABLE>
            </TD></TR>
        <TR>
            <TD HEIGHT="28"><P ALIGN=RIGHT><B>Date Assigned:</B></TD>
            <TD><INPUT NAME="txtDateAssigned" TYPE="text" SIZE="9" MAXLENGTH="9"></TD></TR>
        <TR>
            <TD HEIGHT="19"><P ALIGN=RIGHT><B>Firm File #:</B></TD>
            <TD><INPUT NAME="txtFirmFileNum" TYPE="text" SIZE="20" MAXLENGTH="20" onblur="CheckNumber(txtFirmFileNum.value,'Firm File Number')"></TD></TR>
        <TR>
            <TD HEIGHT="31"><P ALIGN=RIGHT><B>Case Type:</B></TD>
            <TD><SELECT NAME="cmbCaseType">
            </SELECT></TD></TR>
        <TR>
            <TD><P ALIGN=RIGHT> <B>Sub Type:</B></TD>
            <TD><SELECT NAME="cmbCaseSubType">
            </SELECT></TD></TR>
        <TR>
            <TD COLSPAN="2"><P><CENTER><B>Include Case Comments Here:<BR>
            </B><TEXTAREA NAME="txtComments" ROWS="5" COLS="58"
            ></TEXTAREA></CENTER></TD></TR>
        <TR>
            <TD HEIGHT="28"><P ALIGN=RIGHT><B>Estimated Fees in Case:</B></TD>
            <TD><INPUT NAME="txtEstimatedFees" TYPE="text" SIZE="20" MAXLENGTH="20" onblur="CheckNumber(txtEstimatedFees.value,'Estimated Fees')"></TD></TR>
        <TR>
            <TD HEIGHT="28"><P ALIGN=RIGHT><B>Estimated Expenses in Case:</B></TD>
            <TD><INPUT NAME="txtEstimatedExpenses" TYPE="text" SIZE="20" MAXLENGTH="20" onblur="CheckNumber(txtEstimatedExpenses.value,'Estimated
```

```
Expenses')"></TD></TR>
    <TR>
    <TD HEIGHT="28"><P ALIGN=RIGHT><B>Estimated
Time in Days for Case:</B></TD>
    <TD><INPUT NAME="txtEstimatedTime" TYPE="text"
SIZE="20" MAXLENGTH="20"
onblur="CheckNumber(txtEstimatedTime.value,'Estimated Time
')"></TD></TR>
    <TR>
    <TD COLSPAN="2"><P><CENTER><B>If Case
Estimate Is Revised, Enter Reason Here:<BR>
    </B><TEXTAREA NAME="txtEstimateReason"
ROWS="5" COLS="58"
    ></TEXTAREA></CENTER></TD></TR>
    </TABLE>
    <BR>
    <BR>
    <TABLE WIDTH="580" BORDER="0"
CELLSPACING="2" CELLPADDING="0">
    <CAPTION ALIGN="TOP"><B><U>Client
Information</U></B></CAPTION>
    <TR>
    <TD WIDTH="17%"><P
ALIGN=RIGHT><B>Name:</B></TD>
    <TD WIDTH="29%"><INPUT NAME="txtClientName"
TYPE="text" SIZE="22" MAXLENGTH="22"></TD>
    <TD WIDTH="27%"><P
ALIGN=RIGHT><B>Address:</B></TD>
    <TD WIDTH="27%"><INPUT NAME="txtAddress"
TYPE="text" SIZE="22" MAXLENGTH="22"></TD></TR>
    <TR>
    <TD><P ALIGN=RIGHT><B>City:</B></TD>
    <TD><INPUT NAME="txtCity" TYPE="text" SIZE="22"
MAXLENGTH="22"></TD>
    <TD><P ALIGN=RIGHT><B>State:</B></TD>
    <TD><SELECT NAME="cmbState">
    </SELECT></TD></TR>
    <TR>
    <TD><P ALIGN=RIGHT><B>Zip Code:</B></TD>
    <TD><INPUT NAME="txtZipCode" TYPE="text"
SIZE="10" MAXLENGTH="10"
onblur="CheckNumber(txtZipCode.value,'Zip Code')"></TD>
    <TD><P ALIGN=RIGHT><B>Contact
Name:</B></TD>
    <TD><INPUT NAME="txtContactName" TYPE="text"
SIZE="22" MAXLENGTH="22"></TD></TR>
    <TR>
    <TD><P
ALIGN=RIGHT><B>Telephone#:</B></TD>
    <TD><INPUT NAME="txtAreaCode" TYPE="text"
SIZE="6" MAXLENGTH="6">-<INPUT NAME="txtPhoneNum"
    TYPE="text" SIZE="12" MAXLENGTH="12"></TD>
    <TD><P ALIGN=RIGHT><B>Contact
Email:</B></TD>
    <TD><INPUT NAME="txtClientEmail" TYPE="text"
SIZE="22" MAXLENGTH="35"></TD></TR>
    </TABLE>
    <TABLE WIDTH="575" BORDER="0"
CELLSPACING="2" CELLPADDING="0">
    <TR>
    <TD WIDTH="50%"><P ALIGN=RIGHT><B>Method
of Invoicing Client:</B></TD>
    <TD WIDTH="50%"><SELECT
NAME="cmbClientInvoiceMethod">
    </SELECT></TD></TR>
    </TABLE>
    <BR>
    <BR>
    <TABLE WIDTH="580" BORDER="0"
CELLSPACING="2" CELLPADDING="0" HEIGHT="126">
    <CAPTION ALIGN="TOP"><B><U>Insurer
Information</U></B></CAPTION>
    <TR>
    <TD WIDTH="16%" HEIGHT="28"><P
ALIGN=RIGHT><B>Name:</B></TD>
    <TD WIDTH="31%"><INPUT NAME="txtInsurerName"
TYPE="text" SIZE="22" MAXLENGTH="22"></TD>
    <TD WIDTH="26%"><P
ALIGN=RIGHT><B>Address:</B></TD>
    <TD WIDTH="27%"><INPUT
NAME="txtInsurerAddress" TYPE="text" SIZE="22"
MAXLENGTH="22"></TD></TR>
    <TR>
    <TD HEIGHT="31"><P
ALIGN=RIGHT><B>City:</B></TD>
    <TD><INPUT NAME="txtInsurerCity" TYPE="text"
SIZE="22" MAXLENGTH="22"></TD>
    <TD><P ALIGN=RIGHT><B>State:</B></TD>
    <TD><SELECT NAME="cmbInsurerState">
    </SELECT></TD></TR>
    <TR>
    <TD HEIGHT="28"><P ALIGN=RIGHT><B>Zip
Code:</B></TD>
    <TD><INPUT NAME="txtInsurerZipCode" TYPE="text"
SIZE="10" MAXLENGTH="10"
onblur="CheckNumber(txtInsurerZipCode.value,'Insurer Zip Code
')"></TD>
    <TD><P ALIGN=RIGHT><B>Contact
Name:</B></TD>
    <TD><INPUT NAME="txtInsurerContactName"
TYPE="text" SIZE="22" MAXLENGTH="22"></TD></TR>
    <TR>
    <TD HEIGHT="28"><P
ALIGN=RIGHT><B>Telephone#:</B></TD>
    <TD><INPUT NAME="txtInsurerAreaCode" TYPE="text"
SIZE="6" MAXLENGTH="6">-<INPUT
NAME="txtInsurerPhoneNum"
    TYPE="text" SIZE="12" MAXLENGTH="12"></TD>
    <TD><P ALIGN=RIGHT><B>Contact
Email:</B></TD>
    <TD><INPUT NAME="txtInsurerEmail" TYPE="text"
SIZE="22" MAXLENGTH="22"></TD></TR>
    </TABLE>
    <TABLE WIDTH="580" HEIGHT="55" BORDER="0"
CELLSPACING="2" CELLPADDING=
    "0">
    <TR>
    <TD WIDTH="50%" HEIGHT="31"><P
ALIGN=RIGHT> <B>Method of Invoicing
Insurer:</B></TD>
    <TD WIDTH="50%"> <SELECT
NAME="cmbInsurerInvoiceMethod">
    </SELECT></TD></TR>
    <TR>
    <TD WIDTH="50%" HEIGHT="17"><P
ALIGN=RIGHT> <B>Claim #:</B></TD>
    <TD WIDTH="50%"> <INPUT
NAME="txtClaimNum" TYPE="text" SIZE="20"
MAXLENGTH="20"></TD></TR>
    </TABLE>
    <TABLE BORDER="0" CELLSPACING="2"
CELLPADDING="0" WIDTH="580" HEIGHT="34">
    <TR>
    <TD HEIGHT="29" WIDTH="50%"><P
ALIGN=RIGHT><B>Assigned By:</B></TD>
    <TD WIDTH="50%"> <SELECT
NAME="cmbAssignedBy">
    </SELECT></TD></TR>
    <TR>
    <TD HEIGHT="29" WIDTH="50%"><P
ALIGN=RIGHT><B>Location Number:</B></TD>
    <TD WIDTH="50%"> <INPUT
NAME="txtLocationNum" TYPE="text" SIZE="5"
MAXLENGTH="5"
onblur="CheckNumber(txtLocationNum.value,'Location Number
')"></TD></TR>
    </TABLE>
    <BR>
    <TABLE BORDER="1" CELLSPACING="2"
CELLPADDING="0" WIDTH="537" HEIGHT="83">
    <TR>
    <TD WIDTH="168"></TD>
    <TD
WIDTH="174"><P><CENTER><B><U>Plaintiffs</U></
B></CENTER></TD>
    <TD
```

-continued

```
WIDTH="186"><P><CENTER><B><U>Defendants</B>
</U></CENTER></TD></TR>
    <TR>
    <TD HEIGHT="28"><P ALIGN=RIGHT><B>Total #
of:</B></TD>
    <TD><P><CENTER> <INPUT
NAME="txtTotalNumPlaintiffs" TYPE="text" SIZE="6"
MAXLENGTH="6"
onblur="CheckNumber(txtTotalNumPlaintiffs.value,'Total Number of
Plaintiffs')"></CENTER></TD>
    <TD><P><CENTER> <INPUT
NAME="txtTotalNumDefendants" TYPE="text" SIZE="6"
MAXLENGTH="6"
onblur="CheckNumber(txtTotalNumDefendants.value,'Total Number of
Defendants')"></CENTER></TD></TR>
    <TR>
    <TD HEIGHT="27"><P ALIGN=RIGHT><B>Total # of
Cross/Counter:</B></TD>
    <TD><P><CENTER> <INPUT
NAME="txtTotalNumCrossCounterPlantiffs" TYPE="text"
        SIZE="6" MAXLENGTH="6"
onblur="CheckNumber(txtTotalNumCrossCounterPlantiffs.value,'Total
Number of Cross Counter Plaintiffs')"></CENTER></TD>
    <TD><P><CENTER> <INPUT
NAME="txtTotalNumCrossCounterDefendants" TYPE="text"
        SIZE="6" MAXLENGTH="6"
onblur="CheckNumber(txtTotalNumCrossCounterDefendants.value,
'Total Number of Cross Counter Defendants
')"></CENTER></TD></TR>
    </TABLE>
    <BR>
    <TABLE WIDTH="580" BORDER="0"
CELLSPACING="2" CELLPADDING="0">
    <TR>
    <TD WIDTH="50%"><P ALIGN=RIGHT><B>Plaintiff
Attorney:</B></TD>
    <TD WIDTH="50%"><INPUT
NAME="txtPlantiffAttorney" TYPE="text" SIZE="20"
MAXLENGTH="20"></TD></TR>
    <TR>
    <TD><P ALIGN=RIGHT><B>Plaintiff Attorney
Telephone#:</B></TD>
    <TD><INPUT NAME="txtAttorneyAreaCode"
TYPE="text" SIZE="6" MAXLENGTH="6">-<INPUT
NAME="txtAttorneyPhoneNum"
        TYPE="text" SIZE="12" MAXLENGTH="12"
></TD></TR>
    </TABLE>
    <BR>
    <TABLE BORDER="0" CELLSPACING="2"
CELLPADDING="0" WIDTH="580" HEIGHT="75">
    <TR>
    <TD HEIGHT="28" WIDTH="50%"><P
ALIGN=RIGHT><B>Can Defense be Shared?:</B></TD>
    <TD WIDTH="50%"> <INPUT TYPE="checkbox"
NAME="chkShared" VALUE="checkbox"></TD></TR>
    <TR>
    <TD HEIGHT="28"><P ALIGN=RIGHT><B>Date of
Sharing Agreement:</B></TD>
    <TD> <INPUT NAME="txtSharingDate"
TYPE="text" SIZE="10" MAXLENGTH="10"></TD></TR>
    </TABLE>
    <BR>
    <B>Include Terms of Sharing Here:<BR>
    </B><TEXTAREA NAME="txtTerms" ROWS="5"
COLS="58"
    ></TEXTAREA></CENTER></P>
    <P><CENTER><HR><B>Closed Case
Information</B><TABLE BORDER="0" CELLSPACING=
    "2" CELLPADDING="0" WIDTH="450">
    <TR>
    <TD WIDTH="54%"><P ALIGN=RIGHT><B>Date
Closed:</B></TD>
    <TD WIDTH="46%"><INPUT NAME="txtDateClosed"
TYPE="text" SIZE="10" MAXLENGTH="10"></TD></TR>
    <TR>
    <TD><P ALIGN=RIGHT><B>Case
Closed:</B></TD>
    <TD><INPUT TYPE="checkbox"
NAME="chkCaseClosed" VALUE="checkbox"></TD></TR>
    <TR>
    <TD><P ALIGN=RIGHT><B>Verdict/Settlement
Amount:</B></TD>
    <TD><INPUT NAME="txtAmount" TYPE="text"
SIZE="14" MAXLENGTH="14"
onblur="CheckNumber(txtAmount.value,'Settlement
Amount')"></TD></TR>
    </TABLE>
    <B>Verdict:</B><BR>
    <TEXTAREA NAME="txtVerdict" ROWS="5" COLS="58"
></TEXTAREA></CENTER></P>
    <P><CENTER><TABLE WIDTH="400" BORDER="1"
CELLSPACING="1" CELLPADDING="0"
    HEIGHT="47">
    <CAPTION ALIGN="TOP"><B>Method
Closed:</B></CAPTION>
    <TR>
    <TD WIDTH="33%"
HEIGHT="17"><P><CENTER>Tried</CENTER></TD>
    <TD
WIDTH="33%"><P><CENTER>Settled</CENTER></TD>
    <TD
WIDTH="34%"><P><CENTER>Dismissed</CENTER></TD
></TR>
    <TR>
    <TD WIDTH="33%"
HEIGHT="24"><P><CENTER><INPUT TYPE="radio"
VALUE="tried" NAME="rdoClosedBy" CHECKED=
        "true"></CENTER></TD>
    <TD WIDTH="33%"><P><CENTER><INPUT
TYPE="radio" VALUE="settled"
NAME="rdoClosedBy"></CENTER></TD>
    <TD WIDTH="34%"><P><CENTER><INPUT
TYPE="radio" VALUE="dismissed"
NAME="rdoClosedBy"></CENTER></TD></TR>
    </TABLE>
    <BR>
    <HR></CENTER></P>
    <P><CENTER><INPUT TYPE="hidden"
NAME="hidClientNum" VALUE=""><INPUT TYPE=
        "hidden" NAME="hidClientContactNum" VALUE="">
    <INPUT TYPE="hidden" NAME=
        "hidInsurerNum" VALUE=""><INPUT TYPE="hidden"
NAME="hidInsurerContactNum"
        VALUE=""><INPUT TYPE="hidden"
NAME="hidFirmFileNum" VALUE=""><INPUT TYPE=
        "hidden" NAME="hidLawFirmNum" VALUE=""><INPUT
NAME="btnSubmit" TYPE="submit"
        VALUE="Save Changes"></CENTER>
    </FORM>
    </BODY>
    </HTML>
```

While the present invention has been described with regards to particular embodiments, it is recognized that additional variations of the present invention may be devised without departing from the inventive concept.

What is claimed is:

1. A method for entering and sharing legal billing and budget information, the steps comprising:

providing a computer network;

gathering actual time and expense data via said computer network;

gathering predicted time and expense data via said computer network to effect a budget indicating allocated funds for legal activities and legal expenses;

identifying said actual time and expense data and said budget with a specific case of a specific client;

storing said actual and predicted time and expense data in a database related to said case;

presenting said budget to a user when said user enters actual time and expense data so that said user is notified of compliance with said budget as indicated by said budget less already billed actual time and expense data and said user is notified of potentially remaining budget as indicated by said budget less already billed actual time and expense data plus unbilled actual time and expense data;

transmitting said actual time and expense data and said budget to a third party, said third party monitoring said actual time and expense data and said budget; whereby legal billing for time and expenses and review of such legal billing may occur in a contemporaneous and ongoing manner over said computer network, allowing legal costs and fees to be entered, recorded, and monitored more easily by geographically dispersed parties.

2. The method for entering and sharing legal billing and budget information as set forth in claim 1, the steps further comprising:

previewing bills reflecting said actual time and expense data based upon said stored time and expense data; and submitting bills reflecting said actual time and expense data based upon said stored time and expense data.

3. The method for entering and sharing legal billing and budget information as set forth in claim 2, the steps further comprising:

generating reports derived from said database.

4. The method for entering and sharing legal billing and budget information as set forth in claim 3, wherein said computer network further comprises:

a global computer network such as the Internet.

5. The method for entering and sharing legal billing and budget information as set forth in claim 4, wherein said actual and predicted time and expense data is collected via web pages displayed by a web browser.

6. The method for entering and sharing legal billing and budget information as set forth in claim 5, the steps further comprising:

gathering data and storing said data in said database, said data selected from the group consisting of:

specific work product information, specific attorney or legal team member information, and specific expense provider information.

7. The method for entering and sharing legal billing and budget information as set forth in claim 1, the steps further comprising:

forcing said user to select a client, case and work product before allowing said user to enter data regarding actual time or actual expenses.

8. The method for entering and sharing legal billing and budget information as set forth in claim 1, the steps further comprising:

entering information regarding said specific case of said specific client;

entering information regarding an entire budget for said specific case;

designating work product categories associated with said specific case;

entering budget information for each designated work product category;

entering actual time and/or expense data and associating said data with one of said designated work product categories; and storing said case information, said entire budget information, said work product designations, said work product budget information, and said work product time and/or expense data in said database.

9. The method for entering and sharing legal billing and budget information as set forth in claim 5, the steps further comprising:

providing a navigation bar, said navigation bar providing access to different areas or portions of the method.

10. The method for entering and sharing legal billing and budget information as set forth in claim 9, wherein said different areas of portions of the method comprise:

a case information branch;

a firm and case roster branch;

a work product identification and information branch;

a time and expense entry branch;

a billing branch; and a case summary branch.

11. The method for entering and sharing legal billing and budget information as set forth in claim 10, wherein said case information branch further comprises:

case information entry and editing fields.

12. The method for entering and sharing legal billing and budget information as set forth in claim 10, wherein said firm and case roster branch further comprises:

a firm member list, said firm member list providing an option to add new firm members and information regarding said new firm members; and a case roster list, said case roster list created from designations made from said firm member list, said case roster list listing firm members entering billing on said specific case.

13. The method for entering and sharing legal billing and budget information as set forth in claim 10, wherein said work product identification and information branch further comprises:

a list of work product types available for designation, said list of work products including an option to designate and create a new work product type; and a list of work product types designated for said specific case, each of said designated work products having associated budget information pertinent to said designated work product.

14. The method for entering and sharing legal billing and budget information as set forth in claim 10, wherein said time and expense entry branch further comprises:

time and expense entry fields;

present and projected budget fields, said present and projected budget fields not being editable by a user but being calculated using said time and expense entry fields;

said time and expense entry branch only available when a work product has been designated and with which information entered regarding time spent for legal activities or expenses may be associated.

15. The method for entering and sharing legal billing and budget information as set forth in claim 10, wherein said billing branch further comprises:

a work product billing list, said work product billing list indicating unbilled fees and unbilled expenses with respect to individual designated work products; and said work product billing list providing access to individual work product bill previews, said individual work product previews showing all firm members' contributions to said individual work product bills, said individual work product bill previews able to be actually billed upon user actuation of such billing.

16. The method for entering and sharing legal billing and budget information as set forth in claim 10, wherein said case summary branch further comprises:

a report list, said report list listing available reports, said reports being ordered and compiled extractions of said database; and said report list providing access to said reports.

17. An Internet-based method for entering, sharing, and monitoring legal billing and budget information, the steps comprising:

providing access to a shared database over the Internet;

gathering actual time and expense data via the Intern et;

gathering predicted time and expense data via the Internet to effect a budget indicating fund allocation for legal activities and legal expenses;

said actual and predicted time and expense data collected via web pages displayed by a web browser, each of said web pages providing ready access to available options, areas, or portions by a navigation bar at a top of said web pages;

gathering data and storing said data in said database, said data selected from the group consisting of: specific work product information, specific attorney or legal team member information, and specific expense provider information;

identifying said actual time and expense data and said budget with a specific case of a specific client by forcing said user to select a client, case, and work product before allowing said user to enter data regarding actual time or actual expenses;

entering information regarding said specific case of said specific client;

entering information regarding an entire budget for said specific case;

designating work product types associated with said specific case;

entering budget information for each designated work product type;

entering actual time and/or expense data and associating said data with one of said designated work product types;

storing said actual and predicted time and expense data in said database in a case-related manner in conjunction with storing said case information, said entire budget information, said work product designations, and said work product budget information in said database;

presenting said budget to a user when said user enters actual time and expense data so that said user is notified of compliance with said budget as indicated by said budget less already billed actual time and expense data and said user is notified of potentially remaining budget as indicated by said budget less already billed actual time and expense data plus unbilled actual time and expense data;

transmitting said actual time and expense data and said budget to a third party via the Internet, said third party monitoring said actual time and expense data and said budget;

previewing bills reflecting said actual time and expense data based upon said stored time and expense data;

submitting bills reflecting said actual time and expense data based upon said stored time and expense data;

generating reports derived from said database;

said navigation bar providing continual access to different areas or portions of the method, said different areas or portions comprising: a case information branch, a firm and case roster branch, a work product identification and information branch, a time and expense entry branch, a billing branch; and a case summary branch;

said case information branch comprising case information entry and editing fields;

said firm and case roster branch comprising a firm member list, said firm member list providing an option to add new firm members and information regarding said new firm members, and a case roster list, said case roster list created from designations made from said firm member list, said case roster list listing firm members entering billing on said specific case;

said work product identification and information branch comprising a list of work product types available for designation, said list of work products including an option to designate and create a new work product type, and a list of work product types designated for said specific case, each of said designated work products having associated budget information pertinent to said designated work product;

said time and expense entry branch comprising time and expense entry fields and present and projected budget fields, said present and projected budget fields not being editable by a user but being calculated using said time and expense entry fields, said time and expense entry fields only available when a work product has been designated and with which information entered regarding time spent for legal activities or expenses may be associated;

said billing branch comprising a work product billing list, said work product billing list indicating new and unbilled fees and new and unbilled expenses with respect to individual designated work products, and said work product billing list providing access to individual work product bill previews, said individual work product previews showing all firm members' contributions to said individual work product bills, said individual work product bill previews able to be actually billed upon user actuation of such billing; and said case summary branch comprising a report list, said report list listing available reports, said reports being ordered and compiled extractions of said database, and said report list providing access to said reports; whereby legal billing for time and expenses and review of such legal billing may occur in a contemporaneous and ongoing manner over the Internet, allowing legal costs and fees to be entered, recorded, and monitored more easily by geographically dispersed parties.

\* \* \* \* \*